US011292706B2

(12) United States Patent
Showalter

(10) Patent No.: US 11,292,706 B2
(45) Date of Patent: Apr. 5, 2022

(54) APPARATUS, SYSTEMS AND METHODS FOR PREPARING AND DISPENSING FOODS

(71) Applicant: Edward Showalter, Santa Monica, CA (US)

(72) Inventor: Edward Showalter, Santa Monica, CA (US)

( * ) Notice: Subject to any disclaimer, the term of this patent is extended or adjusted under 35 U.S.C. 154(b) by 0 days.

(21) Appl. No.: 17/085,757

(22) Filed: Oct. 30, 2020

(65) Prior Publication Data

US 2021/0047165 A1   Feb. 18, 2021

Related U.S. Application Data

(63) Continuation-in-part of application No. 16/708,161, filed on Dec. 9, 2019, which is a continuation of
(Continued)

(51) Int. Cl.
*B67D 1/00* (2006.01)
*B67D 1/04* (2006.01)
(Continued)

(52) U.S. Cl.
CPC ............ *B67D 1/00* (2013.01); *B67D 1/0004* (2013.01); *B67D 1/0406* (2013.01);
(Continued)

(58) Field of Classification Search
CPC ...... B67D 1/0406; B67D 1/06; B67D 1/0004; B67D 1/0462; B67D 1/00; B67D 1/0862; B67D 2001/0812
(Continued)

(56) References Cited

U.S. PATENT DOCUMENTS 2,237,255 A * 4/1941 Finnegan ............... F25D 17/02
62/63
2,531,238 A * 11/1950 Tandler ............... G07F 17/0078
221/6
(Continued)

FOREIGN PATENT DOCUMENTS

CN   201771434   3/2011
JP   3080422   9/2001

OTHER PUBLICATIONS tp://registerguard.com/rg/life/tastings/29982007-82/wine-tap-says-kegs-philpot.html.csp#; (See p. 1 of attached NPL No. 1 document).
(Continued)

*Primary Examiner* — Eric S Stapleton
(74) *Attorney, Agent, or Firm* — Cionca IP Law P.C.; Marin Cionca

(57) ABSTRACT

An apparatus for autonomously cooking a food product and dispensing said food product into a container, the apparatus comprising: a housing; a plurality of cooling chambers, a plurality of cooking chambers, a plurality of storage chambers, a plurality of primary dispensing chambers, and a plurality of secondary dispensing chambers disposed in a column arrangement within the apparatus; at least one food container disposed within at least one of the plurality of cooling chambers; a plurality of mixer augers disposed within the at least one food container; a series of induction plates adapted to be heated by a series of induction energizers, the series of induction plates and induction energizers being associated with each cooking chamber; and roller conveyor tables disposed throughout the pluralities of primary and secondary dispensing chambers, the roller conveyor tables being adapted to traverse the container such that to receive the cooked food product.

10 Claims, 33 Drawing Sheets

Related U.S. Application Data application No. 14/586,782, filed on Dec. 30, 2014, now Pat. No. 10,647,563.

(51) Int. Cl.
*B67D 1/06* (2006.01)
*B67D 1/08* (2006.01)

(52) U.S. Cl.
CPC ............ *B67D 1/0462* (2013.01); *B67D 1/06* (2013.01); *B67D 1/0862* (2013.01); *B67D 2001/0812* (2013.01)

(58) Field of Classification Search
USPC ........... 99/287, 295, 302 P; 285/399; 29/428
See application file for complete search history.

(56) References Cited

U.S. PATENT DOCUMENTS

| | | | | |
|---|---|---|---|---|
| 2,670,605 A * | 3/1954 | Van Zandt | ................. | F17C 5/02 62/47.1 |
| 2,822,153 A * | 2/1958 | Arnold | ................. | F26B 11/0413 366/229 |
| 2,894,270 A * | 7/1959 | Manthos | ................. | B63B 34/50 441/131 |
| 2,897,772 A * | 8/1959 | Hunter | ................. | A21B 5/08 99/352 |
| 2,897,994 A * | 8/1959 | Foss | ................. | B65D 81/3211 220/4.27 |
| 2,944,616 A * | 7/1960 | Bernard | ................. | A01D 34/69 180/19.1 |
| 3,127,061 A * | 3/1964 | Patch et al. | ............ | A23G 9/281 222/74 |
| 3,141,573 A * | 7/1964 | Patch | ................. | G07F 13/06 222/129.1 |
| 3,265,016 A * | 8/1966 | Cheung | ................. | A21C 15/02 99/353 |
| 3,326,116 A * | 6/1967 | Belshaw | ................. | A21B 5/08 99/354 |
| 3,333,666 A * | 8/1967 | Murray | ................. | G07F 9/105 194/221 |
| 3,386,550 A * | 6/1968 | Murray | ............... | G07F 17/0078 194/221 |
| 3,393,843 A * | 7/1968 | Webster | ................. | F16K 1/308 222/394 |
| 3,441,952 A * | 4/1969 | Strader | ................. | A63B 35/12 440/6 |
| 3,518,934 A * | 7/1970 | Klyce | ................. | A22C 11/00 99/443 R |
| 3,530,800 A * | 9/1970 | Watkins | ................. | B61C 11/00 104/168 |
| 3,618,905 A * | 11/1971 | Primus | ................. | B67D 1/04 261/153 |
| 3,752,362 A * | 8/1973 | Risener | ................. | B67D 1/0829 222/85 |
| 3,758,219 A * | 9/1973 | Stasio | ................. | B42F 13/408 402/80 L |
| 3,812,273 A * | 5/1974 | Schmidt | ............. | B60H 1/32331 426/433 |
| 3,874,314 A * | 4/1975 | Sanders | ............. | B63B 35/4413 114/265 |
| 3,880,182 A * | 4/1975 | Johnston | ................. | B67C 3/30 137/212 |
| 3,901,137 A * | 8/1975 | Jimenez | ................. | A21C 9/061 99/353 |
| 3,913,608 A * | 10/1975 | Johnston | ............... | B67D 1/0831 137/322 |
| 3,926,538 A * | 12/1975 | Welt | ................. | F01C 19/04 418/115 |
| 3,952,918 A * | 4/1976 | Poitras | ................. | B67B 7/28 222/82 |
| 3,964,636 A * | 6/1976 | Rehrig | ................. | B65D 77/06 220/495.06 |
| 4,101,140 A * | 7/1978 | Reid | ................. | F16J 15/32 277/461 |
| 4,116,451 A * | 9/1978 | Nixon | ................. | F16J 15/30 277/554 |
| 4,129,306 A * | 12/1978 | Konno | ................. | B01F 7/06 277/507 |
| 4,149,556 A * | 4/1979 | Schwabe | ........... | A61M 16/0051 128/202.22 |
| 4,158,329 A * | 6/1979 | McKnight | ............... | A47J 31/02 426/433 |
| 4,169,605 A * | 10/1979 | Nishimoto | ........... | F16J 15/3448 277/353 |
| 4,195,559 A * | 4/1980 | Bardsley | ............. | A47J 37/1214 99/353 |
| 4,331,434 A * | 5/1982 | Buschor | ................. | B65B 61/184 493/135 |
| 4,336,676 A * | 6/1982 | Artzer | ................. | B29C 69/001 52/309.7 |
| 4,349,714 A * | 9/1982 | Tamano | ................. | A23L 3/365 219/682 |
| 4,375,864 A * | 3/1983 | Savage | ................. | B65D 77/067 222/81 |
| 4,384,724 A * | 5/1983 | Derman | ................. | F16J 15/40 277/431 |
| 4,398,731 A * | 8/1983 | Gorman | ................. | F16J 15/22 277/529 |
| 4,437,499 A * | 3/1984 | Devale | ................. | B67D 1/1236 141/198 |
| 4,440,319 A * | 4/1984 | Nitchman | ................. | B67D 1/04 222/131 |
| 4,457,454 A * | 7/1984 | Meshberg | ........... | B05B 11/3028 222/95 |
| 4,548,191 A * | 10/1985 | Hwang | ................. | A21B 1/48 126/20 |
| 4,622,891 A * | 11/1986 | Cramer | ................. | A21C 15/002 99/450.4 |
| 4,679,496 A * | 7/1987 | Simelunas | ........... | A23G 3/2007 99/450.2 |
| 4,687,119 A * | 8/1987 | Juillet | ................. | G07F 9/105 221/101 |
| 4,707,150 A * | 11/1987 | Graham | ................. | F16J 15/36 384/477 |
| 4,711,165 A * | 12/1987 | Codino | ................. | A21C 9/045 99/353 |
| 4,722,001 A * | 1/1988 | Rohrich | ................. | G01M 3/005 348/84 |
| 4,772,134 A * | 9/1988 | Jensen | ................. | A61F 5/4404 383/127 |
| 4,784,053 A * | 11/1988 | Barnhart | ................. | A23L 3/04 426/407 |
| 4,790,453 A * | 12/1988 | Fontana | ................. | B65D 47/38 222/83 |
| 4,858,524 A * | 8/1989 | Simelunas | ........... | A23G 3/2007 99/450.2 |
| 4,944,218 A * | 7/1990 | Cresson | ................. | G07F 9/105 99/357 |
| 5,027,698 A * | 7/1991 | Chirnomas | ............. | A23G 9/28 99/450.1 |
| 5,048,719 A * | 9/1991 | Empl | ................. | G07F 11/58 221/119 |
| 5,127,318 A * | 7/1992 | Selby, III | ............ | A47J 31/0663 99/295 |
| 5,152,244 A * | 10/1992 | Jarmillo, Jr | ............. | B63B 27/14 114/362 |
| 5,184,476 A * | 2/1993 | Desrosiers | ................. | B67D 1/06 62/389 |
| 5,205,440 A * | 4/1993 | Matsushita | .......... | B67D 1/0835 222/83 |
| 5,224,415 A * | 7/1993 | McFadden | ........... | A47J 37/1228 221/150 HC |
| 5,309,821 A * | 5/1994 | Knepler | ................. | A47J 31/467 392/450 |
| 5,363,747 A * | 11/1994 | Clark | ................. | B01F 15/0288 366/149 |
| 5,423,248 A * | 6/1995 | Smith | ................. | A21B 1/245 126/21 A |

(56) References Cited

U.S. PATENT DOCUMENTS

| | | | | |
|---|---|---|---|---|
| 5,427,016 A * | 6/1995 | Dunckel | A23B 5/0057 | 99/355 |
| 5,440,972 A * | 8/1995 | English | A47J 31/5253 | 99/282 |
| 5,478,189 A * | 12/1995 | Agtuca | B60P 1/52 | 414/529 |
| 5,484,538 A * | 1/1996 | Woodward | A47J 31/605 | 210/767 |
| 5,513,768 A * | 5/1996 | Smith | B01L 3/50825 | 215/278 |
| 5,597,597 A * | 1/1997 | Newman | A23B 4/015 | 250/453.11 |
| 5,660,506 A * | 8/1997 | Berge | F25C 5/20 | 406/3 |
| 5,772,665 A * | 6/1998 | Glad | A61M 5/284 | 604/82 |
| 5,806,550 A * | 9/1998 | Frank | A23G 9/045 | 137/7 |
| 5,926,953 A * | 7/1999 | Behar | B05B 11/3025 | 29/888.02 |
| 5,957,328 A * | 9/1999 | Osgar | B67D 7/344 | 222/1 |
| 6,080,963 A * | 6/2000 | Cardillo | A47J 37/0842 | 219/388 |
| 6,220,047 B1 * | 4/2001 | Vogel | A23G 9/045 | 62/342 |
| 6,284,300 B1 * | 9/2001 | Prendiville | A23N 5/00 | 426/481 |
| 6,340,449 B1 * | 1/2002 | Gallus | A23L 3/022 | 422/307 |
| 6,357,345 B1 * | 3/2002 | Cusenza | A47J 47/01 | 222/132 |
| 6,365,210 B1 * | 4/2002 | Schaible, II | A21C 11/006 | 426/275 |
| 6,367,371 B1 * | 4/2002 | Ni | A47J 37/042 | 219/389 |
| 6,387,322 B1 * | 5/2002 | Gallus | A23L 3/022 | 422/307 |
| D458,320 S * | 6/2002 | Domingues | D21/578 | |
| 6,439,429 B1 * | 8/2002 | Gross | B65D 41/34 | 222/92 |
| 6,459,919 B1 * | 10/2002 | Lys | F21S 4/28 | 600/407 |
| 6,513,450 B1 * | 2/2003 | Gore | A23B 4/10 | 118/13 |
| 6,549,744 B2 * | 4/2003 | Terazawa | B65D 77/06 | 399/262 |
| 6,609,636 B1 * | 8/2003 | Petriekis | B65D 77/065 | 222/105 |
| 6,669,051 B1 * | 12/2003 | Phallen | B67C 3/281 | 222/1 |
| 6,777,007 B2 * | 8/2004 | Cai | A47J 31/0647 | 426/78 |
| 6,830,239 B1 * | 12/2004 | Weber | A23G 9/045 | 261/121.1 |
| 7,008,657 B2 * | 3/2006 | Falk | A23L 13/00 | 426/233 |
| 7,174,830 B1 * | 2/2007 | Dong | B25J 9/0084 | 901/1 |
| 7,461,585 B2 * | 12/2008 | Nenov | A47J 31/005 | 99/282 |
| 7,506,577 B2 * | 3/2009 | Maver | A47J 31/3623 | 99/289 R |
| 7,577,498 B2 * | 8/2009 | Jennings | B25J 9/0084 | 141/100 |
| 7,677,158 B2 * | 3/2010 | McDuffie | A47J 31/5253 | 99/302 R |
| 7,784,396 B2 * | 8/2010 | Fai | A47J 31/3685 | 99/295 |
| 7,858,130 B2 * | 12/2010 | Malenke | B65G 59/04 | 426/231 |
| 7,870,822 B2 * | 1/2011 | Adams | A23L 3/3589 | 99/516 |
| 7,963,048 B2 * | 6/2011 | Pollard | F26B 15/12 | 34/396 |
| 8,091,471 B2 * | 1/2012 | Larsen | B01F 7/00275 | 99/357 |
| 8,276,505 B2 * | 10/2012 | Buehler | A47J 44/00 | 99/326 |
| 8,276,506 B2 * | 10/2012 | Tojo | A47J 36/165 | 99/334 |
| 8,479,643 B2 * | 7/2013 | Aemisegger | A47J 31/46 | 99/302 R |
| 8,500,993 B2 * | 8/2013 | Davis | C02F 1/008 | 210/104 |
| 8,511,105 B2 * | 8/2013 | Kamen | C02F 1/048 | 62/285 |
| 8,652,412 B2 * | 2/2014 | Hyde | B65B 55/02 | 422/292 |
| 8,820,219 B2 * | 9/2014 | Buehler | A47J 44/00 | 99/334 |
| 8,875,414 B2 * | 11/2014 | Blomquist | F26B 15/14 | 34/396 |
| 8,888,963 B2 * | 11/2014 | Kamen | B01D 1/2887 | 202/185.1 |
| 8,960,078 B2 * | 2/2015 | Hristov | A47J 31/0673 | 99/323 |
| 9,131,807 B2 * | 9/2015 | Roy | A47J 44/00 | |
| 9,309,104 B2 * | 4/2016 | Kamen | B01D 1/28 | |
| 9,327,957 B2 * | 5/2016 | Orita | B67D 3/0009 | |
| 9,445,614 B2 * | 9/2016 | Storek | A23L 5/55 | |
| 9,994,437 B2 * | 6/2018 | Showalter | B67D 1/0004 | |
| 10,022,614 B1 * | 7/2018 | Tran | G16H 50/70 | |
| 10,040,042 B2 | 8/2018 | Showalter | | |
| 10,155,174 B2 * | 12/2018 | Kamen | B67D 1/0014 | |
| 10,259,699 B2 * | 4/2019 | Showalter | B01F 3/04794 | |
| 10,442,670 B2 * | 10/2019 | Mack | G06Q 10/043 | |
| 10,647,564 B2 * | 5/2020 | Showalter | B01F 15/0212 | |
| 2001/0007270 A1 * | 7/2001 | Balduin | B32B 17/10844 | 156/99 |
| 2001/0035016 A1 * | 11/2001 | Weber | A23G 9/045 | 62/210 |
| 2002/0009525 A1 * | 1/2002 | Janecka | A21D 13/32 | 426/138 |
| 2002/0071893 A1 * | 6/2002 | Taylor | A21D 13/22 | 426/446 |
| 2002/0134371 A1 * | 9/2002 | Ward | A21B 1/48 | 126/299 R |
| 2003/0080644 A1 * | 5/2003 | Nelson | H02K 7/14 | 310/196 |
| 2003/0098320 A1 * | 5/2003 | Phelps | B67D 1/0858 | 222/400.7 |
| 2003/0152679 A1 * | 8/2003 | Garwood | B65D 81/264 | 426/392 |
| 2003/0165602 A1 * | 9/2003 | Garwood | B65D 81/267 | 426/392 |
| 2003/0170357 A1 * | 9/2003 | Garwood | B65D 81/268 | 426/392 |
| 2003/0170359 A1 * | 9/2003 | Garwood | A23L 13/00 | 426/392 |
| 2003/0175392 A1 * | 9/2003 | Garwood | A23B 4/10 | 426/392 |
| 2003/0185937 A1 * | 10/2003 | Garwood | A23L 13/00 | 426/35 |
| 2003/0185948 A1 * | 10/2003 | Garwood | A23L 1/31 | 426/392 |
| 2003/0230200 A1 * | 12/2003 | Cheung | A47J 37/045 | 99/419 |
| 2004/0025317 A1 * | 2/2004 | Belt | B65D 73/0028 | 29/428 |
| 2004/0025712 A1 * | 2/2004 | Jarvenkyla | A21C 9/08 | 99/443 C |
| 2004/0037931 A1 * | 2/2004 | Zimmerman | A23P 20/12 | 426/293 |
| 2004/0055473 A1 * | 3/2004 | Stoner | A47J 31/3685 | 99/295 |

(56) References Cited

U.S. PATENT DOCUMENTS

| | | | | |
|---|---|---|---|---|
| 2004/0081729 A1* | 4/2004 | Garwood | B65D 81/28 | 426/235 |
| 2004/0129150 A1* | 7/2004 | Lancaster | B65G 61/00 | 99/486 |
| 2004/0139861 A1* | 7/2004 | Dove | A47J 37/1214 | 99/404 |
| 2004/0146602 A1* | 7/2004 | Garwood | B65D 21/062 | 426/35 |
| 2004/0172380 A1* | 9/2004 | Zhang | B25J 9/1682 | |
| 2004/0196735 A1* | 10/2004 | Barker | B01F 15/0267 | 366/139 |
| 2005/0045049 A1* | 3/2005 | Muniga | A23P 20/12 | 99/494 |
| 2005/0061831 A1* | 3/2005 | Brown | B65D 11/04 | 222/107 |
| 2005/0120715 A1* | 6/2005 | Labrador | F02C 1/05 | 60/618 |
| 2005/0178277 A1* | 8/2005 | Simonsen | A21C 15/002 | 99/494 |
| 2005/0193901 A1* | 9/2005 | Buehler | A47J 44/00 | 99/468 |
| 2005/0279614 A1* | 12/2005 | Dickinson | B65G 47/252 | 198/603 |
| 2006/0010712 A1* | 1/2006 | Carin | C05F 7/00 | 34/443 |
| 2006/0101881 A1* | 5/2006 | Carin | F26B 23/001 | 71/21 |
| 2006/0107846 A1* | 5/2006 | Foulon | A21C 9/063 | 99/450.1 |
| 2006/0144244 A1* | 7/2006 | Girard | A47J 31/402 | 99/295 |
| 2006/0188337 A1* | 8/2006 | Webb | B67D 1/00 | 405/52 |
| 2007/0039481 A1* | 2/2007 | Pasch | A21C 7/01 | 99/353 |
| 2007/0044341 A1* | 3/2007 | Pollard | F26B 21/02 | 34/201 |
| 2008/0022652 A1* | 1/2008 | Blacklidge | F04B 7/04 | 60/221 |
| 2008/0050211 A1* | 2/2008 | Showalter | B65B 69/0083 | 414/412 |
| 2008/0116041 A1* | 5/2008 | Hall | B65G 47/261 | 198/790 |
| 2008/0128456 A1* | 6/2008 | Grimwade | B67D 1/0462 | 222/399 |
| 2008/0148957 A1* | 6/2008 | Zanetti | A47J 31/3695 | 99/295 |
| 2008/0233019 A1* | 9/2008 | Dean, II | B01D 53/0415 | 422/180 |
| 2008/0272557 A1* | 11/2008 | Foti | D06F 37/00 | 277/589 |
| 2009/0007792 A1* | 1/2009 | Glucksman | A47J 31/057 | 99/282 |
| 2009/0026225 A1* | 1/2009 | Lickstein | B05B 9/0866 | 222/325 |
| 2009/0074902 A1* | 3/2009 | Schultz | A21C 9/08 | 425/371 |
| 2009/0081347 A1* | 3/2009 | Gambino | A47J 37/0676 | 426/523 |
| 2009/0101445 A1* | 4/2009 | Mack | A47G 23/08 | 186/38 |
| 2009/0145306 A1* | 6/2009 | Bearson | A22C 17/0033 | 99/355 |
| 2009/0205509 A1* | 8/2009 | Canicas | G07F 11/58 | 99/357 |
| 2009/0241481 A1* | 10/2009 | Sus | G06Q 50/12 | 53/474 |
| 2009/0252832 A1* | 10/2009 | Falk | A23L 13/45 | 426/59 |
| 2009/0301317 A1* | 12/2009 | Andrews | A23C 3/045 | 99/453 |
| 2010/0048336 A1* | 2/2010 | Mack | F16H 7/1218 | 474/138 |
| 2010/0062169 A1* | 3/2010 | Pierre | B05B 13/0221 | 427/388.1 |
| 2010/0101929 A1* | 4/2010 | Kamen | B67D 1/0862 | 202/185.3 |
| 2010/0124583 A1* | 5/2010 | Medoff | A23K 50/80 | 426/2 |
| 2010/0151094 A1* | 6/2010 | Choudhury | A23N 7/005 | 426/287 |
| 2010/0152880 A1* | 6/2010 | Boyden | A61K 9/1617 | 700/117 |
| 2010/0252583 A1* | 10/2010 | Maas | B65D 83/0055 | 222/386.5 |
| 2010/0304357 A1* | 12/2010 | Meyers | G01N 33/52 | 435/4 |
| 2011/0024423 A1* | 2/2011 | Erspamer | B65D 41/3428 | 220/266 |
| 2011/0042414 A1* | 2/2011 | Tachibana | B67D 1/0864 | 222/129.1 |
| 2011/0121032 A1* | 5/2011 | Deo | B67D 1/0027 | 222/145.1 |
| 2011/0133412 A1* | 6/2011 | Mause | F16C 33/7823 | 277/352 |
| 2011/0167769 A1* | 7/2011 | Canegallo | B65D 75/5883 | 53/469 |
| 2011/0177558 A1* | 7/2011 | Medoff | C05F 17/90 | 435/72 |
| 2011/0226343 A1* | 9/2011 | Novak | B01F 3/04808 | 137/12.5 |
| 2011/0308386 A1* | 12/2011 | Claracq | B03C 3/28 | 95/57 |
| 2012/0017379 A1* | 1/2012 | Moore | D06F 35/001 | 8/137 |
| 2012/0177784 A1* | 7/2012 | Malagi | A23L 2/54 | 426/67 |
| 2012/0196004 A1* | 8/2012 | Pickford | A23L 3/375 | 426/95 |
| 2012/0196005 A1* | 8/2012 | Pickford | A23L 5/11 | 426/96 |
| 2012/0211334 A1* | 8/2012 | Barnes | A47J 37/045 | 198/844.2 |
| 2012/0217265 A1* | 8/2012 | Edwards | B65D 77/067 | 222/105 |
| 2012/0227865 A1* | 9/2012 | Freudinger | A21C 9/04 | 141/177 |
| 2012/0255967 A1* | 10/2012 | Hecht | G07F 11/165 | 221/150 A |
| 2012/0291627 A1* | 11/2012 | Tom | F17C 1/00 | 95/8 |
| 2012/0298676 A1* | 11/2012 | Cooks | B65D 51/28 | 220/592.21 |
| 2012/0305605 A1* | 12/2012 | Vassaux | B67D 1/0005 | 134/93 |
| 2013/0101714 A1* | 4/2013 | Buehler | A47J 44/00 | 426/416 |
| 2013/0108754 A1* | 5/2013 | Blanc | A47J 31/461 | 426/431 |
| 2013/0134072 A1* | 5/2013 | Ackley | B07C 5/3412 | 209/10 |
| 2013/0145936 A1* | 6/2013 | Dollner | A47J 31/4489 | 99/293 |
| 2013/0193164 A1* | 8/2013 | Tom | B32B 1/02 | 222/95 |
| 2013/0199662 A1* | 8/2013 | Gebbink | B67D 7/0294 | 141/2 |
| 2013/0287597 A1 | 10/2013 | McNichol et al. | | |
| 2013/0294189 A1* | 11/2013 | Myrick | B01F 3/0876 | 366/162.4 |
| 2013/0313458 A1* | 11/2013 | Kouketsu | F16K 31/1262 | 251/193 |
| 2013/0345873 A1* | 12/2013 | Blumberg | B25J 9/1676 | 700/259 |
| 2014/0104579 A1* | 4/2014 | Blomquist | G03B 21/14 | 353/28 |

(56) References Cited

U.S. PATENT DOCUMENTS

| | | | |
|---|---|---|---|
| 2014/0137427 A1* | 5/2014 | Binder | F26B 25/003 34/282 |
| 2014/0144935 A1* | 5/2014 | O'Keefe, Jr | B67D 1/0004 222/23 |
| 2014/0154379 A1* | 6/2014 | Mazin | A23B 7/00 426/311 |
| 2014/0154384 A1* | 6/2014 | Vardakostas | A21C 15/002 426/531 |
| 2014/0170280 A1* | 6/2014 | St. Germain | A47J 31/36 426/433 |
| 2014/0175756 A1* | 6/2014 | Ikeda | F16J 15/164 277/552 |
| 2014/0197197 A1* | 7/2014 | Kamen | C02F 1/325 222/52 |
| 2014/0200511 A1* | 7/2014 | Boyden | A61K 9/1641 604/67 |
| 2014/0227411 A1* | 8/2014 | Popeil | A47J 37/1209 426/302 |
| 2014/0231228 A1* | 8/2014 | In'T Hout | E21F 13/08 198/860.2 |
| 2014/0239521 A1* | 8/2014 | Ergican | B67D 1/0058 261/115 |
| 2014/0255257 A1* | 9/2014 | Pawlow | C02F 1/78 422/114 |
| 2014/0291113 A1* | 10/2014 | Theriault | B65G 47/644 198/367 |
| 2014/0314913 A1* | 10/2014 | Stewart | A47J 31/002 426/78 |
| 2014/0324607 A1* | 10/2014 | Frehn | G06Q 50/12 705/15 |
| 2014/0352047 A1* | 12/2014 | Goldsmith | E03C 1/288 4/301 |
| 2014/0363548 A1* | 12/2014 | Njaastad | A23L 2/54 426/231 |
| 2015/0021216 A1* | 1/2015 | Blagojevic | B65D 53/00 206/223 |
| 2015/0050389 A1* | 2/2015 | Stewart | A23F 3/14 426/78 |
| 2015/0053097 A1* | 2/2015 | Vardakostas | A23P 20/20 99/450.4 |
| 2015/0075391 A1* | 3/2015 | Vardakostas | A23P 20/20 99/450.4 |
| 2015/0083250 A1* | 3/2015 | Orita | B67D 3/0022 137/565.17 |
| 2015/0150272 A1* | 6/2015 | Peters | A22C 21/0046 452/149 |
| 2015/0164131 A1* | 6/2015 | Vardakostas | A23P 20/20 99/450.4 |
| 2015/0183535 A1* | 7/2015 | Vardakostas | B65B 5/045 53/459 |
| 2015/0201790 A1* | 7/2015 | Smith | A47J 31/3628 426/431 |
| 2015/0201791 A1* | 7/2015 | Tinkler | A47J 31/469 426/431 |
| 2015/0238045 A1* | 8/2015 | Hansen | A47J 31/60 99/295 |
| 2015/0330822 A1* | 11/2015 | Watson | G01F 15/14 222/424.5 |
| 2015/0342224 A1* | 12/2015 | Medoff | D21C 9/001 426/63 |
| 2015/0345865 A1* | 12/2015 | Rivera | F26B 25/22 198/572 |
| 2016/0101943 A1* | 4/2016 | Guerra | B65G 13/07 198/781.03 |
| 2016/0137474 A1* | 5/2016 | Marantis | A61M 1/0001 141/331 |
| 2016/0167724 A1* | 6/2016 | Kilibarda | B23K 11/115 29/401.1 |
| 2016/0220922 A1* | 8/2016 | Kamen | B01D 1/2887 |
| 2016/0368752 A1* | 12/2016 | Bethuy | B67D 1/0047 |
| 2016/0368753 A1* | 12/2016 | Bethuy | B67D 1/0046 |
| 2017/0362071 A1* | 12/2017 | Showalter | B01F 15/00837 |
| 2018/0257920 A1* | 9/2018 | Showalter | B67D 1/0462 |
| 2019/0047838 A1* | 2/2019 | Mack | G06Q 10/043 |
| 2019/0210861 A1* | 7/2019 | Showalter | B67D 1/0418 |
| 2020/0167722 A1* | 5/2020 | Goldberg | B64C 39/024 |
| 2020/0249660 A1* | 8/2020 | Rao | G05B 19/41865 |
| 2021/0047165 A1* | 2/2021 | Showalter | B67D 1/0004 |

OTHER PUBLICATIONS http://www.kegerators.com/double-tap.php; (See p. 2 of attached NPL No. 1 document).
http://cabanawine.com/WineBall.html; (See p. 3-6 of attached NPL No. 1 document).
http://torrindustries.com/dispensing-options/torr-keg/; (See p. 7 of attached NPL No. 1 document).
http://torrindustries.com/dispensing-options/the-torr-flexcase/; (See p. 8 of attached NPL No. 1 document).
http://www.vinotemp.com/View.aspx/6436/Vinotemp-4-Tap-Wine-Keg-Dispenser?kpid=VT-WINEKEG01&gclid=CIDrqfKR78MCFQmDfgodTAIADQ; (See p. 9 of attached NPL No. 1 document); (See p. 1 of attached NPL No. 1 document).
http://torrindustries.com/dispensing-options/kegerators/; (See p. 10 of attached NPL No. 1 document).
http://www.kegerators.com/equipment/winerator.php; (See p. 11-13 of attached NPL No. 1 document).
http://www.kegerators.com/double-tap.php; (See p. 14-15 of attached NPL No. 1 document).
http://www.thefind.com/search?query=wine+dispenser; (See p. 16-18 of attached NPL No. 1 document and p. 19 of attached NPL No. 2 document)).
http://www.rollergrill-international.com/en/produit/wine-dispenser-3-bags-of-10-l-408.html; (See p. 19 of attached NPL No. 1 document).
http://www.brookstone.com/boxxle-31-box-wine-dispenser; (See p. 20 of attached NPL No. 1 document).
http://boxxle.com; (See p. 21 of attached NPL No. 1 document).
http://boxxle.com/what-is-boxxle/; (See p. 22-24 of attached NPL No. 1 document).
http://the-gadgeteer.com/2013/08/14/boxxle-bag-in-box-wine-dispenser-review/; (See p. 25-26 of attached NPL No. 1 document).
http://www.amazon.com/Vacu-Vin-3646450-Wine-Tender/dp/B001AG576A; (See p. 27-28 of attached NPL No. 1 document).
http://www.lifestylefancy.com/fiduz-bib-wine-dispenser-wine-cell/; (See p. 29 of attached NPL No. 1 document).
http://www.cnet.com/news/how-to-swank-up-that-box-of-franzia/; (See p. 30 of attached NPL No. 1 document).
http://vinocopiabarrel.com/wine-barrel; (See p. 31-32 of attached NPL No. 1 document).
http://www.sterlingwineonline.com/catalog/item/4317986/boxed-wine-dispenser.htm; (See p. 33 of attached NPL No. 1 document).
http://www.sterlingwineonline.com/boxed-wine-dispenser.html; (See p. 34 of attached NPL No. 1 document).
http://www.thegreenhead.com/2012/04/wine-dispensing-oak-barrel.php (See p. 35 of attached NPL No. 1 document).
http://www.vintagecellars.com/keeper; (See p. 36-37 of attached NPL No. 1 document).
http://www.mrfizz.com/winesaver.html; (See p. 38-39 of attached NPL No. 1 document).
http://www.amazon.com/Wine-Dispenser-Preserver-bottle-Oak/dp/B00112OBBU; (See p. 40-41 of attached NPL No. 1 document).
http://www.amazon.com/Vinotemp-VT-WINEDISP4-Bottle-Dispenser-Black/dp/B00307CF5O; (See p. 42-43 of attached NPL No. 1 document).
http://www.vintagecellars.com/winekeeper-preservtion (See p. 1 of attached NPL No. 2 document).
http://www.wineenthusiast.com/eurocave-vin-au-verre-wine-preserver-dispenser.asp; (See p. 2 of attached NPL No. 2 document).
http://www.winekeeper.com/commercial-wk/; (See p. 3 of attached NPL No. 2 document).
http://www.enomatic.com/; (See p. 4 of attached NPL No. 2 document).
http://epourtech.com/products.html; (See p. 5 of attached NPL No. 2 document).

(56) References Cited

OTHER PUBLICATIONS http://epourtech.com/bib.html; (See p. 6 of attached NPL No. 2 document).

http://epourtech.com/accurate.html; (See p. 7-8 of attached NPL No. 2 document).

http://epourtech.com/connectors.html; (See p. 9-10 of attached NPL No. 2 document).

http://epourtech.com/commercial.html; (See p. 11 of attached NPL No. 2 document).

http://www.drvino.com/2010/09/14/self-serve-tanks-wine-french-supermarkets/; (See p. 12-15 of attached NPL No. 2 document).

http://www.winesandvines.com/template.cfm?section=news&content=77028&htitle=Government%20Limits%20Wine%20Dispensers (See p. 16-17 of attached NPL No. 2 document).

www.blackboxwines.com/about-us/opening-storing.html; (See p. 18 of attached NPL No. 2 document).

http://www.sodastreamusa.com/; (See p. 20 of attached NPL No. 2 document).

http://www.botabox.com/Benefits/; (See p. 21 of attached NPL No. 2 document).

http://www.evcontainer.com/; (See p. 22 of attached NPL No. 2 document).

http://elimnatural.en.made-in-china.com/product/NbxQgWuyZjRq/China-Plastic-Beer-Keg.html; (See p. 23 of attached NPL No. 2 document).

www.lairdandcompany.com; (See p. 24 of attached NPL No. 2 document).

http://www.petainer.com/Products/Kegs/Keg-Specification; (See p. 25 of attached NPL No. 2 document).

http://www.syneksystem.com/hs_faq/much-beer-cartridge-hold/; (See p. 26 of attached NPL No. 2 document).

http://www.brevilleusa.com/the-oracle.html; (See p. 27 of attached NPL No. 2 document).

http://www.keurig.com/Brewers/Home/Keurig%C2%AE-2-0-K550-Brewing-System/p/keurig-2-0-k550-brewing-system; (See p. 28 of attached NPL No. 2 document).

http://www.usatoday.com/story/money/business/2014/04/14/coca-cola-coke-freestyle-soft-drinks-beverages/7478341/; (See p. 29-31 of attached NPL No. 2 document).

http://www.wsj.com/articles/superautomatic-espresso-machines-that-are-truly-super-1408723109; (See p. 32 of attached NPL No. 2 document).

\* cited by examiner

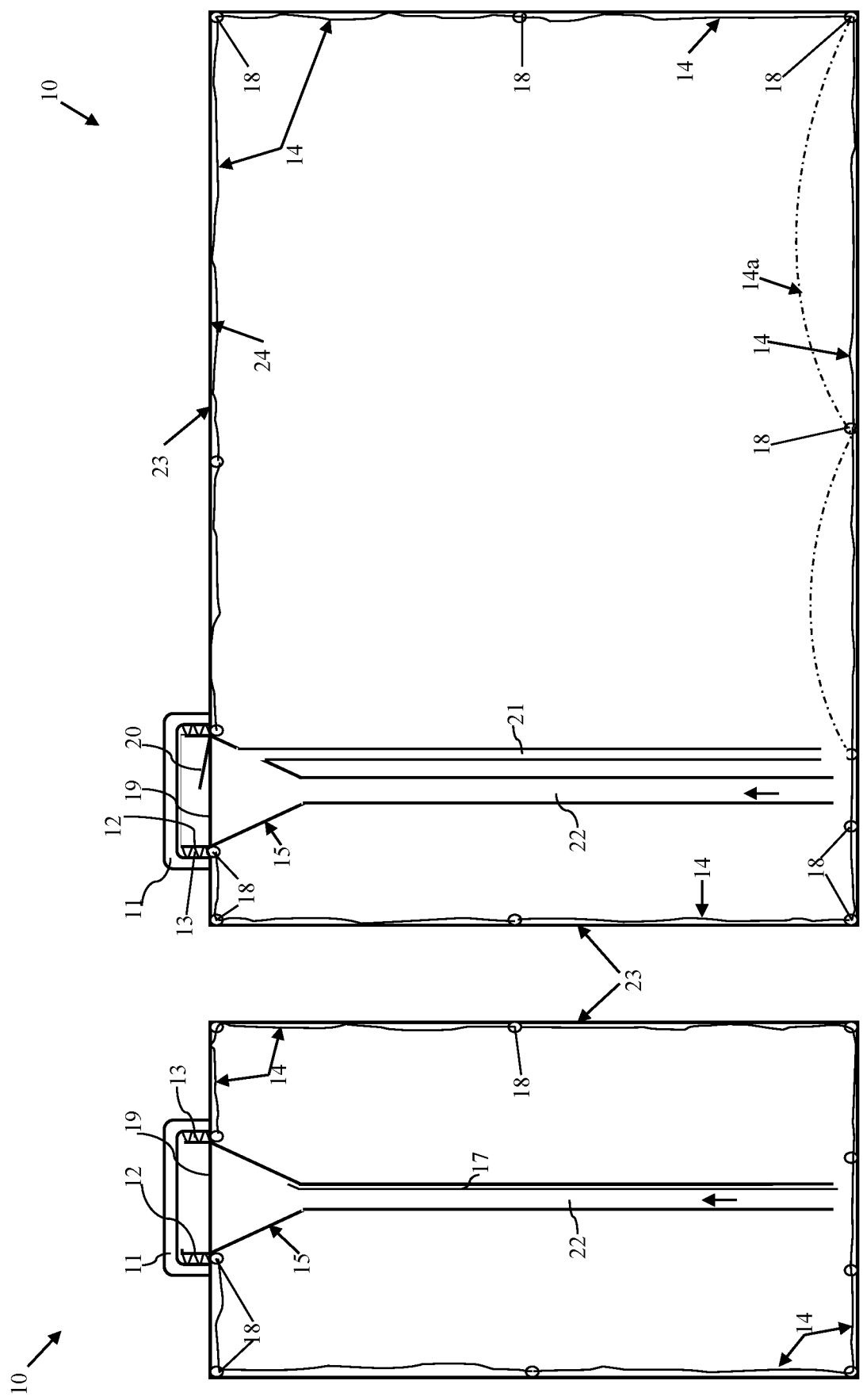

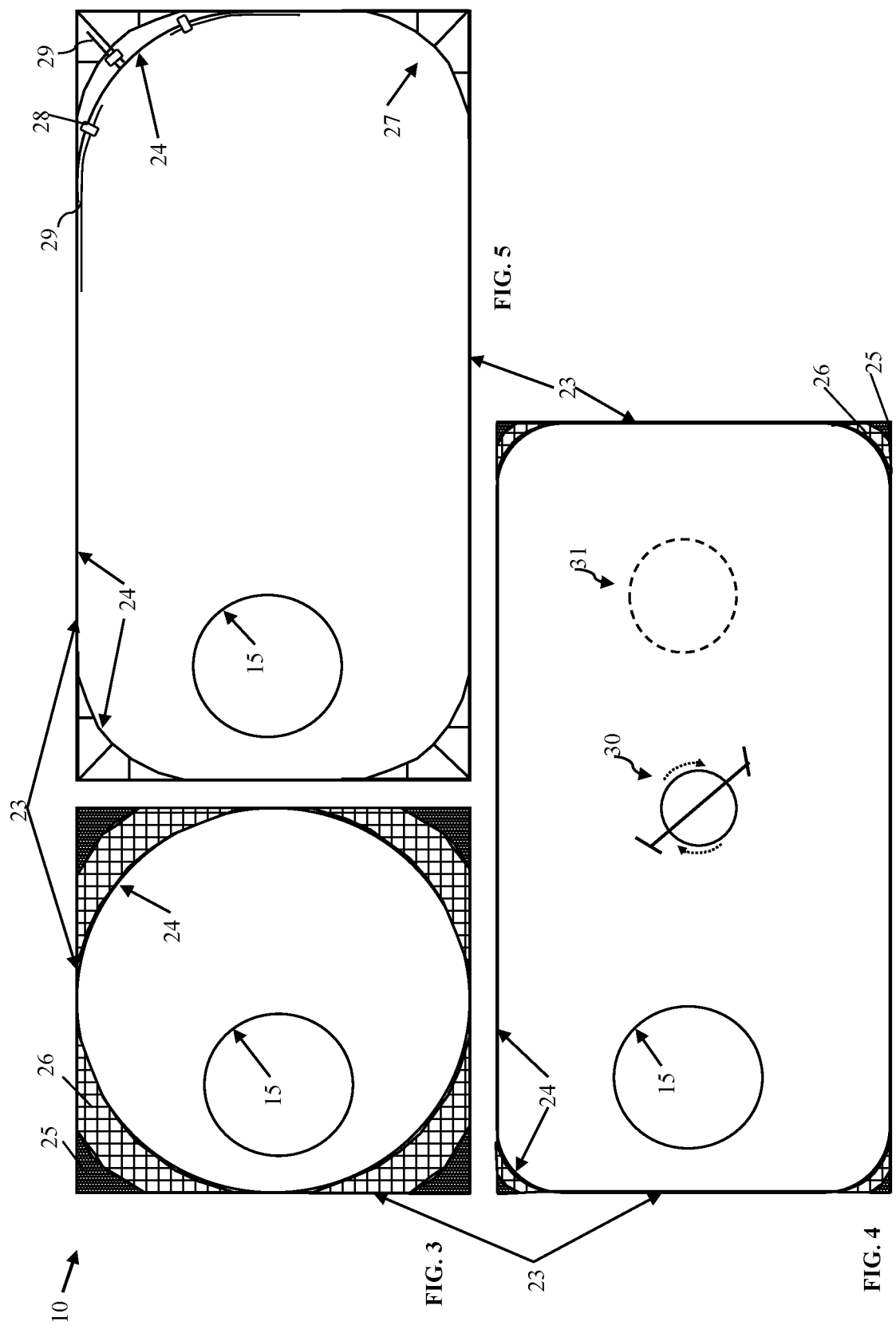

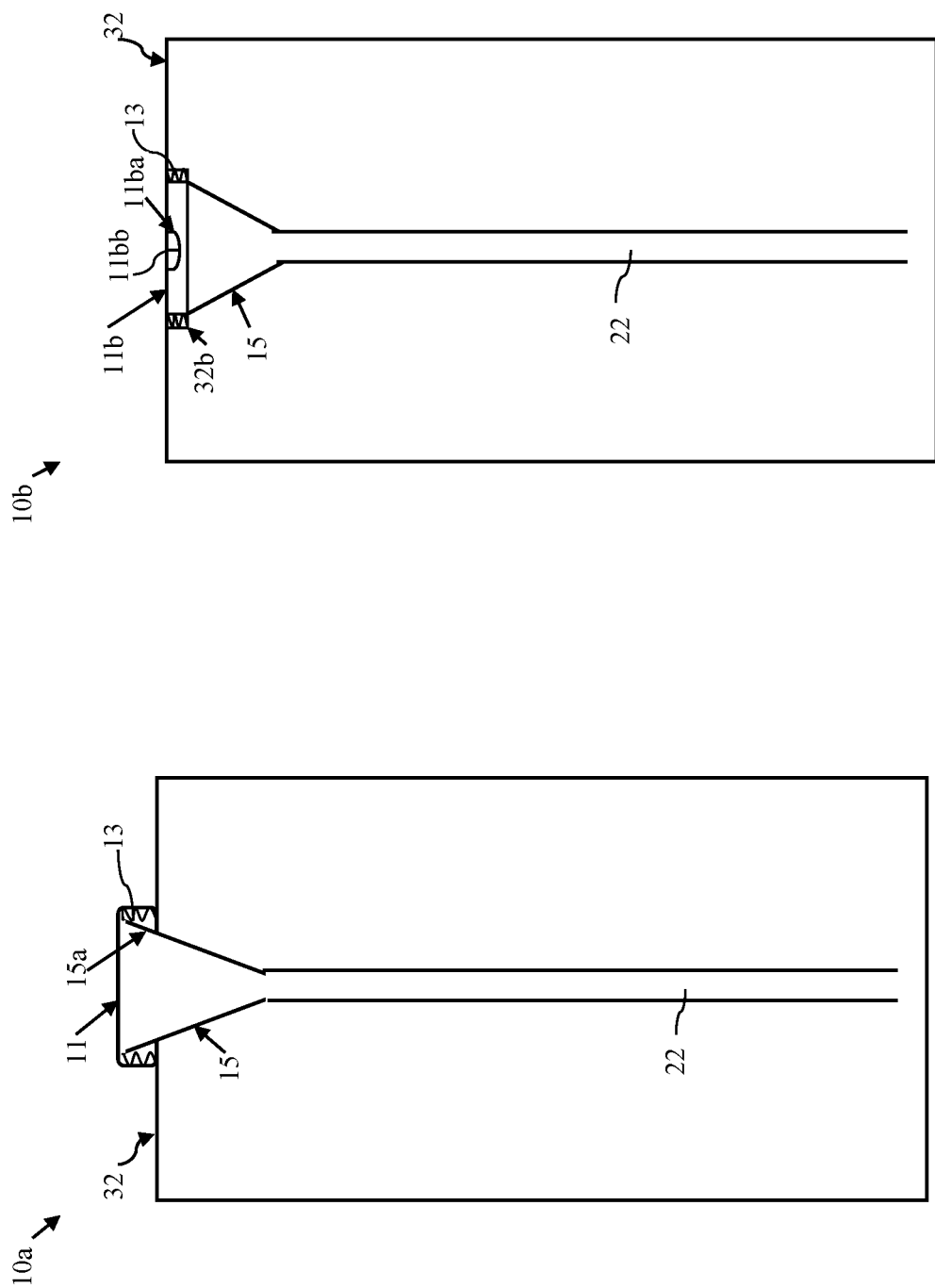

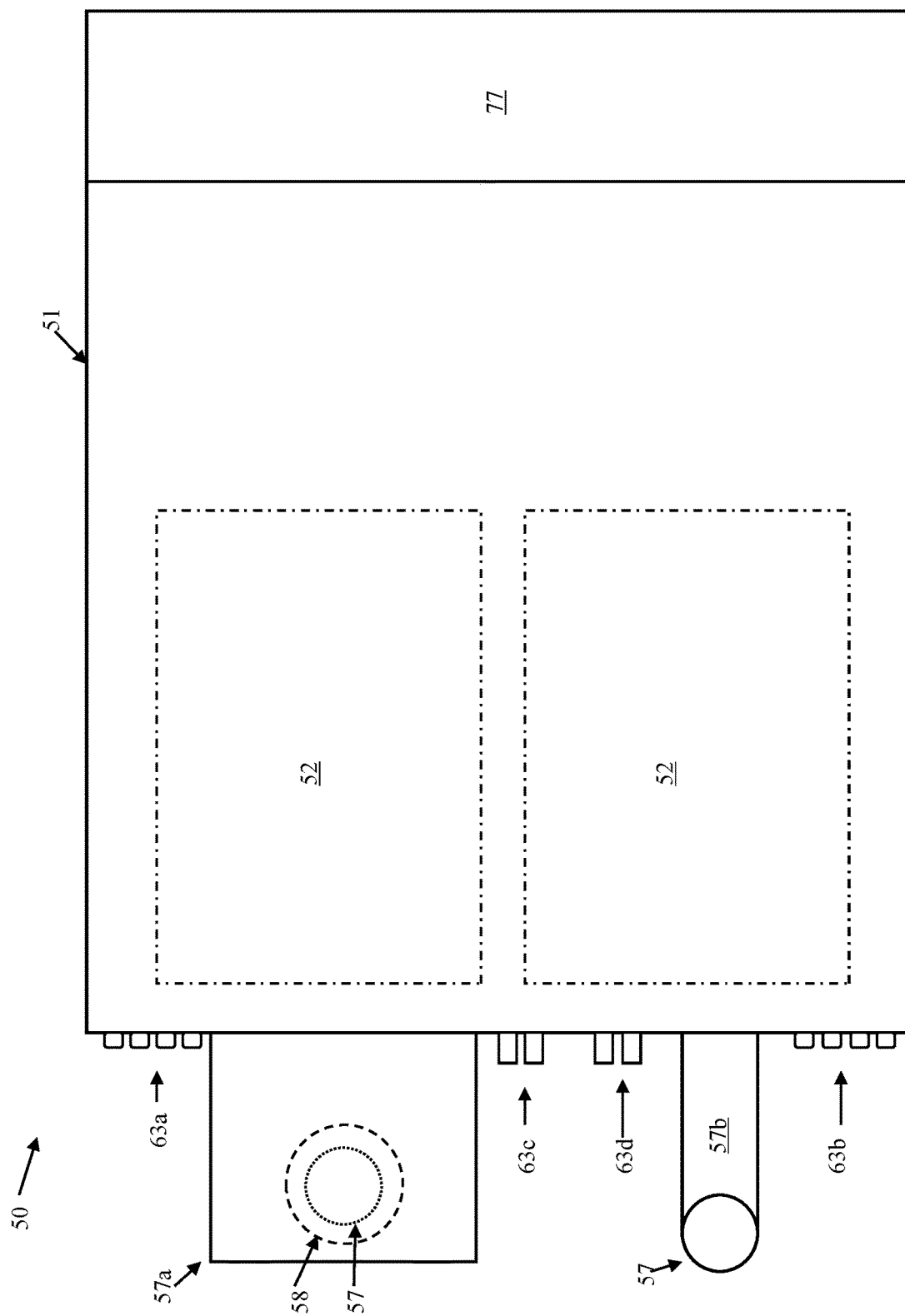

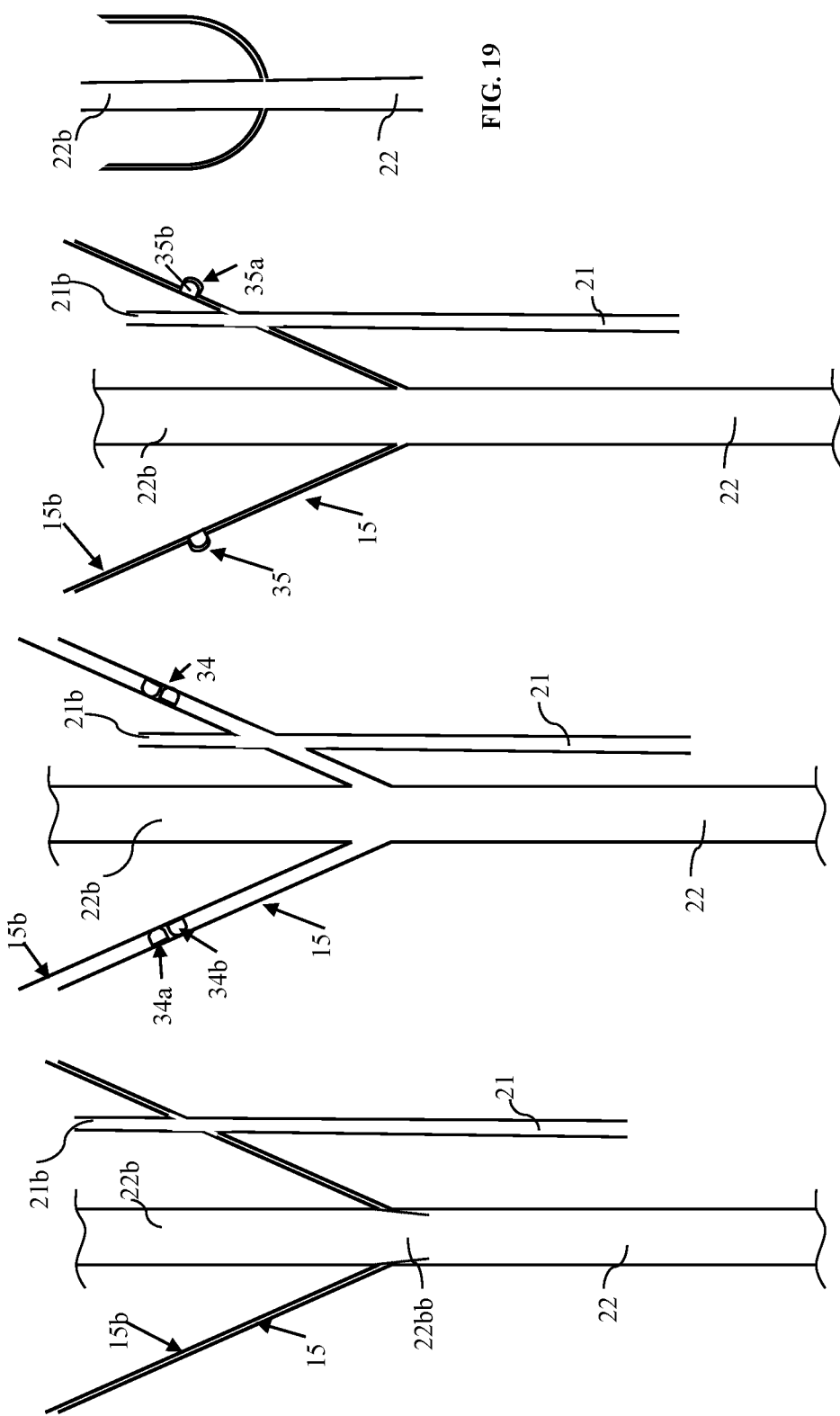

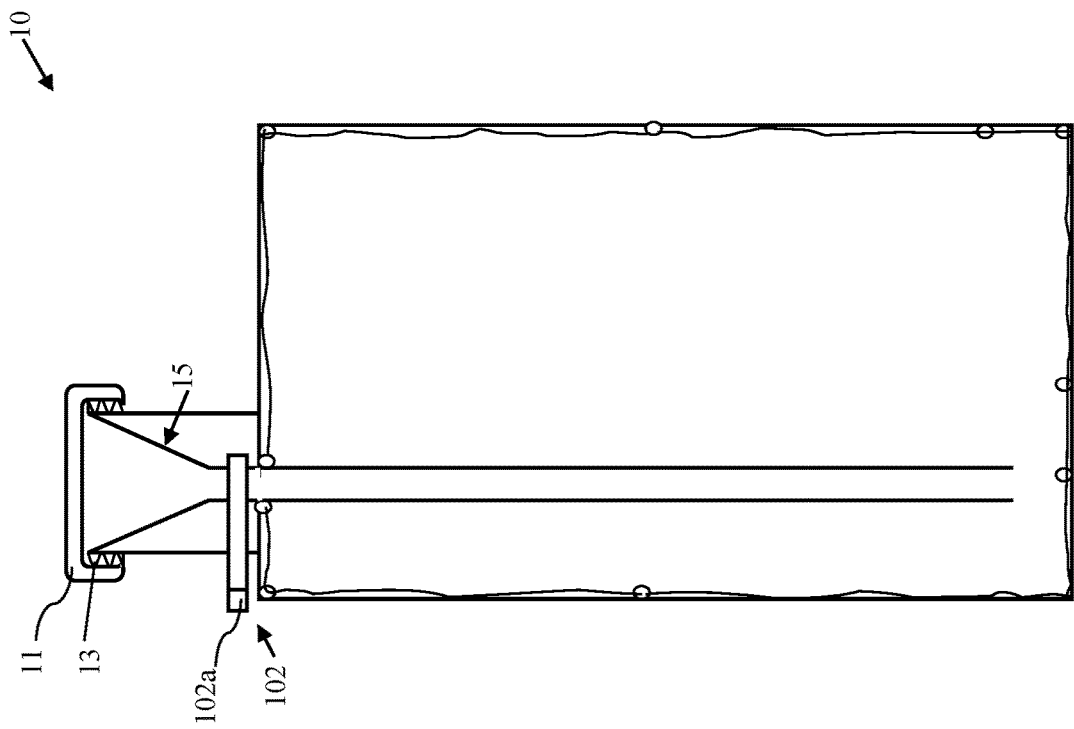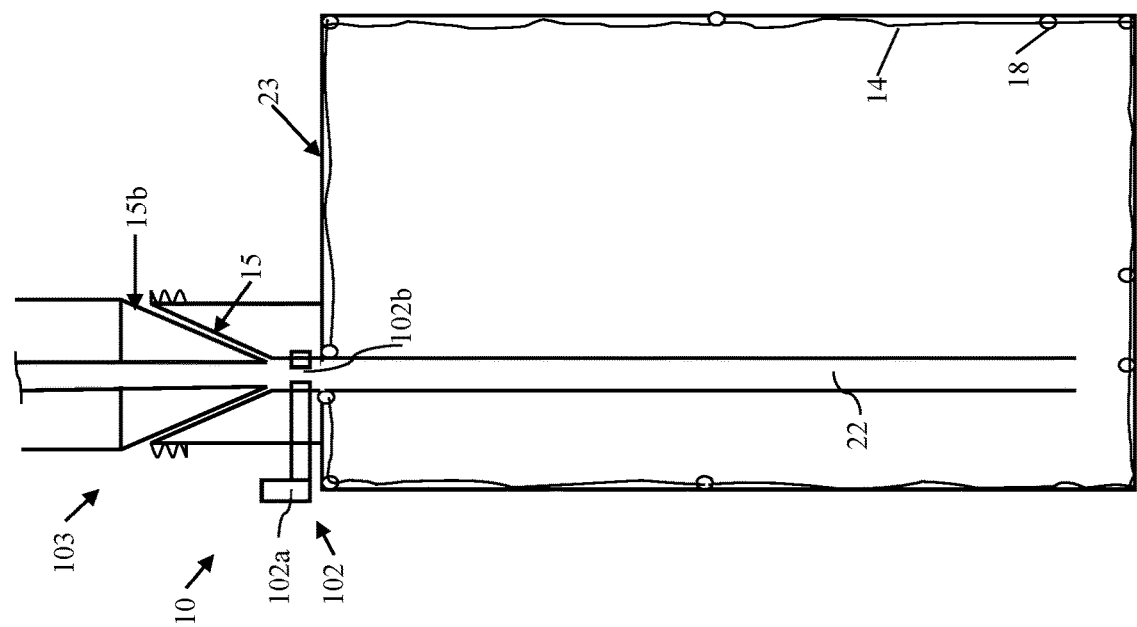

APPARATUS, SYSTEMS AND METHODS FOR PREPARING AND DISPENSING FOODS

CROSS-REFERENCE TO RELATED APPLICATIONS

This application is a continuation-in-part of U.S. Non-Provisional application Ser. No. 16/708,161, filed on Dec. 9, 2019, which is a continuation of U.S. Non-Provisional application Ser. No. 14/586,782, filed on Dec. 30, 2014, which are hereby incorporated by reference, to the extent that they are not conflicting with the present application.

BACKGROUND OF THE INVENTION

1. Field of the Invention

The invention relates generally to apparatuses, systems and methods for making and dispensing liquids and foods, and more particularly to apparatuses, systems and methods for making and dispensing drinks and soft serve foods (e.g., soup, yogurt, etc.) and cooking and dispensing foods.

2. Description of the Related Art

There are several apparatuses, systems and methods for making and dispensing drinks available on the market today. However, they have several limitations. For example, some must use ice to chill beverage as they are not equipped with refrigeration systems to cool the beverages and/or keep them at a set or selected temperature. Others cannot brew hot beverages. Others can't mix beverages. Likewise, other beverage dispensers can't dispense both hot and chilled beverage from same spout. To accommodate all beverages, users might have to purchase four, five, six, seven, eight or more dispensers. That can be very expensive and also very inconvenient, to, for example, store all of those dispensers.

Some require steel kegs that need to be returned for washing and refilling. Large amounts of dollars are spent with water waste, carbon footprint and transportation. Because of high transportation costs, it is typically cost prohibitive for a beer brewery to ship draft beer from one location around the world. Same it is true for wineries using wine steel and/or plastic kegs.

Thus, there is a need for new and improved apparatus, system and method for making and dispensing drinks and foods that solve the problems described above, by giving the user the versatility, convenience and the efficiency user needs, while enabling the user to be environmentally responsible, by providing a one-size-fits-all, all-in-one beverage and food dispensing system that is eco-friendly. That way, a user only needs one apparatus to prepare, cook, and dispense any beverage and/or food.

BRIEF SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In one exemplary embodiment, a V-friction coupling is provided that establishes airtight seal that allows beverage pumps to pump the beverage and that also prevents air contamination or spoilage of beverage in the provided beverage container or keg. The airtight seal also stops beverage spoilage by oxidation or beverage to go flat in taste. Further, it may prolong the life of beverage in some cases, like in the case of wine, beer or soda. Another advantage is that the same beverage pour spout of the provided dispensers may be operated with hot or chilled, carbonated or non-carbonated beverage.

In another exemplary embodiment, the beverage pour housing of the dispenser can be used with or without flavored pod. For example, the user could place a wine keg in a bay chamber of the dispenser, set the temperature for that chamber at preferred level and dispense wine. If user decides to remove the wine box from that chamber and install a box of spring water, the user can make and dispense hot beverage or cold beverages.

In another exemplary embodiment, the beverage heater and the pump are part of top lift lid of dispenser, such that the beverage pump draws the beverage from the keg/beverage container and pushes it through the heater. User however can select hot or chilled beverage via dispenser's controls or via smart phone app controls. If chilled beverage is selected, the beverage heater is not turned on. If user selects hot beverage, heater turns on making the beverage hot.

In another exemplary embodiment, a $CO_2$ control valve selector is provided allowing for carbonation to flow into beverage keg, or stopping flow of $CO_2$ gas, allowing for the dispensing of a non-carbonated beverage, such as milk or wine.

In another exemplary embodiment, each chamber of the dispenser is independently controlled, so that each chamber can be set to maintain different temperatures.

In another exemplary embodiment, the beverage container is a disposable, one-way container, made of biodegradable materials. Among other advantages, this provides the advantage of lower shipping cost due to less weight of packaging.

In another exemplary embodiment, a self-cooking, self-cleaning, temperature-controlled self-preparing apparatus is provided, comprising: a housing; a plurality of cooling chambers, a plurality of cooking chambers, a plurality of storage chambers, a plurality of primary dispensing chambers, and a plurality of secondary dispensing chambers each disposed in a column arrangement within the housing; wherein each storage chamber of the plurality of storage chambers is disposed at a front of the housing, and each secondary dispensing chamber of the plurality of secondary dispensing chambers is disposed and attached beneath each storage chamber; wherein each cooling chamber is disposed above each cooking chamber, and each cooking chamber is disposed above each primary dispensing chamber; each cooling chamber being connected to the cooking chamber below via a top flow portal, and each cooking chamber being connected to the primary dispensing chamber below via a bottom flow portal; at least one food container adapted to store the food product, the at least one food container being disposed within at least one of the plurality of cooling chambers; a plurality of mixer augers disposed within the at least one food container, the plurality of mixer augers being adapted to transfer the food product from the at least one food container to at least one of the plurality of cooking chambers via the top flow portal; a series of induction plates adapted to be heated by a series of induction energizers, the series of induction plates and induction energizers being associated with each cooking chamber for cooking of the food product; and roller conveyor tables disposed within the pluralities of primary and secondary dispensing chambers, the roller conveyor tables each being adapted to traverse the at least one container from one roller conveyor table to another, such that the at least one container can receive the cooked food product from any of the plurality of cooking chambers. Thus, an advantage is the accurate and effective dispensing of a precise amount of user-specified foods and/or liquids into the user's bowl-container. Another advantage is that the foods and/or liquids being stored within each temperature-controlled cooling chamber may have extended shelf lives, which may decrease the amount of food and/or liquid that gets wasted or becomes spoiled. An advantage of the column arrangement is that the primary mechanism by which foods and beverages are moved, transferred, and dispensed within the apparatus is gravity, such that no additional pumping or suction components are necessary. An additional advantage is the ability to cook a wide variety of food types and styles using any preferred cooking method, all in a single, easy-to-use, autonomous apparatus.

In another exemplary embodiment, a self-cooking, self-cleaning apparatus is provided, comprising: a housing; a plurality of cooling chambers, a plurality of cooking chambers, and a plurality of dispensing chambers each disposed in a column arrangement within the housing; wherein each cooling chamber is disposed above each cooking chamber, and each cooking chamber is disposed above each primary dispensing chamber; each cooling chamber being connected to the cooking chamber below via a top flow portal, and each cooking chamber being connected to the primary dispensing chamber below via a bottom flow portal; at least one food container adapted to store the food product, the at least one food container being disposed within at least one of the plurality of cooling chambers and being adapted to transfer the food product into at least one of the plurality of cooking chambers below; a series of induction plates adapted to be heated by a series of induction energizers, the series of induction plates and induction energizers being associated with each cooking chamber for cooking of the food product; a plurality of high-pressure spray nozzles each disposed within each of the plurality of cooking chambers, each of the plurality of high-pressure spray nozzles being adapted to inject hot water mixed with sanitizing agents into each cooking chamber; and a garbage disposal system having a disposal chamber disposed adjacent to each of the plurality of cooking chambers. Thus, an advantage is that a user need not manually wash and clean the cooking chamber after use, saving time and effort, and reducing associated labor and operational costs.

In another exemplary embodiment, a self-cooking, self-dispensing apparatus is provided, the apparatus comprising: a housing; a plurality of dispensing chambers disposed within the housing; and a plurality of roller conveyor tables, each disposed below one of the plurality of dispensing chambers, the plurality of roller conveyor tables being adapted to traverse the container from one roller conveyor table to another, such that the container can receive the food product from any of the plurality of dispensing chambers. Thus, an advantage is that the conveyor system may allow for precise positioning of a user's container for food and/or liquid dispensing. Another advantage is the ability to prepare, cook, and dispense multiple meals at once, such that multiple users may receive their meals in a timely and efficient manner.

The above embodiments and advantages, as well as other embodiments and advantages, will become apparent from the ensuing description and accompanying drawings.

BRIEF DESCRIPTION OF THE DRAWINGS

For exemplification purposes, and not for limitation purposes, embodiments of the invention are illustrated in the figures of the accompanying drawings, in which:

FIG. 1 illustrates a front sectional view of a drink container, according to an embodiment.

FIG. 2 illustrates a side sectional view of the drink container from FIG. 1, according to an embodiment.

FIGS. 3-5 illustrate top sectional views of the drink container from FIG. 1, depicting certain aspects, according to several embodiments.

FIGS. 8-9 illustrate front sectional views of alternative embodiments of a drink container.

FIG. 15 illustrates a top view of a drink dispenser having two chambers, according to an embodiment.

FIGS. 16-19 illustrate sectional views of male-female couplings, according to several embodiments.

FIG. 29 illustrates a side sectional view of a drink container during filling at factory, according to an embodiment.

FIG. 30 illustrates a side sectional view of the drink container from FIG. 29 ready for shipping, according to an embodiment.

DETAILED DESCRIPTION OF THE PREFERRED EMBODIMENTS

Figure 7:
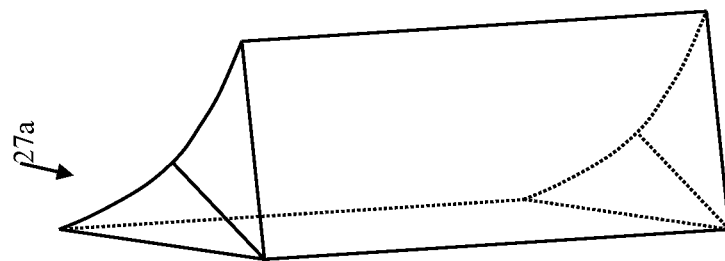
FIG. 7 illustrates a fixed, non-adjustable corner brace for the drink container from FIG. 1, according to an embodiment.

What follows is a detailed description of the preferred embodiments of the invention in which the invention may be practiced. Reference will be made to the attached drawings, and the information included in the drawings is part of this detailed description. The specific preferred embodiments of the invention, which will be described herein, are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 illustrates a front sectional view of a drink container, according to an embodiment. FIG. 2 illustrates a side sectional view of the drink container from FIG. 1, according to an embodiment. It should be understood that while the container 10 will be described herein as a drink container, its uses may be expanded to other liquids (e.g., cooking oil, motor oil), pastes or viscous materials (e.g., liquid soap, ketchup), or soft serve foods (e.g., soups, smoothies, ice cream, yogurt, etc.) to take advantage of its unique features, such as the V-coupling. As shown, the drink container 10 may be a rectangular box or keg having an exterior surface 23 and an interior surface 24. The drink container 10 may also be square. The drink container 10 may be made from biodegradable cardboard or recyclable plastic that is strong enough to maintain the container's shape. The drink container 10 may have a spout 12, which, after filling the container with the drink, is preferably airtight sealed by a foil seal 19 and more preferably also using a pet cock valve 102 (see FIG. 29). The valve 102 holds the seal until user installs container 10 into the dispenser, as shown, and as it will be described in more details later when referring to FIGS. 29-32. The foil seal 19 may be removed by a user by pulling on the seal tab 20. On the outside, the spout 12 may have threads 13 corresponding with the threads of a cap 11, such that to allow a user to fasten the cap 11 onto the spout 12 or to remove it when necessary.

The container 10 further includes a V-shape female coupling 15 made of hard plastic for example, which communicates at its upper end with the spout 12 and at its lower end with a beverage well tube 22. As it will be described in more details later in this disclosure, the V-shape (e.g., funnel shape) female coupling 15 is configured to receive a corresponding V-shape male coupling 15b (see FIG. 16 for example) to quickly create a friction air tight seal under the influence of a weight load applied to the V-shape male coupling.

A plastic liner bag 14, preferably biodegradable, is also preferably provided to receive and hold the drink (e.g., wine) stored in container 10. As shown, the plastic liner bag 14 is preferably fasten, using glue for example, to the interior wall 24 of the container 10 at several fastening locations 18, including the corners of the container 10. During the removal (e.g., pumping it out by suction) of the liquid/drink from box 10, the liner bag 14 may have the tendency to move away from the interior wall 24 of container 10, as shown at 14a. Thus, without the fastening points 18, the liner bag 14 may clog the well tube 22. The clogging of the well tube 22 is prevented by the fastening points 18, and as such, the drink is able to flow easily through the well tube 22 out of container 10.

As shown, the container 10 may be equipped with a beverage level sensor strip 17, which, as it will be described in more detail later when referring to FIG. 22, may assist a user in knowing the level of beverage remaining in the container 10 during use and/or alert the user to acquire a new/filled container. Furthermore, the container 10 may be also equipped with a container CO2 line 21 for use with carbonated beverages. The operation and functions of these two features of the container 10 will also be described in more details later in this disclosure.

Figure 6:
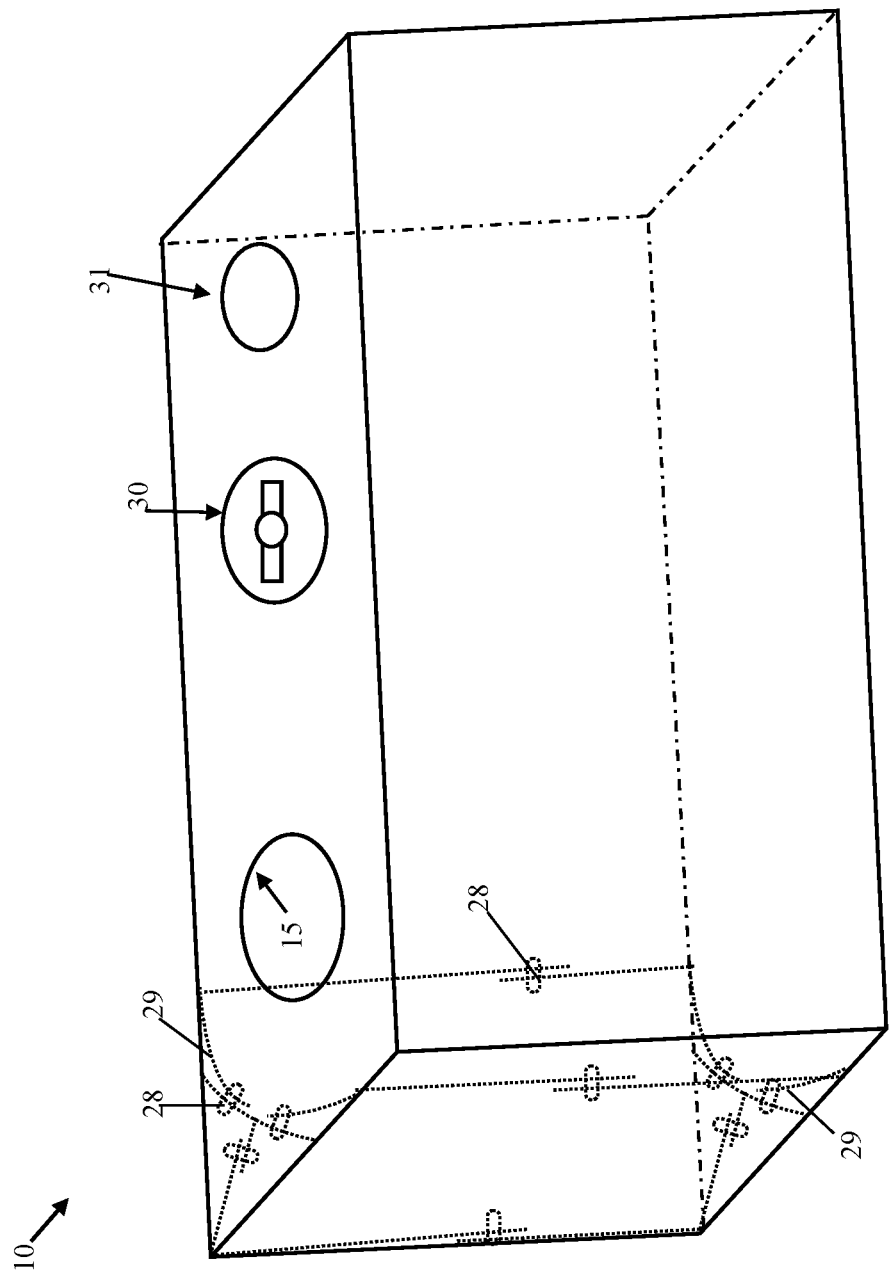
FIG. 6 illustrates a top-side perspective view of the drink container from FIG. 1, depicting certain aspects, according to several embodiments.

FIGS. 3-5 illustrate top sectional views of the drink container from FIG. 1, depicting certain aspects, according to several embodiments. FIG. 6 illustrates a top-side perspective view of the drink container from FIG. 1, depicting certain aspects, according to several embodiments. FIG. 7 illustrates a fixed, non-adjustable corner brace for the drink container from FIG. 1, according to an embodiment. It is known that CO2 (carbon dioxide) and other gases, such as compressed air are typically stored/packaged in cartridges or canister cylinders or the like, so that gas is evenly distributed on the wall of packaging. This is why cylinder shapes of gas containers are typically used, to obtain and maintain equal wall PSI. Right angles in gas containers are typically avoided also because, for example, the gas can be trapped in right angle pockets. Round corners allow the gas to flow easily out of the container.

Thus, when the container 10 is intended to be used for example for carbonated drinks, it may be constructed with fixed or adjustable interior curved corners (see FIGS. 3-7) that are reinforced to hold for example up to 35 PSI. This creates a cylinder effect inside the container/box/keg 10. Thus, the container 10 may be constructed with right angles on the outside, which may be useful for stacking and transportation purposes for example, and round corners on the inside to accommodate the equal distribution of the gas inside. In other words, the inside of the box 10 may be cylinder (see FIG. 3) or oblong (see FIGS. 4-5) shaped, depending on the configuration of the outer skeleton of the container (square, rectangular, etc.).

To reinforce the corners of the container 10 and to obtain the round corners desired, plastic 25 and/or corrugated cardboard 26, or a combination thereof, preferably biodegradable, may be used to fill the corners as shown in FIGS. 3-4 and/or to construct fixed or adjustable braces. The fixed or adjustable corner braces may have solid walls made from plastic and/or cardboard, sample structures of which are shown in FIG. 5 at 27 and in FIG. 7 at 27a.

A container may be made with all corners having fixed corner braces 27, 27a, fastened (e.g., by glue) to them, to obtain inside the cylinder or oblong shape needed to protect the right angle interior corners of the container from gas pressure. Thus, for example in FIG. 3, the exterior surface 23 of the container has a square shape while the interior surface 24 has a cylindrical shape.

Again, the corner braces may also be adjustable to accommodate various container sizes. To accomplish this, as shown for exemplification purposes in FIGS. 5-6, they may be constructed from a plurality of solid walls 29 made from plastic or cardboard that can slide with the aid of the sliding braces 28. The sliding braces 28 also keep the movable walls 29 in place after their sliding in or out. The adjustable corner braces offer the advantage of being capable of being used in different size boxes. Thus, a manufacturer would need only to manufacture a universal, one-size-fits-all adjustable corner brace. It should be observed also that container 10 having a rectangular (or square) shape on the outside and round corners on the inside has the advantage of having more interior volume than a container/box/keg that is round inside and outside (see FIG. 10). Thus, container 10 can carry more beverage than a container/box/keg that is round inside and outside. Further, the manufacturing costs are likely lower for container 10 than a container that is round inside and outside.

It should be noted that, when beverage or CO2, air, or gas is placed inside bladder 14, because of the interior box rounded corner construction, the plastic liner or bladder 14 takes the shape of a balloon which forms a cylinder like beverage packaging similar to a traditional steel keg, plastic soda or beverage bottle, glass bottle, can, etc. The unique rounded and reinforced corners of the container 10 prevent collapse of the container's walls and corners.

At 30 a beverage mixer and at 31 an opening for adding ingredients to the drink inside container are depicted. Both elements will be described in detail later in this disclosure.

FIGS. 8-9 illustrate front sectional views of alternative embodiments of a drink container. The drink container 10a has the V-shape female coupling 15 extending out of the container, above the upper surface 32 of the container 10a. The thread element 13 for fastening cap 11 is provided as shown outside and around the portion 15a of the V-shape female coupling extending out of the container. This configuration may be advantageous for, for example, making it easier for the corresponding V-shape male coupling to slide into the V-shape female coupling 15, without the interference of spout 12 (FIG. 1).

The drink container 10b has a recess 32b, which has the thread element 13 on its vertical surface to enable the receipt and fastening of cap 11b for closing the container 10b. The cap 11b may have a concave portion 11ba divided by a separator 11bb to enable a user to screw/unscrew cap 11b. As shown, V-shape female coupling 15 extends upwards only to the bottom of recess 32b. This configuration may be advantageous for, for example, maximizing the space inside drink dispensers' chambers and for easy stacking of the containers during transportation or storage. This is facilitated by the fact that, as shown, the upper surface of cap 11b is even in this configuration with the upper surface 32 of the container.

Figure 10:
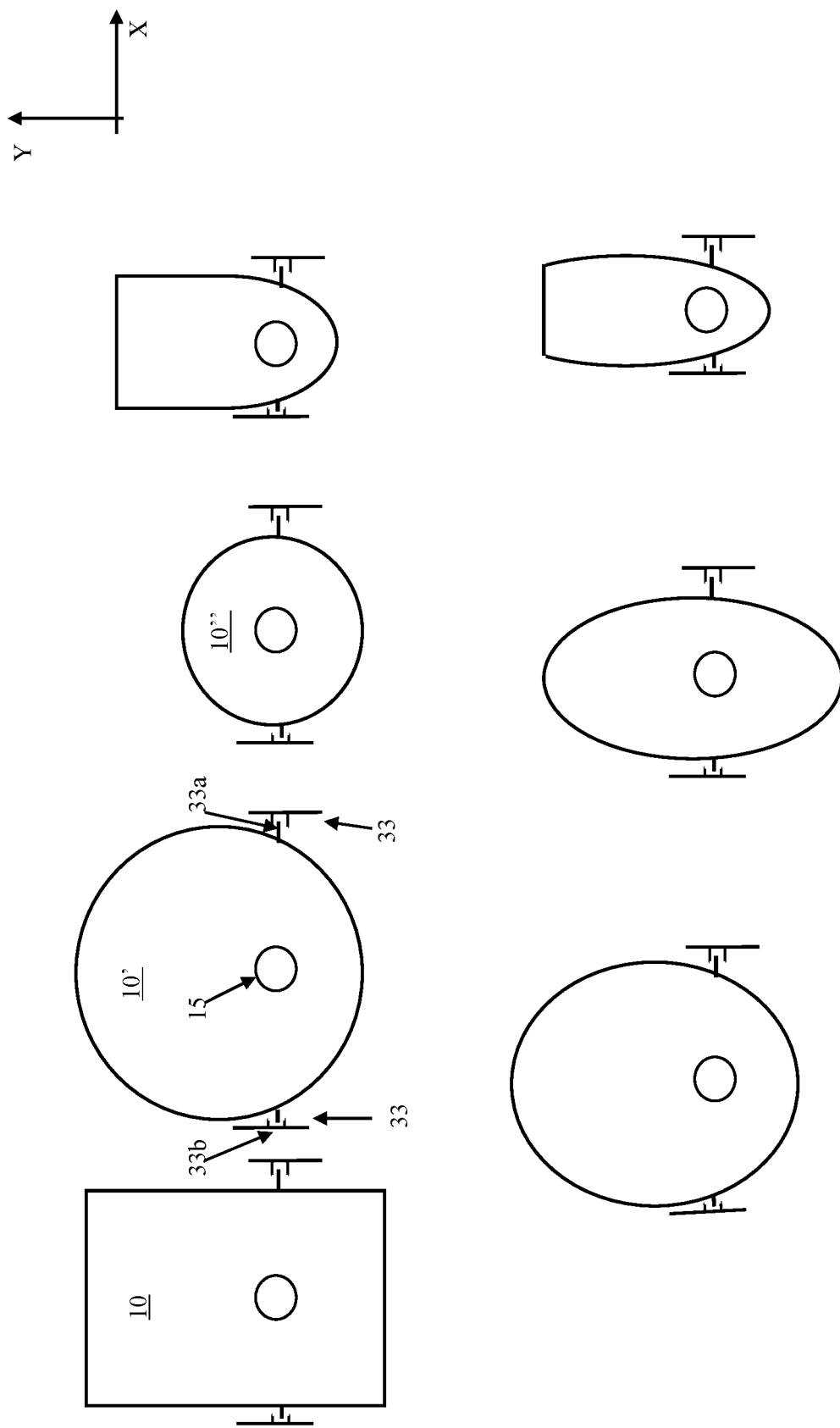
FIG. 10 illustrates top views of alternative embodiments of a drink container.

FIG. 10 illustrates top views of alternative embodiments of a drink container. As illustrated, the drink container may have various sizes and shapes, such as a rectangular (or square) box shape 10, a cylindrical shape 10' and 10" and other shapes as shown in FIG. 10 for exemplification purposes. A rectangular box may be adopted for example for a flat drink, while a container having round corners (e.g., a cylindrical container) may be adopted to carry carbonated drinks, to accommodate the pressurized gas inside as described earlier when referring to FIGS. 3-7. To accommodate for the variation in the drink container's sizes and shapes, while still ensuring proper alignment between the V-shape female coupling 15 of the container and the corresponding V-shape male coupling 15b (see FIG. 16 for example) of a drink dispenser, the container may be equipped with a guiding fin 33a to be received by a guiding slot 33b associated with the interior wall of the dispenser's chamber which receives the container (see 33 in FIG. 13). The guiding mechanism 33 including the guiding fin 33a and the guiding slot 33b ensures alignment of the V-shape couplings in a direction (Y), while the central location widthwise of the V-shape female coupling 15 in the container 10 ensures alignment in another, perpendicular direction (X). The combined effect is to ensure proper alignment between the female and male coupling.

Figure 11:
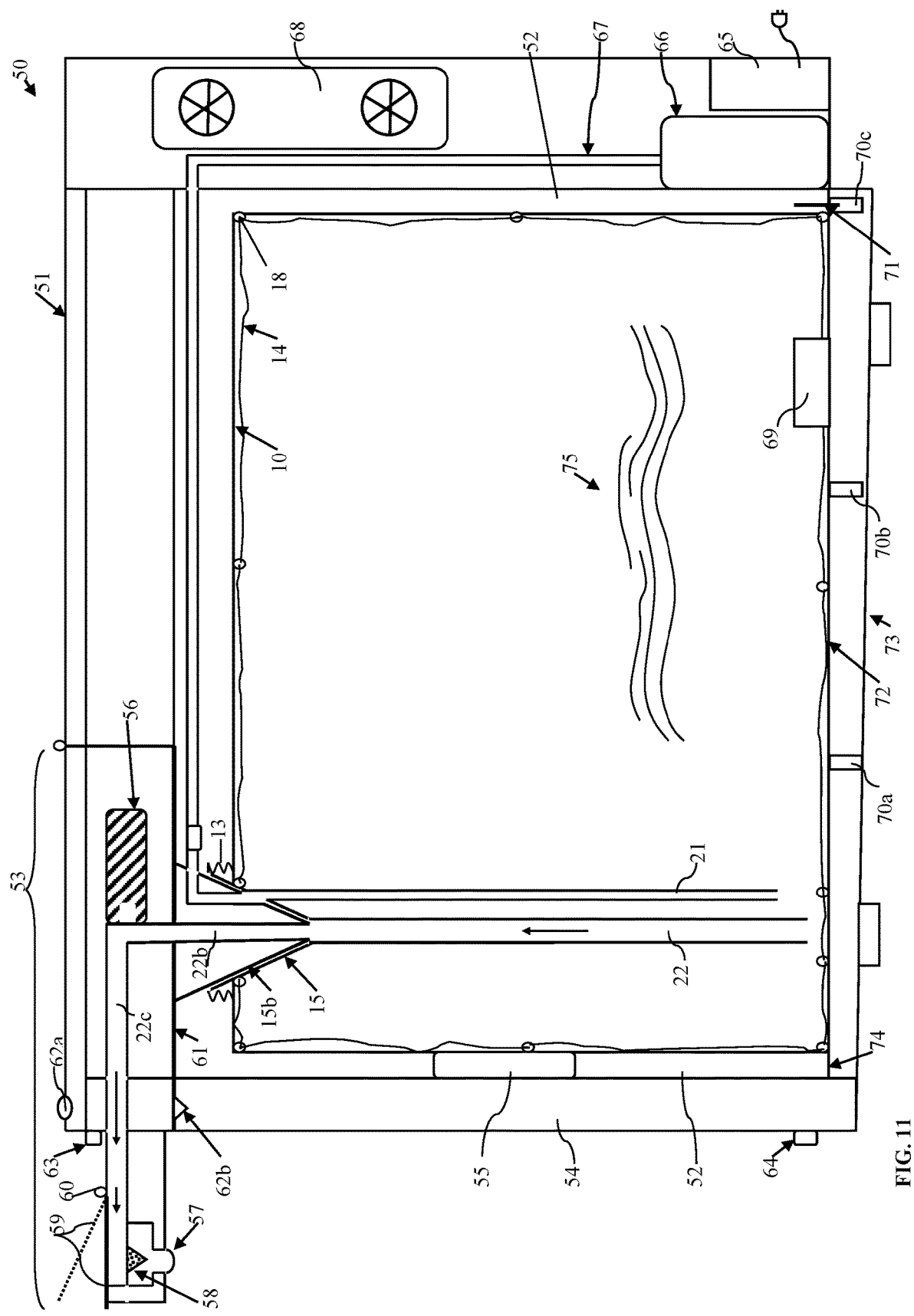
FIG. 11 illustrates a side sectional view of a countertop drink dispenser, according to several embodiments.
Figure 12:
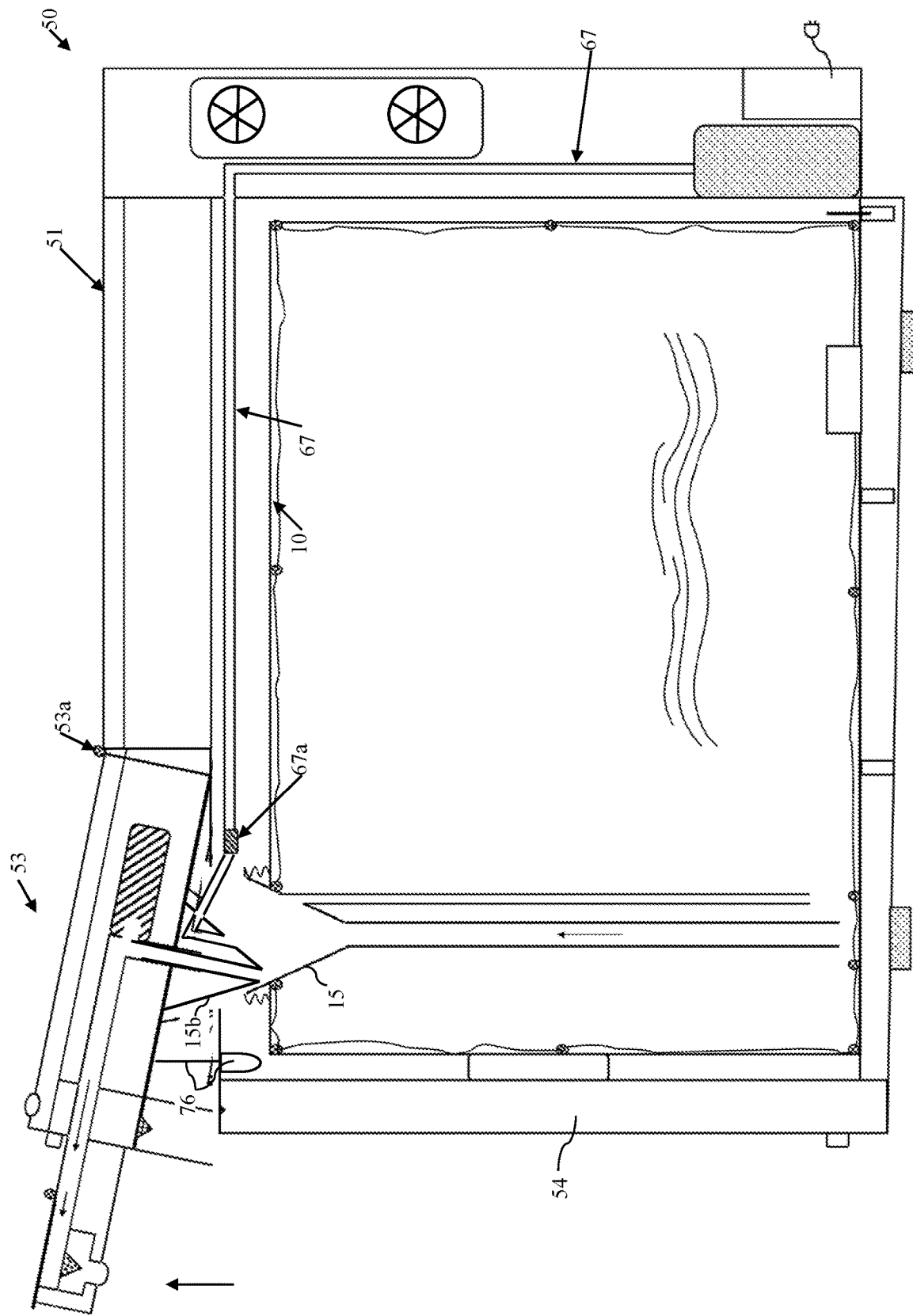
FIG. 12 illustrates the countertop drink dispenser from FIG. 11 in a different state.

FIG. 11 illustrates a side sectional view of a countertop drink dispenser, according to several embodiments. FIG. 12 illustrates the countertop drink dispenser from FIG. 11 in a different state. As shown, dispenser 50 may have a housing 51, a front door 54, a top lid housing 53 and a power source 65. Inside the housing 51, dispenser 50 may have one or more chambers 52 for receiving one or more containers 10 filled with liquid 75. It should be noted that front door 54 will have to be open and top lid housing 53 lifted up (see FIG. 12) high enough, such that the V-shape male coupling 15b escapes from the V-shape female coupling 15, in order for container 10 to be pushed in or pulled out of dispenser chamber 52 successfully.

After a container 10 is inserted in chamber 52, front door will need to be closed, such that for example a door fin 55 attached to the door can hold the front of container 10 in place. Several (one is shown only for drawing simplicity) adjustable lateral guide fins 69 (similar to those of a printer drawer for example) may be provided to ensure that irrespective of the width of the container 10, the V-shape female coupling 15 is aligned widthwise with the V-shape male coupling 15b, to make an air tight seal.

The guide fins are adjustable on the sides 69 as well as rear/back 71, to accommodate different sizes of beverage keg boxes or packaging and ensure that the V-shape female coupling 15 is aligned widthwise and lengthwise with the V-shape male coupling 15b, to make an air tight seal. Guide fins also allow cool air to flow easily around beverage box/keg 10 by holding box/keg 10 away from the walls of chamber 52.

The guide fins 69 may have a pin latch 69a (see FIG. 20) fitting in corresponding holes 69b, to allow guide fin adjustment to be locked in place. Similarly, for lengthwise alignment of the two couplings, guiding apertures 70a-70c (see FIG. 11) corresponding with for example the standardized lengths of container 10 may be provided, to receive guiding pin 71 behind the back of container 10.

It should be noted that a back to front downward slope (e.g., ¼ inches per each 12 inches) is provided for the floor 74 of chamber 52 (it should be observed that floor 74 sits higher in the back with respect to bottom 73 of dispenser 50; this ensures that when dispenser 50 sits on a horizontal surface the desired slope of floor 74 is obtained). This means that, when placed inside chamber 52, container 10 and its floor 72 will also be inclined downward from back to front. Thus, the liquid 75 will have the tendency to flow toward the well tube 22, thus aiding pump 56 to draw all or substantially all liquid 75 from container 10.

A separation between the V-shape female coupling 15 and the V-shape male coupling 15b may be observed in FIG. 11 and in other figures of this disclosure. It should be understood that the separation is depicted only to properly illustrate the individuality of the two V-shape couplings. However, in reality, when the top lid housing 53 is closed as seen in FIG. 11, there is no separation between the V-shape female coupling 15 and the V-shape male coupling 15b. They engage each other to create a friction seal. The force necessary to create the friction seal is preferably provided by the weight of the top lid housing 53 and of all the elements (e.g., pump 56) house into it. It should be understood that the coefficient of friction between the two couplings and the weight applied to the V-shape male coupling 15b by the top lid housing 53 and of all of its elements have to be coordinated with the pressure necessary to be maintained inside container 10. For example, for the same coefficient of friction (e.g., plastic on plastic), a greater weight will be needed for a greater pressure needed inside container 10 (e.g. for carbonated drinks).

The dispenser 50 may be equipped with a replaceable CO2 tank 65, which, as shown, may communicate through a CO2 duct 67 with the V-shape male coupling 15b and further with the CO2 line 21 of the container 10, when the V-shape male coupling 15b engages the V-shape female coupling 15 to create the friction seal described above. Thus, the friction seal between the two V-shape couplings also create a friction seal between the CO2 duct 67 and CO2 line 21. The CO2 may be used to carbonate the beverage 75 inside container 10.

The dispenser 50 may be also equipped with a refrigeration unit 68 (including a compressor, and evaporator and a condenser, similar to that of a refrigerator) for providing cool air inside chamber 52 for keeping the container 10 and the beverage in it 75 cool. For this purpose, a seal 61 (e.g., rubber seal) may be provided between the top lid housing 53 and the chamber 52, so that, upon closure of the top lid housing 53, the cool air does to escape from the chamber(s) 52. It should be understood that the entire chamber 52 will also have to be hermetically built and the door 54 hermetically closed to keep the cool air inside chamber(s) 52. The top lead housing 53 may be lockable with a latch 62b, which can be actuated (e.g., for release purposes) from a button 62a. Similar sealing and locking means (not shown) may be provided for the door 54.

The top lid housing 53 may have as shown the V-shape male coupling attached to it, so that the two lift and close together (see FIG. 12). When opening (lifting up) the top lid housing 53, again, the V-shape male coupling 15b escapes from the V-shape female coupling 15 of the container 10, so that for example an empty container may be removed by a user from chamber 52 and a new, full one inserted therein. This is a quick process by a user and thus an advantage of this coupling and dispensing system. A user does not need to go through the cumbersome and time-consuming process of for example screwing couplings together.

The top lid housing 53 may be associated with the dispenser housing 51 through a hinge 53a (see FIG. 12), which may facilitate the opening and closing of the top lid housing 53. A lifting shock 76 may also be provided to aid the user in lifting the top lid housing 53. It should be noted that the CO2 duct 67 may need to be flexible enough, or a flexible joint 67a may need to be provided, such that to allow the lifting of the top lid housing 53.

Referring now to FIG. 11, as shown, the top lid housing 53 may house a pump 56, which can draw the liquid 75 from container 10 via well tube 22 and further through male coupling's pipe 22b and then push it toward drink dispensing/pour spout 57 via spout conduit 22c. It should be noted that the friction seal between the V-shape couplings 15, 15b, described earlier, also creates a seal between well tube 22 and pipe 22b.

Before reaching the pour spout 57, the liquid 75 (e.g., water) pumped out by pump 56 may be forced to pass through a beverage pod 58 (e.g., coffee or tea pod). This offers a myriad of possibilities to the user. Not only can a user make coffee and tea, but the user can customize any drink from the container 10 (e.g., lemon juice) with an aroma or flavor desired (e.g., strawberry) by inserting the appropriate flavor pod 58. A pod lid 59 associated with the top lid housing 53 through a hinge 60, so that it can be open (see dotted line) or closed, may be provided for facilitating the insertion and removal of the beverage/flavor pod 58. The pod lid 59 may have similar sealing and locking means (not shown to prevent drawing clutter) as those shown (61, 62a, 62b) and described earlier for the top lid housing 53.

The dispenser 50 may have also a power switch 64 and a control panel 63 to give the option to the user to make several selections (e.g., temperature selection, carbonated/non-carbonated drink, etc.).

Figure 13:
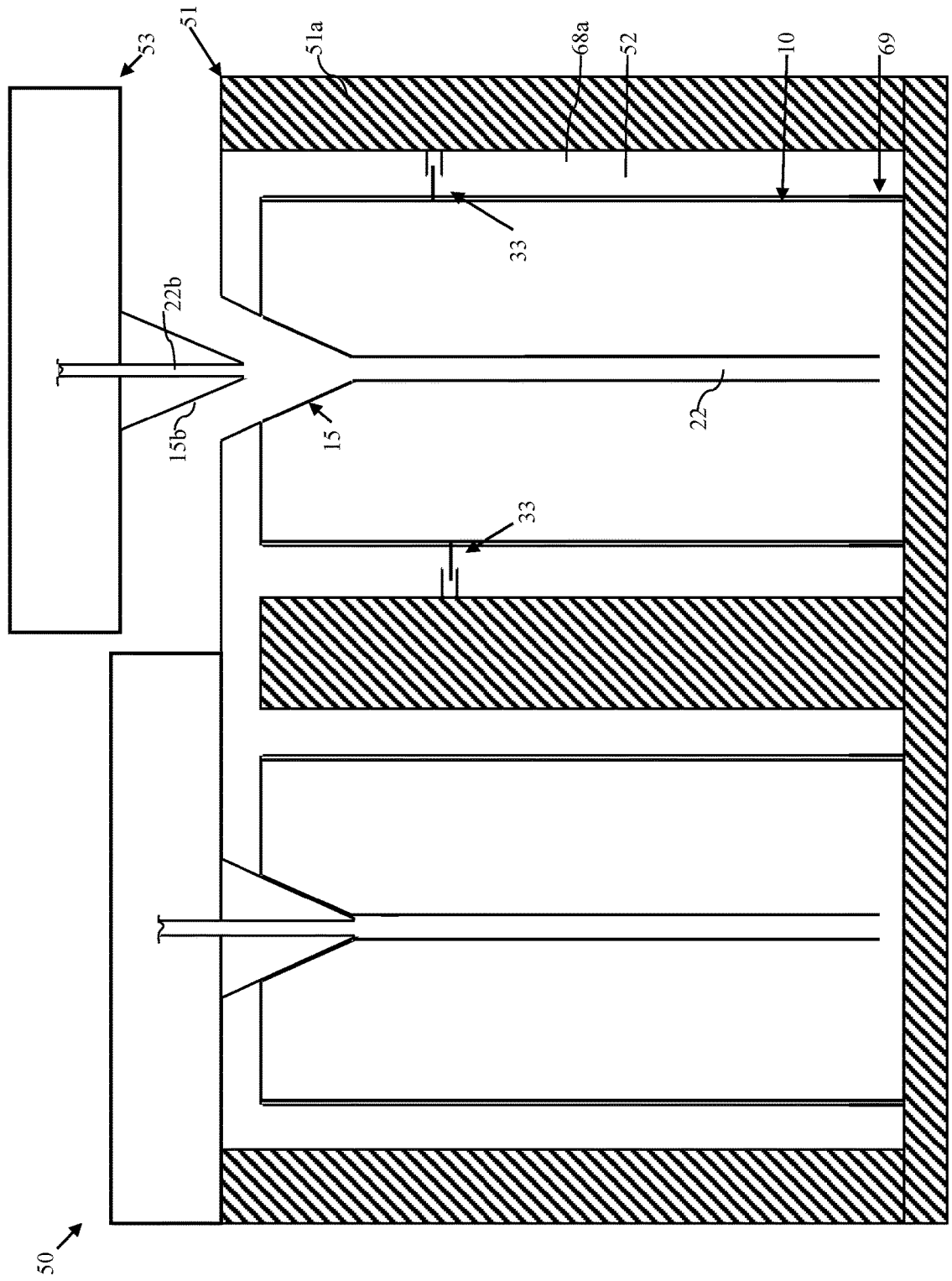
FIG. 13 illustrates a front sectional view of a drink dispenser having two chambers, according to an embodiment.

FIG. 13 illustrates a front sectional view of a drink dispenser having two chambers, according to an embodiment. A dispenser 50 may have one or more chambers 52. It should be apparent that a dispenser 50 that has more one chamber 52 may receive a container 10 in each chamber and thus offer more options to a user. For example, a container may contain flat cold water, another may contain a carbonated drink, another may contain a juice, and so on. As stated earlier when referring to FIG. 11, one or more chambers 52 may be filled with cold air 68a provided by a refrigeration system 68 (FIG. 11) to keep the respective drink at a set temperature or at a temperature selected by a user. For energy saving purposes, the walls 51a of the dispenser housing 51 may be thermally insulated. And again, as shown in FIG. 13 and as stated earlier when referring to FIGS. 11-12, the top lid housing 53 has to be lifted high enough, such that the V-shape male coupling 15b retreats completely from the V-shape female coupling 15, in order for the container 10 to be removed from or inserted into chambers 52.

Figure 14:
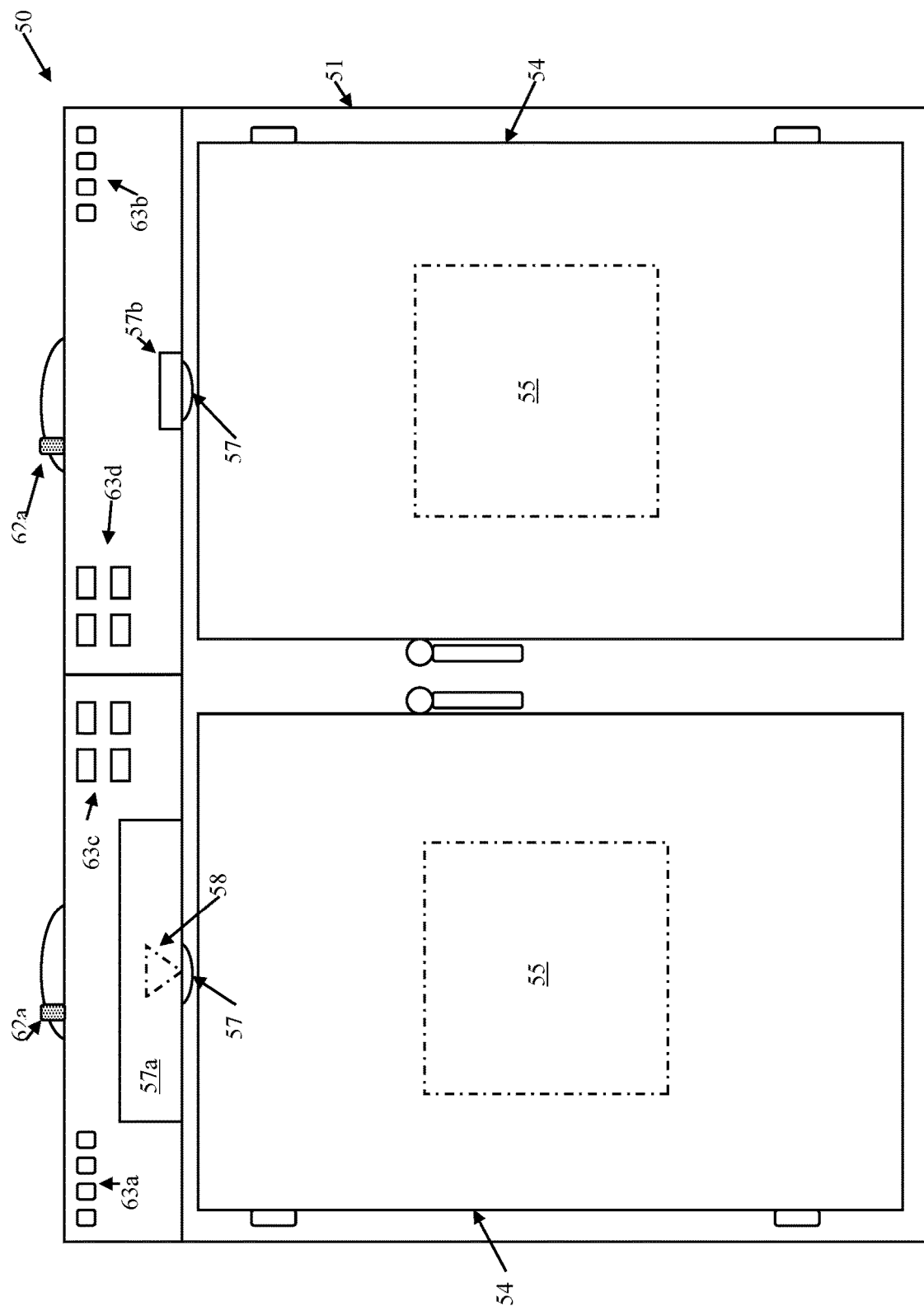
FIG. 14 illustrates a front view of a drink dispenser having two chambers, according to an embodiment.

FIG. 14 illustrates a front view of a drink dispenser having two chambers, according to an embodiment. FIG. 15 illustrates a top view of a drink dispenser having two chambers, according to an embodiment. It should be understood that a dispenser may have one chamber only, or it may have three, four (see FIG. 24 for example), six or more chambers. It should be noted that preferably each of the two chambers 52 has its door to allow for independent replacement of containers 10 (see FIG. 13). It should also be noted that, for example, one spout module 57a may be larger to accommodate the housing of the flavor/beverage pod 58 and other elements (e.g., heating elements; see 78 in FIG. 20), while the other may be smaller (57b). Through the spout 57 of the smaller spout module 57b, with no beverage/flavor pod, the user may get the unmodified drink (e.g., juice) from the respective container and chamber. It should be apparent that other combinations may be adopted, such as when both (or all if more than two), or none of the spouts modules are configured to accommodate the housing of a beverage or flavor pod 58, and/or heating. In addition, the spout module (s) 57a may be configured to also allow for the option of pouring the drink out of container 10 without adding flavor and/or heating and/or cooling.

Further, it should be noted that preferably each chamber 52 of dispenser 50 has its own flow controls, or other controls described herein 63a-b, for a user to select for example how much drink to pour, and/or temperature control and reader/display 63c-d to display for example the temperature in each chamber. Lastly, it should be noted that, as shown in FIG. 11, the refrigeration unit 68, CO2 tank 66 and power supply 65 are preferably located in the back portion 77 (FIG. 14) of housing 51.

FIGS. 16-19 illustrate sectional views of male-female couplings, according to several embodiments. In FIG. 16 the V-shape female 15 and male 15b coupling is depicted as earlier described when referring to the precedent figures. In FIG. 17 an alternative embodiment is depicted in which a ridge system 34 may be employed to create the seal between the male and female coupling. A ridge 34a may be present all around the interior surface of the V-shape female coupling 15, and similarly, ridge 34b may be present all around the exterior surface of the V-shape male coupling 15b. When the V-shape male coupling 15b descends, as earlier described when referring to FIG. 11-12, into the V-shape female coupling 15, as shown, ridge 34b is preferably configured to pass ridge 34a, such that the two ridges sit next to each other, to create a seal. It should be noted also that the two ridges 34a-b are squeezed between the two couplings proportionally with the weight applied to the male coupling. This is because the V-shape (e.g., funnel) is narrower at the bottom. Thus, in this embodiment as well, the seal is stronger if more weight is applied to the male coupling 15b.

In FIG. 18, a channel 35a may be present all around the interior surface of the V-shape female coupling 15, and a ridge 35b may be present all around the exterior surface of the V-shape male coupling 15b. When the V-shape male coupling 15b descends, as earlier described when referring to FIG. 11-12, into the V-shape female coupling 15, as shown, channel 35a is preferably configured to receive ridge 35b, to lock the couplings and create a seal in addition to the seal between the interior surface of the V-shape female coupling 15 and the exterior surface of the V-shape male coupling 15b. This embodiment may be preferred when for example the strength of the seal between the two couplings has to be controlled. The locking aspect of the channel-ridge system 35 makes that possible.

FIG. 19 is offered as an example to illustrate that the male-female friction coupling described herein may have other shapes, besides the V-shapes (e.g., funnel shape). For example, the male-female friction couplings may have a U-shape or bullet shape as shown in FIG. 19. Other shapes may be adopted, such as cylindrical shape, prism shape, and so on. An advantage of the V-shape is that it also aids to guide and center the V-shape male coupling 15b as it enters the V-shape female coupling 15. Further, the V-shape coupling lends itself to a tighter seal. In addition, when, for example, the male coupling's pipe 22b has a beveled lower end or is extended with a beveled nose 22bb (see FIG. 16), it can slide inside well tube 22 creating an even tighter seal, and thus allowing better suction for the pump 56 (see FIG. 11).

Figure 20:
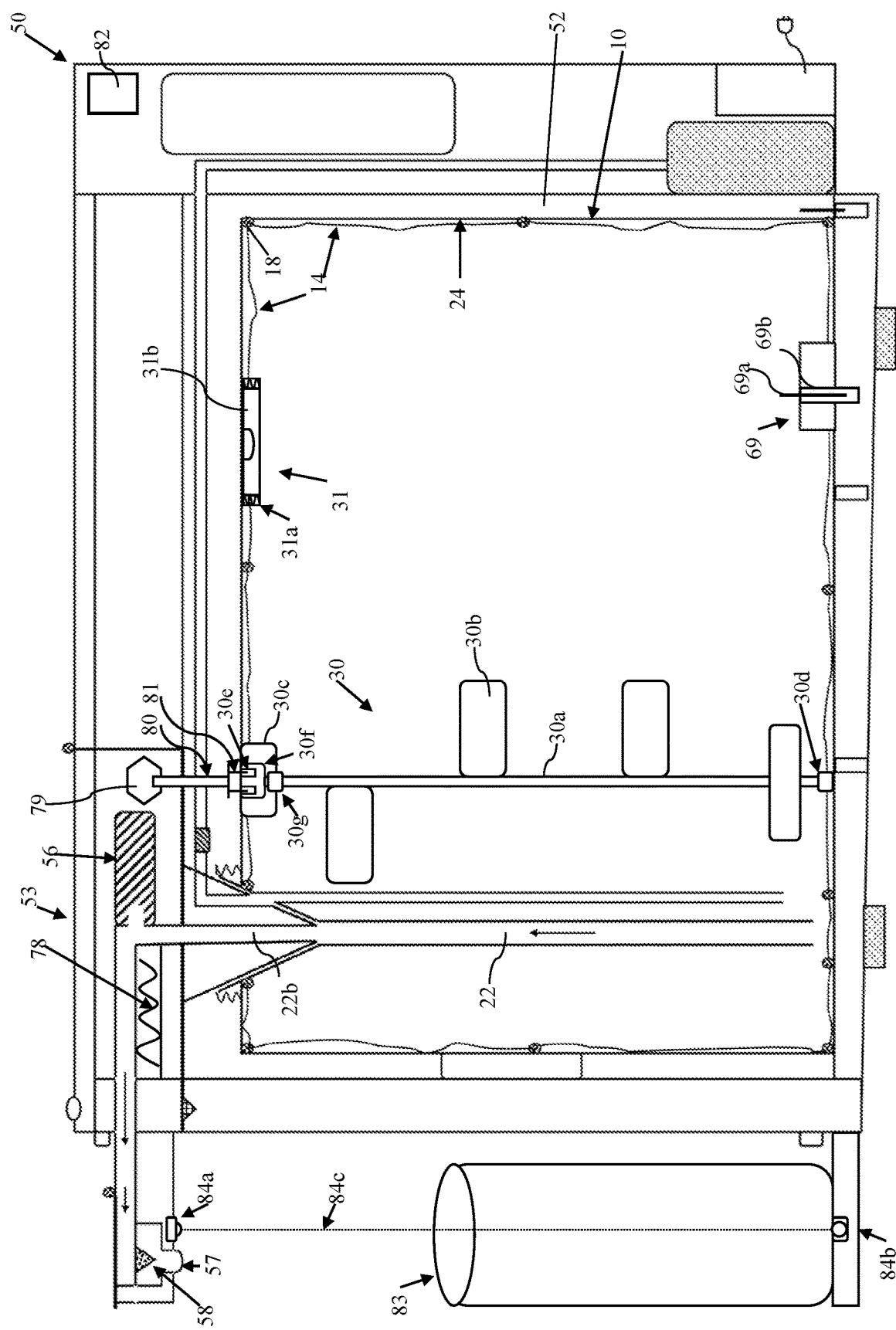
FIG. 20 illustrates a side sectional view of a dispenser system having a mixer and other features, according to several embodiments.

FIG. 20 illustrates a side sectional view of a dispenser system having a mixer and other features, according to several embodiments. As shown, a mix/stir motor 79 may be part of lift lid housing 53 and may be placed next to beverage pump 56 and behind the beverage heater 78. As it is the case with all the functions and elements of the dispenser 50 described herein, the mix/stir motor 79 may be controlled via dispenser controls (see for example 63a in FIG. 14) or a smart phone app communicating with a computer 82 of the dispenser 50. Upon its actuation, motor 79 spins a shaft 80. Associated with the shaft 80 two or more drive pins 81 may be provided. Thus, the motor 79, the shaft 80 and drive pins 81 will rise together with the top/lift lid housing 53 to allow the insertion of container 10 into chamber 52. Similarly, they will descend when the lift lid housing 53 will be lowered for closing (see FIGS. 11-12), such that the drive pins 81 can engage the corresponding apertures 30e of a top fin bar 30f, which can rotate inside a recess 30c at the top of container 10. It should be noted that other coupling means between drive shaft 80 and fin bar 30f may be used, such as friction/clutch means. The fin bar 30f may be attached to a mix/stir shaft 30a that goes down as shown into the container 10. The mix/stir shaft 30a may have several rotating paddle blades 30b to properly mix/stir beverages, cocktails or soft serve-food, ice cream, yogurt, soup, smoothie, juice, cocktails and so on. The rotation of the mix/stir shaft 30a may be eased by the use of bearings 30d and 30g. Bearing 30d will preferably be configured to provide also the sealing level corresponding to the pressure level desired to be maintained in the container 10 (i.e., higher pressure for carbonated drinks).

As shown, the container 10 may also be equipped with an ingredient access 31, which may be closed using an ingredient/screw cap 31b fastener with the aid of, for example, threads 31a.

The screw cap 31b is preferably airtight preventing beverage from going flat or being spoiled. When screw cap 31b is opened, there is a possibility that a carbonated beverage could lose some of its carbonation. This is not a problem. As soon as top lid 53 and front doors 54 are closed, a CO2 sensor 86 (FIG. 22) may be provided to read the carbonation levels in the beverage container 10 an cause computer 82 to automatically add CO2 to container 10, via direction valve 85a (see FIG. 21), to re-carbonate to the proper level of carbonation for the beverage type in the respective container 10.

To create a mixed drink (e.g., cocktail, etc.), a user may, before inserting container 10 into chamber 52, remove ingredient cap 31b from top of box/container 10, which allows user to add ingredients (e.g., juice, cut up fruit, etc.) into the beverage (e.g., spirit, etc.) present inside container 10. Next, the user would fasten ingredient cap 31b, thus closing ingredient access 31. Next, a user would insert container 10 into chamber 52, while lift lid housing 53 is lifted up (see FIG. 12).

Next, the user would close the lift lid housing 53, which will cause drive pins 81 to engage the apertures 30e of the top fin bar 30f. Next, the user would actuate the motor 80 via dispenser controls (see for example 63a in FIG. 14) or a smart phone app as described above. That would cause the stir shaft 30a and paddles 30b to spin and thus mix the added ingredient with the beverage inside container 10.

As shown in FIG. 20, the dispenser 50 may be equipped with cup controls sensors 84a-b that, via for example light beam 84c, can read if a beverage container/cup/glass 83 is in place for automatic pour when, for example, user sets dispenser 50 to pour at a certain time, in commercial use setting or home use. For example, the night before user goes to bed, user may set dispenser 50 via dispenser controls (see for example 63a in FIG. 14) or a smart phone app to pour coffee and/or chilled orange juice at 7:00 am. If the glass/container 83 is in place to receive the beverage, dispenser 50 will pour the beverage at 7:00 am. Further, computer 80 may be configured to notify user via your smartphone app or flashing light on control panel and/or audio signal that beverage is ready.

Figure 21:
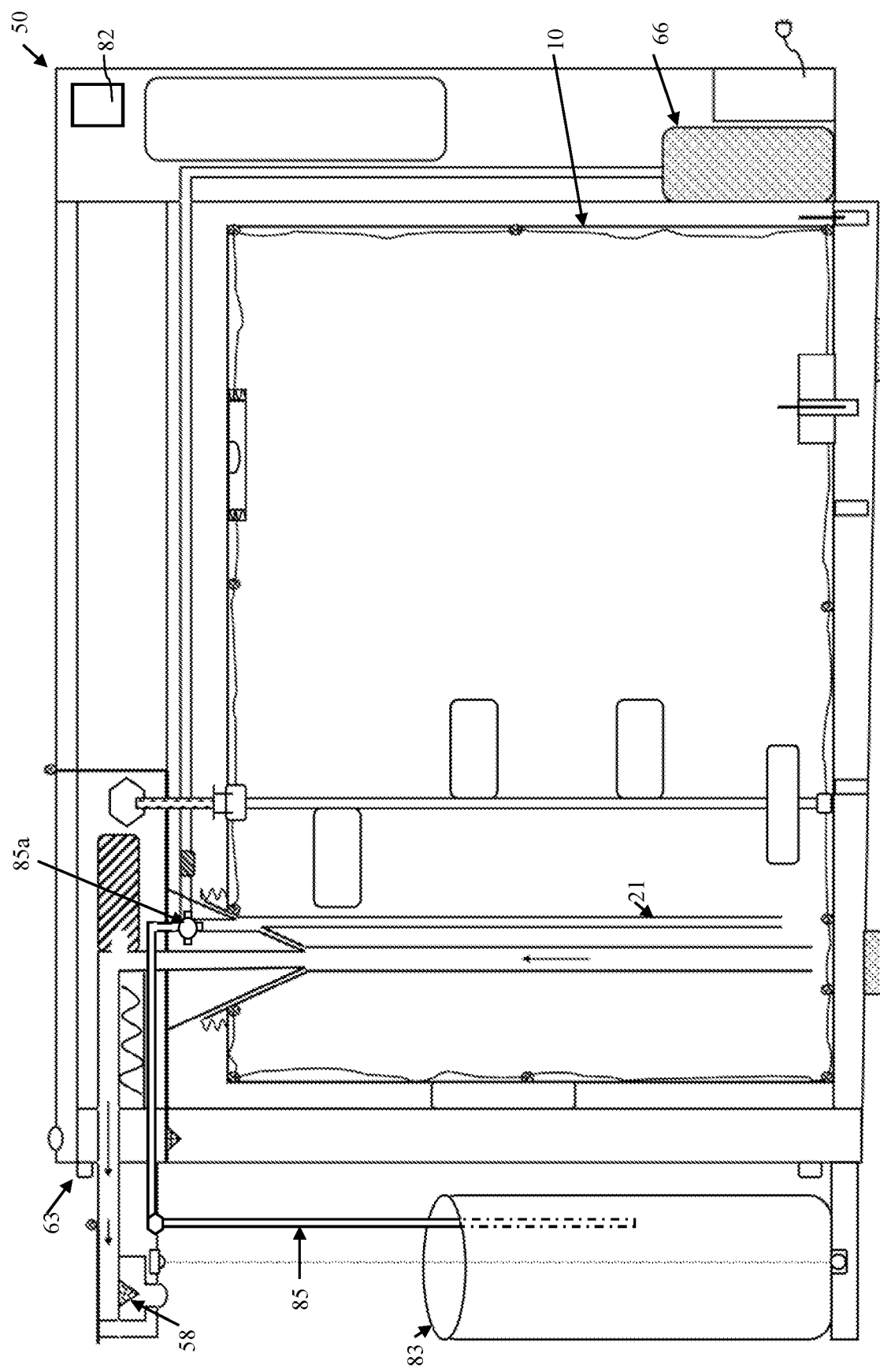
FIG. 21 illustrates a side sectional view of a countertop drink dispenser having a CO2 line for the beverage glass, and other features, according to several embodiments.

FIG. 21 illustrates a side sectional view of a countertop drink dispenser having a CO2 line for the beverage glass, and other features, according to several embodiments. As shown, the CO2 from the CO2 tank 66 may be passed through a direction valve 85a (e.g., a solenoid valve) electrically-actuable for example by computer 82 based on for example instructions received from a user via controls 63 or a scanner 90 of a bar code 89 on pod 58 (see FIG. 22). The direction valve 85a may send CO2 either to glass/cup 83 via cup CO2 line 85 or to container 10 via container CO2 line 21. This versatility of dispenser 50 is very important. For example, let the container 10 be filled with spring (flat) water, to make coffee, tea or other non-carbonated drinks using drink/flavor pod 58. If now the user wants a glass 83 of carbonated water, user can for example press the appropriate control 63 to send CO2 just into the glass of water 83, leaving container 10 with non-carbonated water.

Figure 22:
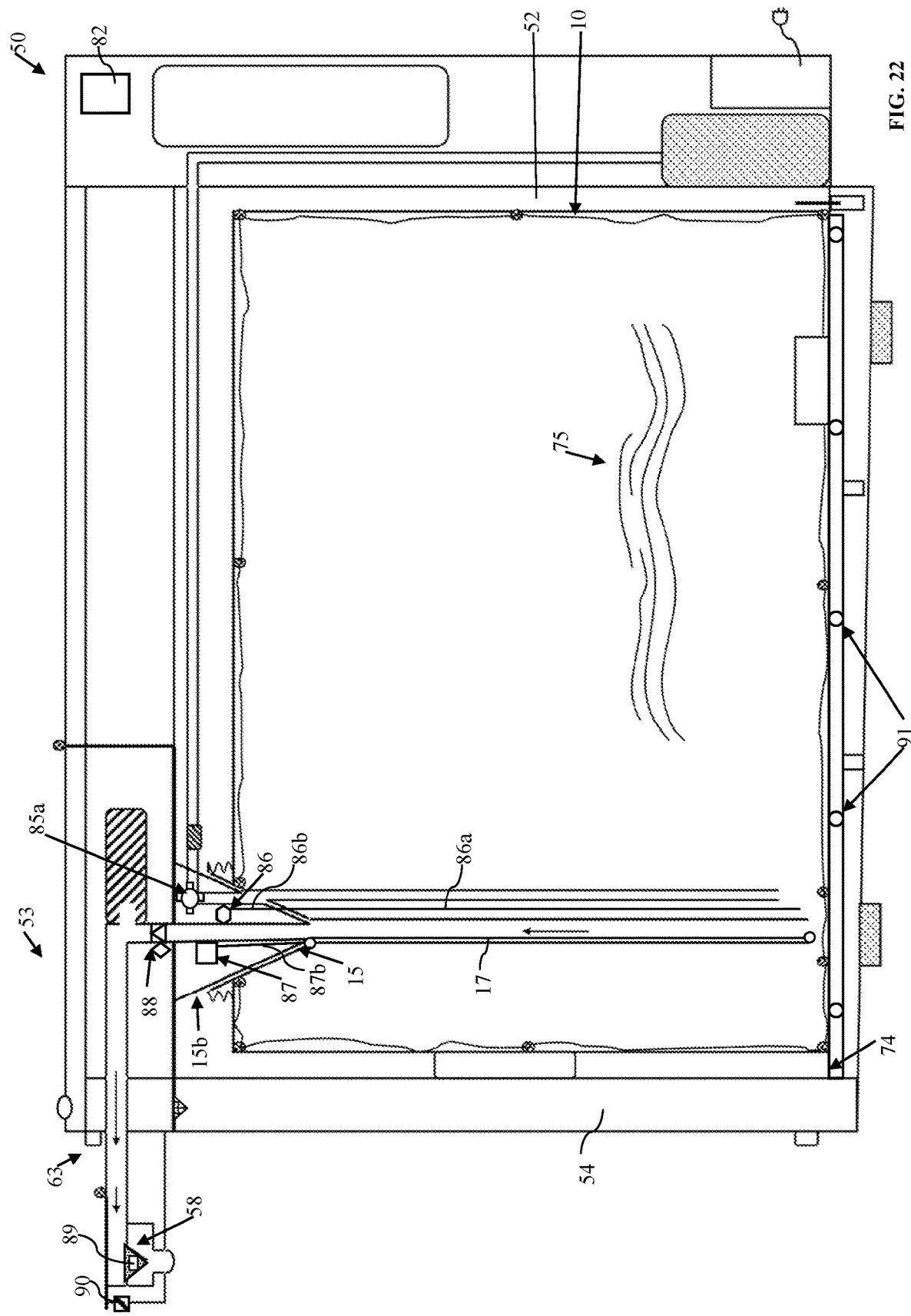
FIG. 22 illustrates a side sectional view of a countertop drink dispenser having a CO2 sensor, and other features, according to several embodiments.

FIG. 22 illustrates a side sectional view of a countertop drink dispenser having a CO2 sensor, and other features, according to several embodiments. Again, as mentioned earlier when referring to FIG. 20, a CO2 sensor 86 (FIG. 22) may be provided to read the carbonation levels in the beverage container 10 an cause computer 82 to automatically add CO2 to container 10, via direction valve 85a (see FIG. 21), to re-carbonate and maintain the proper level of carbonation for the beverage type in the respective container 10.

The CO2 sensor 86 may be connected to a male CO2 sensor strip 86b, which may reside as shown inside V-shape male coupling 15b. During the coupling of the female and male V-shape couplings 15, 15b as earlier described herein, the male CO2 sensor strip 86b is preferably configured to connect with a CO2 sensor strip 86a, with which container 10 may be equipped, if, for example, the beverage 75 inside container 10 is a carbonated beverage.

The dispenser 50 may have a smart beverage volume pour flow control valve 88 (e.g., a solenoid valve) controlled by computer 82, so that for example the user can set, from controls 63 or a smartphone app, the volume of beverage desired to be poured in user's cup 83 (FIG. 21). Dispenser 50 may also have a beverage volume level sensor 87 which may communicate with computer 82 to alert the user when for example beverage volume is low in container 10. The alert may be communicated to user via user's smart phone app and/or visual and/or audio alert signal on/from the front of control panel 63. The beverage volume sensor 88 may be connected to a male volume sensor strip 87b which may reside as shown inside V-shape male coupling 15b.

During the coupling of the female and male V-shape couplings as earlier described herein, the male volume sensor strip 87b is preferably configured to connect with the beverage level sensor strip 17 of container 10. Again, as stated earlier when referring to FIG. 1, the container 10 may be equipped with a beverage level sensor strip 17, which may assist a user as described above, in knowing the level of beverage remaining in the container 10 during use and/or alert the user to acquire a new/filled container.

As shown in FIG. 22, each beverage flavor pod 58 may have a scannable bar code 89. The dispenser 50 may have a bar code scanner 90 that can read the bar code 89 and then communicate the data to the computer 82. The bar code 89 may contain data regarding to, for example, what kind of beverage to pour: hot, cold, carbonated, non-carbonated, ounces of beverage, and so on. In addition, the bar code may contain data of interest to user, such as nutrition data, which computer 82 may communicate to user, for example, on a display (see for example 63c-d, FIG. 14) of the dispenser 50 and/or on user's smart phone.

Preferably, all bay chambers 52 have a floor 74 that can slide out on roller wheels 91 (FIG. 22), similarly to, for example, a kitchen cabinet drawer. This feature of dispenser 50 allows easier loading of beverage container 10 into chamber 52. For example, top lid 53 may not be able to open to a 90 degrees angle because of various restrictions, such as the upper kitchen cabinets, when dispenser 50 is used on a kitchen countertop. However, as described earlier, top lid 53 will lift/open enough to disconnect the male and female V-shape couplings, 15b, 15, allowing a beverage box 10 to slide into chamber 52 when front cabinet door 54 is open. However, for example, some beverage boxes 10 that are heavy or with for example irregular or odd shapes may need to be top loaded and adjusted into bay chamber guide fins 69, 71 (FIG. 11) to ensure proper alignment of the V-shape couplings 15, 15b. Therefore, preferably, all cabinet floors 74 slide outward of bay chambers 52.

Figure 23:
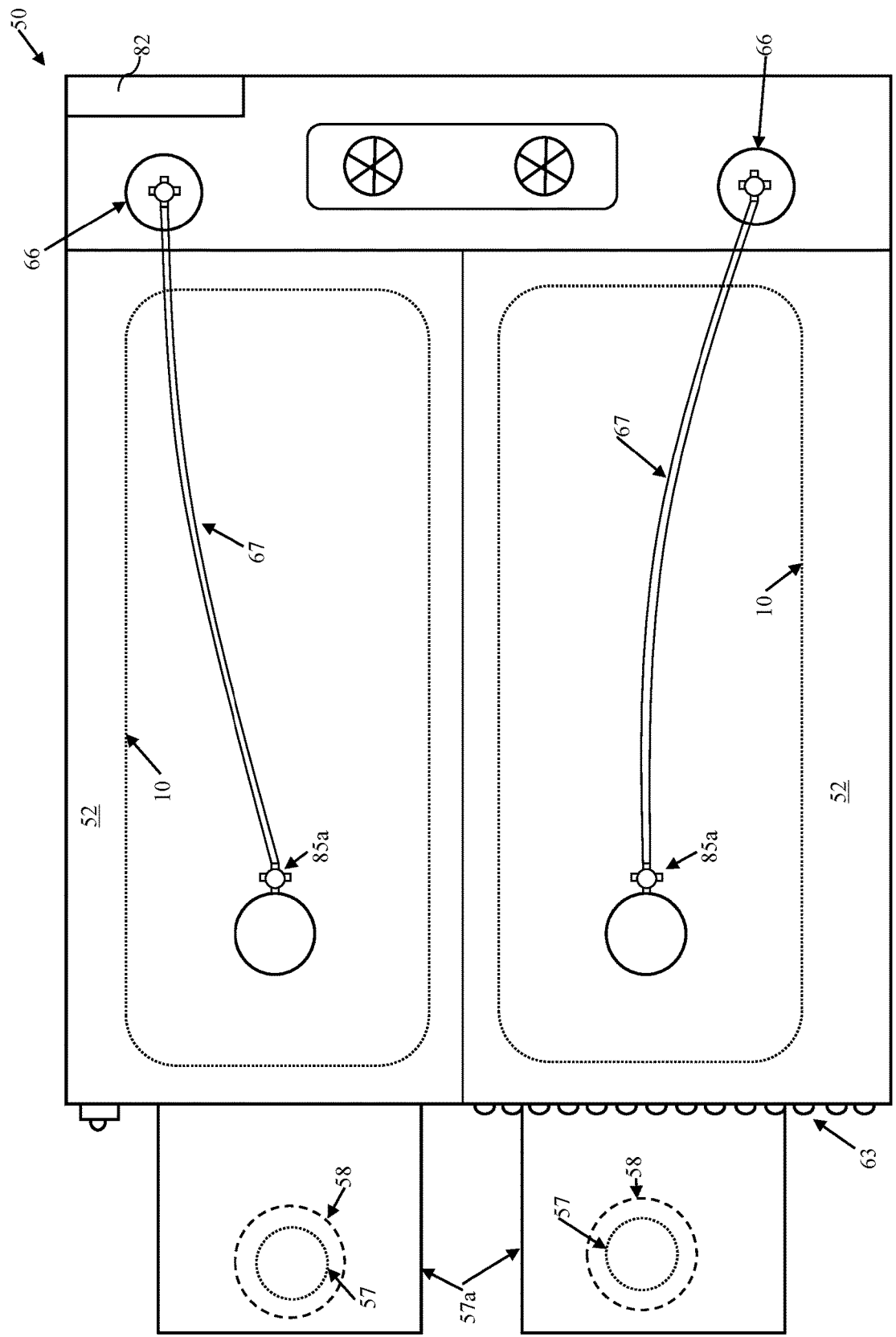
FIG. 23 illustrates a top view of a drink dispenser having two chambers, according to another embodiment.

FIG. 23 illustrates a top view of a drink dispenser having two chambers, according to another embodiment. As stated earlier in this disclosure, each dispenser 50 may have one, two or more chambers 52. In this embodiment two chambers are shown, each having an independent CO2 supply via CO2 lines 67 from CO2 tanks 66. As described earlier when referring to FIGS. 21-22, the CO2 supply is controlled via a directional/smart valve 85a by computer 82. In this embodiment, as shown, each spout housing 57a may accommodate a beverage pod 58. Thus, the dispenser 50 provides the versatility the user may need, such as pouring via each of the spouts 57 hot or cold, carbonated, or non-carbonated beverage, which pouring user can control from control panel 63 or a smartphone app as described earlier.

Figure 24:
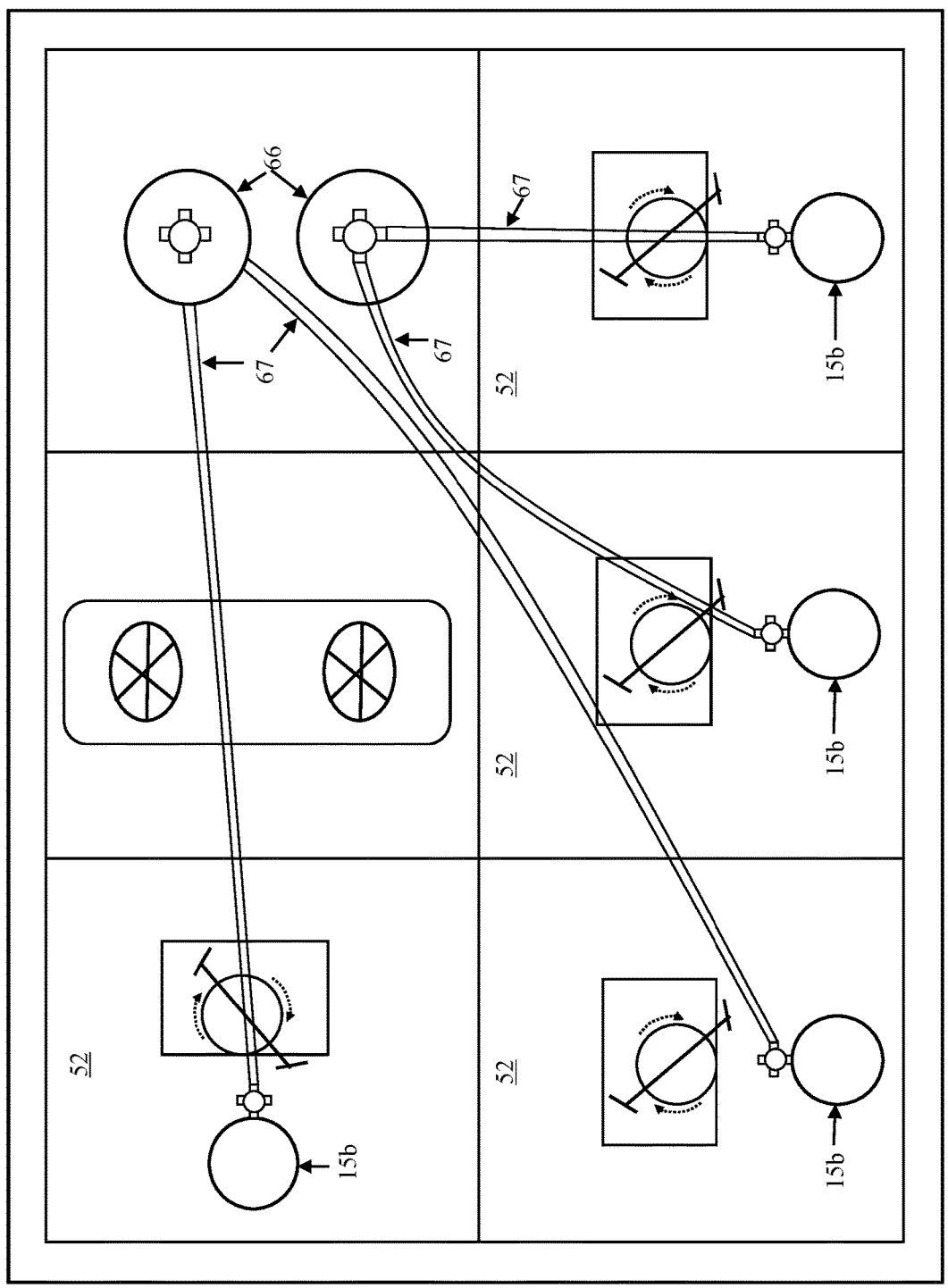
FIG. 24 illustrates a top sectional view of a drink dispenser having four chambers, according to an embodiment.

FIG. 24 illustrates a top sectional view of a drink dispenser having four chambers, according to an embodiment. This dispenser can be used as a larger floor model or corner top model. This is an example of a dispenser 50 having four chambers 52 and configured to fit a corner space, such that pouring can be done from two sides, left and front in this example. This two-side access may be advantageous in a commercial setting for example, when the dispenser may be a floor model accommodating larger containers/kegs.

Figure 25:
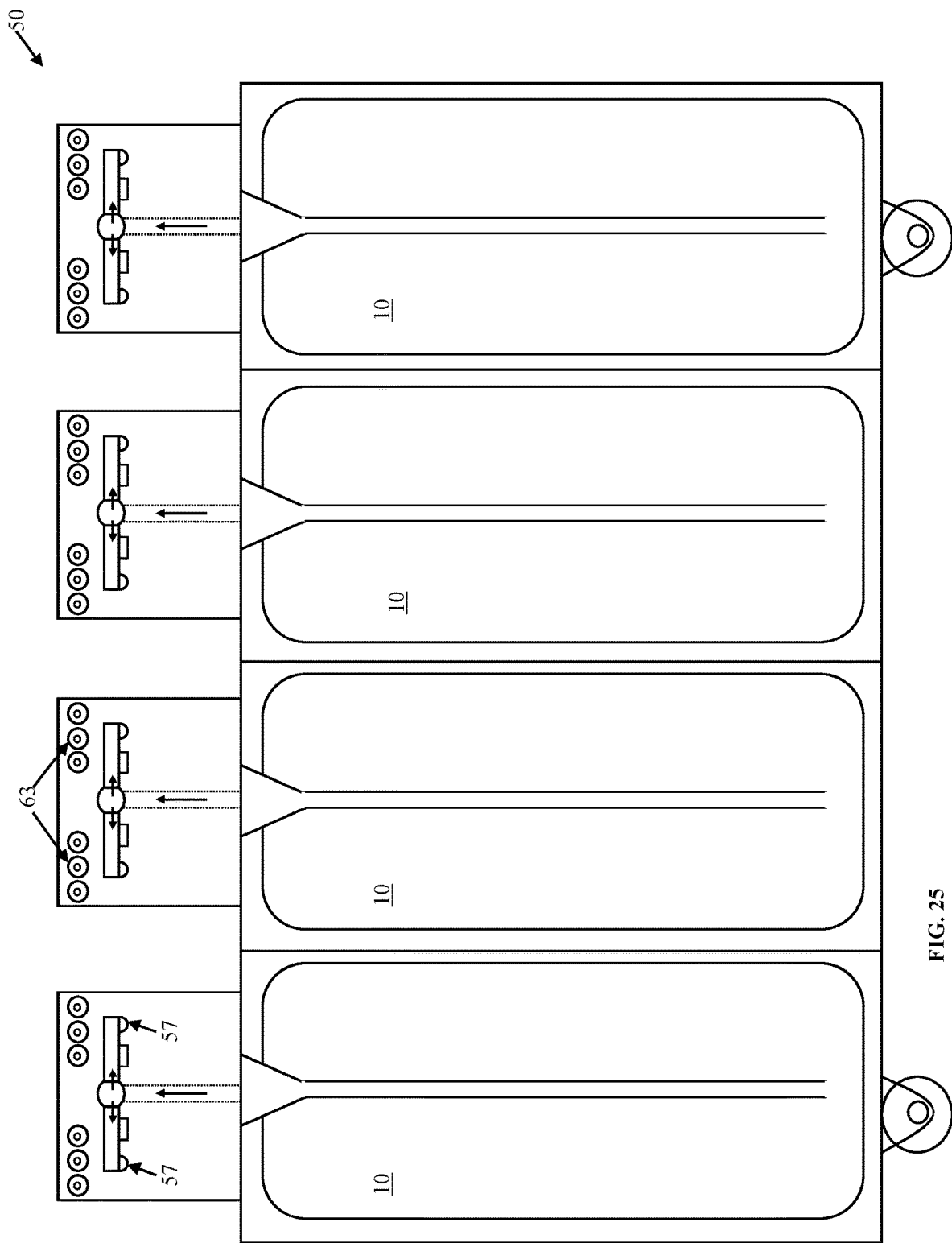
FIG. 25 illustrates a front sectional view of a drink dispenser having four chambers, according to an embodiment.

FIG. 25 illustrates a front sectional view of a drink dispenser having four chambers, according to an embodiment. What should be noted here that the dispenser 50 may be configured such that to provide the option of pouring at the same time via two spouts 57 from each beverage container 10. Thus, eight glasses could be filled at the same time. This arrangement may be advantageous in a commercial setting for example, when a bartender needs to serve several customers at the same time. This dispenser can also be used as a larger floor model or as corner top model too.

Figure 26:
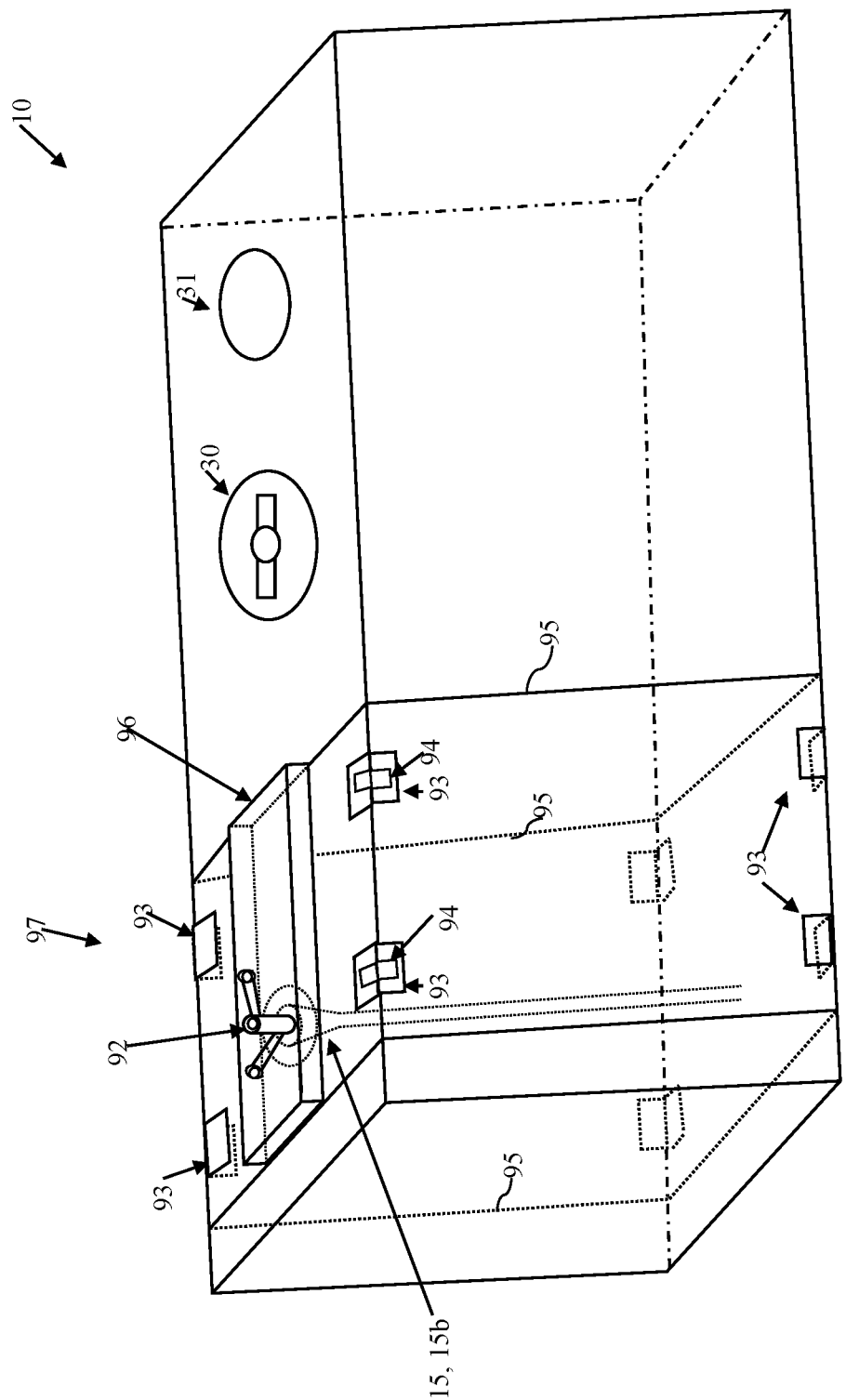
FIG. 26 illustrates the perspective view of a drink container equipped with a coupling adapter, according to an embodiment.

FIG. 26 illustrates the perspective view of a drink container equipped with a coupling adapter, according to an embodiment. 112. The cost of a commercial size container/keg 10 as described herein, versus the cost of traditional stainless-steel kegs is significantly lower. This is because the container 10 is preferably made from biodegradable materials and as such is a one-way keg. There is no need to return the container/keg 10 to the drink manufacturer. Further, there is no need to or expense with washing the keg. The container 10 can simply and safely be discarded after use. Thus, besides making the container 10 work with the dispenser 50 disclosed herein, there may be a need to make container 10 having the V-shape female coupling 15 and all of its other elements disclosed herein work also with traditional keg system tri-clove fitting used in beer and wine industry today. This is simply because for example some user would not want to incur the expense associated with the replacement of their existing keg systems. For this purpose, a coupling adapter 97 may be provided, which can be configured to adapt to any existing keg systems, the uniqueness being the adapter's V-friction male coupling 15b, creating a friction seal with the V-friction female coupling 15 of container 10 as described earlier in this disclosure.

The coupling adapter 97, as shown in FIG. 26 may include a strap 95, made from stainless steel for example, and having hinges 93 on all four corners of container 10 and snap closed/open buckles 94 on one of the corners, to close/lock the strap 95. Preferably, eight hinges 93 total are provided. As shown, the coupling adapter 97 may include a traditional keg system coupling 92 (tri-clove) on top, so that existing line couplings can fasten into it. The traditional coupling 92 communicates preferably with a V-shape male coupling 15b placed underneath of strap 95 and secured by it after entering the V-shape female coupling 15 of container 10. A plate 96 may also be provided to provide depth and to reinforce the fastening of the traditional keg coupling 92 to the adapter strap 95. The corner hinges 93, snap closed/open buckles 94 and strap 95 create pressure on the underside V-shape male coupling 15b to create the friction seal with the V-shape female coupling 15 of the container 10.

Figure 28:
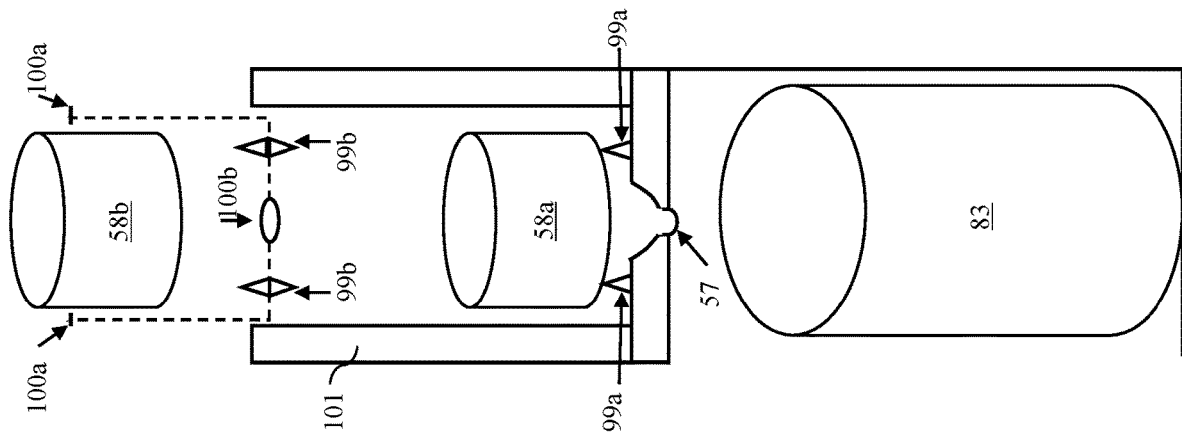
FIG. 28 illustrates the process of loading the spout housing from FIG. 27 with beverage pods, according to an embodiment.
Figure 27:
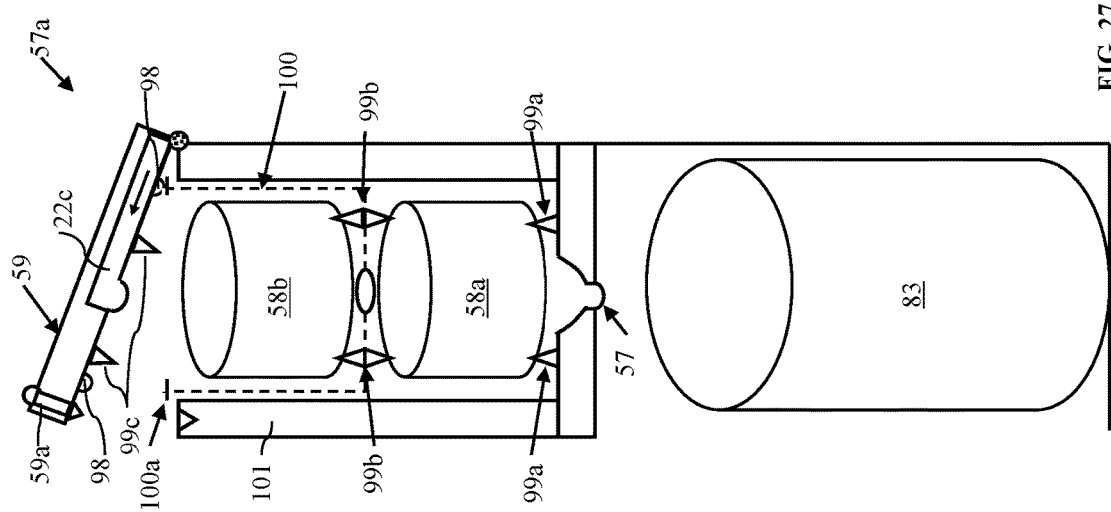
FIG. 27 illustrates the side sectional view of a spout housing of a drink dispenser, according to an embodiment.

FIG. 27 illustrates the side sectional view of a spout housing of a drink dispenser, according to an embodiment. FIG. 28 illustrates the process of loading the spout housing from FIG. 27 with beverage pods, according to an embodiment. So far in this disclosure, reference was made to a spout housing 57a of dispenser 50 accommodating one beverage or flavor pod 58 (see FIG. 15 for example). In FIGS. 27-28 it is illustrated that the spout housing 57a may be adapted to accommodate two beverage/flavor pods, 58a, 58b, preferably in a stacked arrangement as shown. Similarly, it should be understood that spout housing 57a may be adapted to accommodate three or more pods, stacked similarly as shown in FIGS. 27-28.

To accommodate two pods 58a-b in a stacking arrangement as shown, the spout housing 57a has to have the appropriate height. Further, the pod lid 59 preferably have two protrusions 98, such that, upon closure of pod lid 59, the two protrusions 98 push down onto the flange 100a located at the top of a preferably perforated basket 100. The pod lid 59 may be locked into the spout housing frame 101 via a latch 59a. At its bottom, the basket 100 preferably has two double spikes 99b that can pierce the upper pod 58b and the lower pod 58a. As shown the two double spikes 99b have an upper end extending into the basket 100 and a lower end extending away from the bottom of basket 100.

Thus, to use two pods, a user may first place the lower beverage/flavor pod 58a into the spout housing 57a and on top of lower spikes 99a located at the bottom of spout housing 57a and oriented upwards as shown. The sharpness of the lower spikes 99a may be such that to prevent the piercing of the bottom of lower pod 58a yet. Next, the user may place the upper beverage/flavor pod 58b into the basket 100. Next, the basket 100 with upper pod 58b may be lowered on top of lower pod 58a. The sharpness of the double spikes 99b may be such that to prevent the piercing of the top of lower pod 58a and bottom of upper pod 58b yet.

Next, user can push down to close and lock pod lid 59. This will cause upper spikes 99c attached to the pod lid 59 to pierce the top of upper pod 58b and upper portion of double spikes 99b to pierce the bottom of upper pod 58b. Further, this will cause the protrusions 98 to push onto flange 100a of basket 100, and thus, to push basket 100 downward, causing the lower portion of double spikes 99b to pierce the top of lower pod 58a, and, because the basket 100 will push the lower pod 58a downward, causing the lower spikes 99a to pierce the bottom of lower pod 58a. Thus, now the beverage from spout conduit 22c may flow through upper beverage/flavor pod 58b and then through lower beverage/flavor pod 58a, before reaching user's cup 83 via spout 57.

To facilitate the flow, basket 100 has preferably a square shape (in cross-section), while the pods are preferably of round shape. This would allow more space at the corners of the basket 100 for the beverage to flow. In addition, as shown, to also facilitate the flow, the basket wall and bottom may be perforated and the bottom of basket 100 may also have a flow opening 100b.

Now, because of the two-pod configuration, the user can add to the existing beverage (e.g., water, juice, beer, wine, spirit, etc.) in the container 10 any two flavors or beverages users want (e.g., tea, coffee, soft drink (e.g., Pepsi™, Coke™), cherry flavor, etc.) to create their own concoction.

It should be understood that when the spout housing 57a is configured to accommodate only one beverage/flavor pod 58a, the height of the spout housing 57a is smaller, such that the upper spikes 99c can reach the top of pod 58a upon closure of pod lid 59.

FIG. 29 illustrates a side sectional view of a drink container during filling at factory, according to an embodiment. It is well known that certain drinks such as wine are sensitive to air. For example, the taste of the drink may be negatively affected if air is allowed to mix with the drink. Further, air may contain chemical and/or biological elements that may contaminate the drink inside container 10. To prevent this, container 10 may be equipped with means that can be selectively engaged to prevent the air from entering container 10 and spoil the drink inside it. For example, container 10 may be equipped with a valve (e.g., a petcock valve) 102, which can close and open the well tube 22 of container 10.

As shown for exemplification purposes, if this approach is adopted, the well tube 22 may be extended above the upper surface 23 of container 10, to accommodate a placement of the valve 102 such that it can be easily accessed by a user for example. Thus, when container 10 is to be filled at the factory, lever 102a of valve 102 may be moved up for example, to open the valve 102, and thus well tube 22 (see valve opening 102b being aligned with well tube 22), such that liquid/beverage can be inserted in container 10 by factory equipment 103. It should be noted that preferably, in order to prevent air from entering container 10, valve 102 should be opened after the air tight friction seal is achieved between the V-shape female coupling 15 of container 10 and the V-shape male coupling 15b (similar to that of dispenser 50) with which the factory equipment 103 is preferably equipped.

It should be understood that valve 102, at the factory or when in the dispenser, may be opened or closed manually by a user, automatically through a mechanical leverage system (not shown), or, if the valve 102 is a solenoid valve, it could be actuated electrically (e.g., automatic command by computer 82).

It should be noted that all the other elements and functions of the container 10 disclosed herein remain otherwise the same if not conflicting with the modification(s) depicted in FIGS. 29-32 (raised well tube and coupling; valve on well tube). It should be further noted that all the elements and functions of dispenser 50 disclosed herein remain otherwise the same, with the exception of slight modifications that would be apparent to one of ordinary skills in the art, that may be needed to accommodate the raised well tube and valve and/or the presence of a valve.

FIG. 30 illustrates a side sectional view of the drink container from FIG. 29 ready for storage and/or shipping, according to an embodiment. After container 10 is filled at the factory, valve 102 is preferably closed, by for example turning lever 102a down (see FIG. 30), such that to prevent air from entering via well tube 22 into container 10. Next, factory V-shape male coupling 15b is disconnected. Next, container 10 is preferably sealed with foil seal 19 (see FIGS. 1-2) and with cap 11, fastening using threads 13 for example. The filled container 10 can now be shipped and/or stored.

Figure 31:
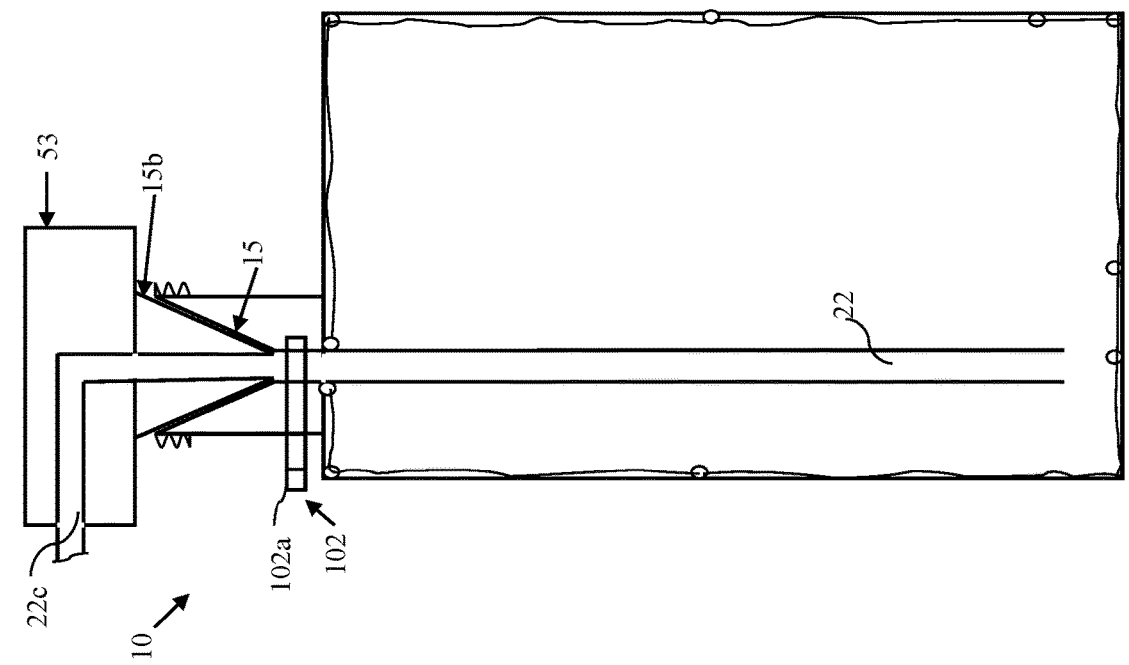
FIG. 31 illustrates a side sectional view of the drink container from FIG. 30 placed in a dispenser, according to an embodiment.

FIG. 31 illustrates a side sectional view of the drink container from FIG. 30 placed in a dispenser, according to an embodiment. When the filled container 10 arrives at the user, foil seal 19 (see FIGS. 1-2) and cap 11 may be removed and container 10 may be placed in the chamber 52 of a dispenser 50 as earlier described herein, while the valve 102 is still closed (see FIG. 31).

As described, the dispenser 50 (see FIG. 11 for example) preferably has a corresponding V-shape male coupling 15b, associated preferably with the top lid housing 53 of dispenser 50. After the airtight seal between the V-shape female coupling 15 and V-shape male coupling 15b is established as earlier described, valve 102 may be opened (see FIG. 32) by for example turning lever 102a upward as shown. The opening 102b of valve 102 is again aligned with the well tube 22 and thus pump 56 can be draw the beverage from container 10 and pour it into user's glass 83 (see FIG. 20 for example).

Figure 32:
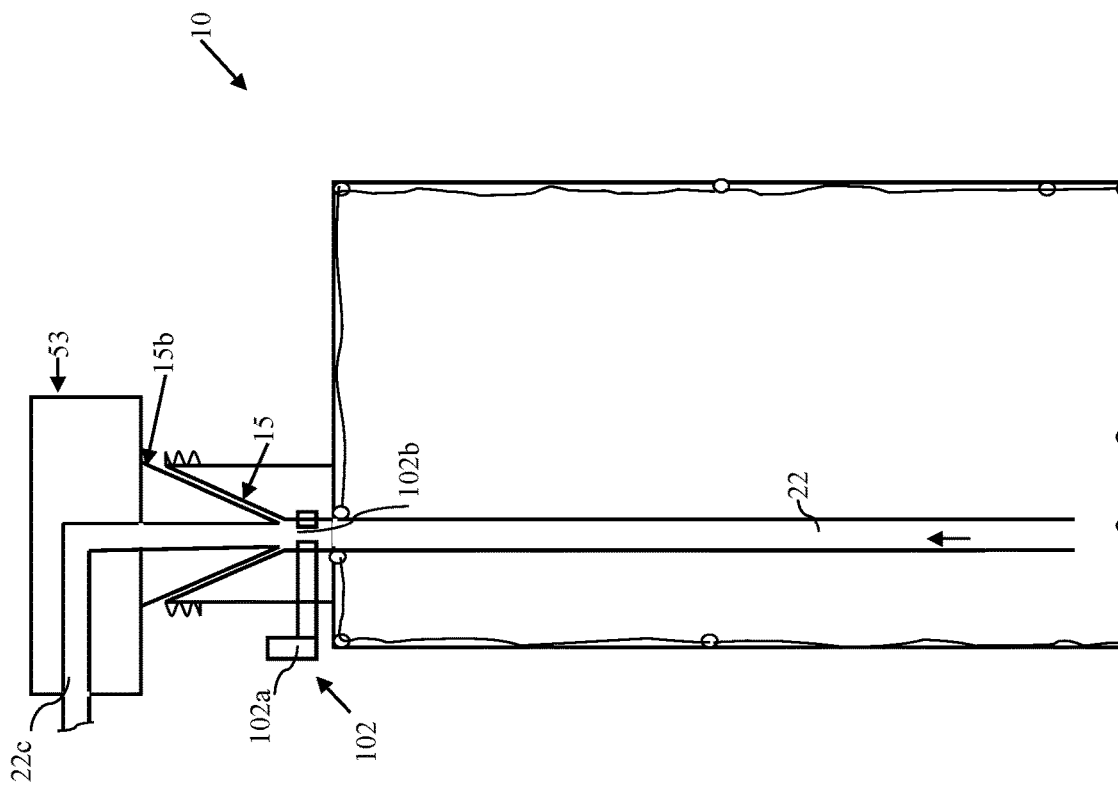
FIG. 32 illustrates a side sectional view of the drink container from FIG. 31 in a different state, according to an embodiment.

It should be noted that this is a complete closed loop process, from the beverage factory to user, preventing air from spoiling or contaminating the beverage inside container 10. Again, FIG. 32 illustrates a side sectional view of the drink container from FIG. 31 in a different state (i.e., valve 102 open), according to an embodiment.

Figure 33:
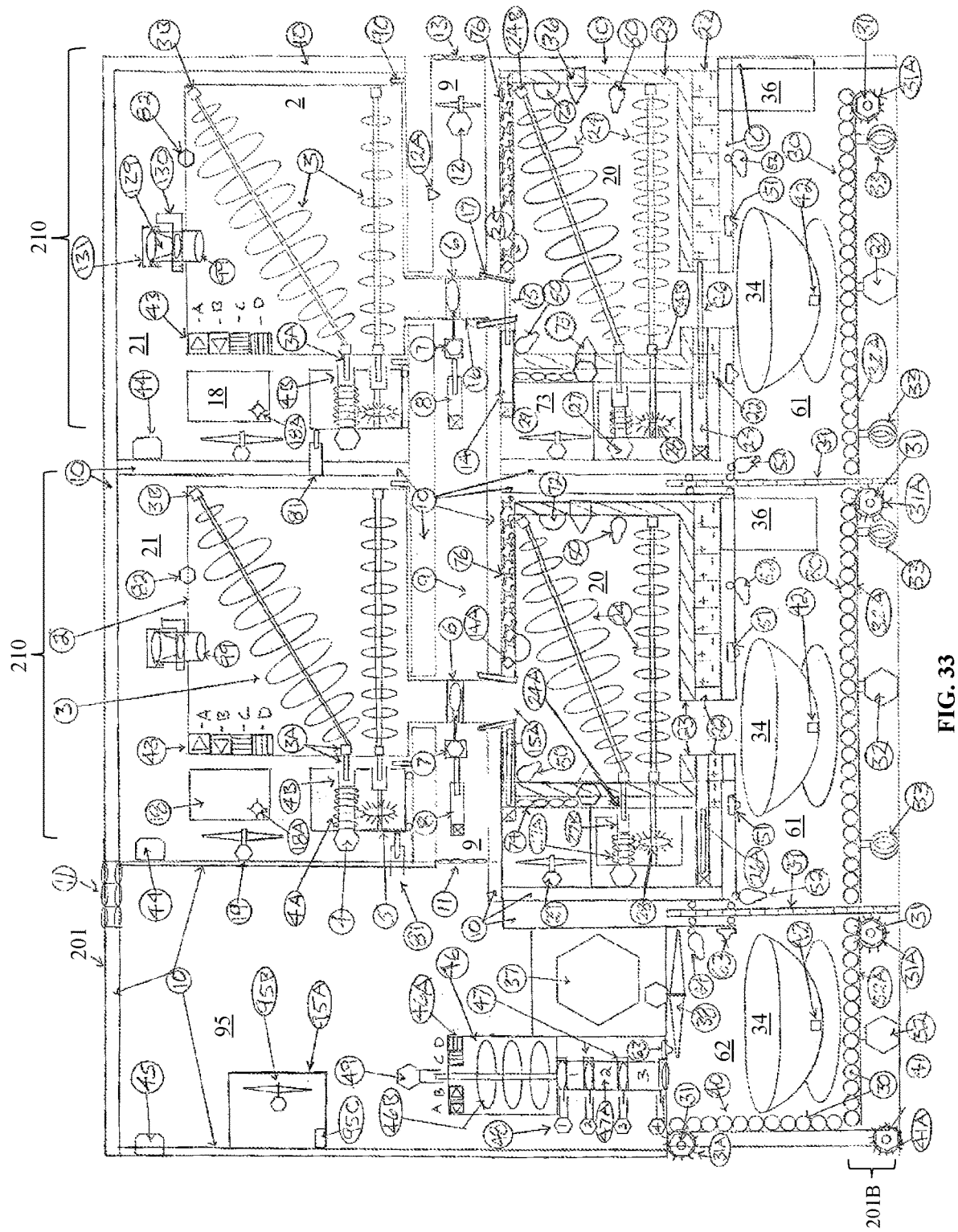
FIG. 33 illustrates a side sectional view of an autonomous, self-cleaning food and liquid dispenser, according to an embodiment.

FIG. 33 illustrates a side sectional view of an autonomous, self-cleaning food and liquid dispenser 201, according to an embodiment. As shown in FIG. 33, the autonomous, self-cooking, self-preparing, temperature-controlled self-cleaning food and liquid dispenser ("autonomous, self-cooking, self-preparing, temperature-controlled self-cleaning food and liquid dispenser," "autonomous food and liquid dispenser," "autonomous dispenser," "dispenser apparatus," "apparatus,") 201 may comprise a plurality of dispenser compartments 210 adjacently disposed within the autonomous dispenser 201, as an example. It should be understood that two dispenser compartments 210 are shown in FIG. 33 as an example for simplicity, and that the autonomous dispenser 201 may comprise many more of such compartments 210. As will be described in detail throughout this disclosure below, each dispenser compartment 210 may autonomously dispense a cooked food ready for consumption by a user.

As shown in FIG. 33, each dispenser compartment 210 may comprise a refrigerator/cooling chamber 21, a cooking chamber 20, and a primary dispensing chamber 61, as an example. As shown, the cooling chamber 21, the cooking chamber 20, and the primary dispensing chamber 61 may be arranged in a stacking configuration, as an example, such that food refrigerated in the cooling chamber 21 may easily and controllably be transferred to the cooking chamber 20, and the resulting cooked food may then be easily and controllably dispensed into the primary dispensing chamber 61. It should be understood that other configurations are also possible, and that each chamber 21, 20, 61 need not be directly positioned one on top of the other (e.g., may alternatively be positioned next to each other), as shown. The refrigeration chamber 21, the cooking chamber 20, and the primary dispensing chamber 61 may comprise a plurality of exemplary components that will be discussed in detail when referring to FIG. 34 below. As shown, the autonomous dispenser 201 may further comprise a temperature-controlled storage chamber 95 and a secondary dispensing chamber 62. As will be described in greater detail herein below, flavor-enhancement products such as seasoning, toppings, sauces, spices, powders, pepper, salt etc., for example, may be stored within the storage chamber 95 and easily and controllably dispensed onto the food in the secondary dispensing chamber 62. In addition, beverages like alcohol, spirits, and flavoring mixers such as cherry, grape, lemon, lime, vanilla, or chocolate flavors, for example, may be stored within the storage chamber 95.

As shown as an example, the storage chamber 95 may comprise a scanner 45 adapted to read and process e-tags, such as RFID or NFC, or ID tags, such as bar or QR codes, containing identification information for each of the flavor-enhancement products (not shown) being stored within the storage chamber 95. As will be discussed later, the scanner 45 may communicate with an onboard computer for the proper identification and selection of a desired flavor-enhancement product (e.g., salt, pepper, ketchup, mustard) during the disclosed food dispensing process. As shown, the storage chamber 95 may also be provided with a cooling control mechanism 95A, a cooling fan 95B, and a temperature control thermostat 95C. As an example, the temperature control thermostat 95C may read and regulate the temperature of the storage chamber 95, actuating the cooling control mechanism 95A and the cooling fan 95B as needed to maintain the storage chamber 95 at a desired temperature (e.g., around room temperature) for the preservation of the various flavor-enhancement products. As shown in FIG. 33, the storage chamber 95 may also comprise a smart storage container 46, wherein the various flavor-enhancement products may be stored and precisely dispensed. As shown as an example, the storage container 46 may be provided with a mixer shaft having auger blades 46B for mixing and dispensing the various toppings stored within the storage container 46. As will be described in greater detail when referring to FIG. 33, input entered by a user on the control pad 46A may cause the storage container 46 to accurately and efficiently dispense flavor-enhancement products through a pour spout tube 47 according to a user-specified size (e.g., 2 ounces).

As shown in FIG. 33, the autonomous dispenser 201 may be provided with a plurality of insulated walls 10 disposed throughout the apparatus along the flooring and ceiling to help contain and maintain appropriate temperatures throughout the apparatus 201. As shown, the exterior insulated walls 10 may form a main apparatus housing, which may be rectangular, as an example. As an example, the insulated walls 10 may help prevent the cold temperatures of the refrigeration chamber 21 from interfering and/or affecting the hot temperatures of the cooking chamber 20. Additionally, the insulated walls 10 may maintain heat within the apparatus 201, such that to prevent an area surrounding the apparatus 201 from being thermally affected by such heat, for example. As shown, the autonomous dispenser 201 may also be provided with a system of inlet air vents 11 disposed throughout the apparatus 201 to assist in circulating fresh air within the apparatus 201 and also exhausting hot air out, as an example. As an example, a venting-duct work-air plenums system 9 may be disposed within the autonomous dispenser 201 for also facilitating air circulation. As shown in FIG. 33, the plenums system may be disposed between the refrigeration chamber 21 and the cooking chamber 20, such that the heat generated within the cooking chamber 20 may be removed. As shown, the plenums system 9 may comprise a variable speed exhaust fan 12 controlled by a temperature sensor 12A, such that fresh air drawn through the air vents 11 may be circulated throughout the apparatus 201, and hot air may be exhausted out through exhaust vents 13, as an example. Thus, an advantage is the prevention of heat and cooling generated within each chamber being wasted or the functions of each chamber being disrupted, due to effective maintenance of the individual temperatures of each chamber. Another advantage may be, due to the prevention of excess heat leakage and the circulation of fresh air, the preservation and protection of the various electronic components within the apparatus.

As shown, the autonomous dispenser 201 may be provided with a conveyor system 30 disposed along a bottom of the primary and secondary dispensing chambers 61, 62. As an example, the conveyor system 30 may utilize a Lazy Susan type swivel having a cylindrical roller on top of the swivel, allowing the swivel top to rotate 360 degrees in either clockwise or counterclockwise motion. As shown, a bottom 201B of the apparatus may comprise a plurality of forward/reverse (F/R) stepper drive motors 31 with a shaft having an attached gear 31A that engage with the conveyor system 30, as an example. As an example, the F/R stepper motors 31 may drive the gears 31A, causing the conveyor system 30 to swivel in a particular direction, and thus move a bowl-container (e.g., 34) to a particular dispensing chamber (61, 62) in the apparatus 201. As shown, the bottom 201B may also comprise a plurality of support wheels 33 attached to an underside 32A of the conveyor system. As an example, the underside 32A may be attached to a central rotation mechanism 32 for swiveling the roller conveyor 30 360 degrees clockwise or counterclockwise, which will be described in greater detail when referring to FIG. 40 below. As an example, the support wheels 33 may help support the weight of the bowl-container 34 as it is moved along the conveyor system 30 and the support wheels 33 may also rotate 360 degrees such that to follow the rotary direction of the conveyor system 30. Thus, an advantage is that the conveyor system may allow for precise positioning of a user's container for food and/or liquid dispensing. As will be described in greater detail later, the conveyor system 30 may be actuated according to user-entered commands, such that particular portions of foods may be dispensed in a particular order.

As shown in FIG. 33, the dispensing chambers 61, 62 may each be separated by an insulated chamber door ("insulated chamber door," "insulated door") 39. As shown as an example, each insulated chamber door 39 may be adapted to be lowered and raised to allow a user's bowl-container 34 to pass from one dispensing chamber 61 to another (61, 62). Alternatively, the insulated chamber doors 39 may be adapted to traverse side to side to allow the bowl-container 34 to travel through the apparatus 201, as an example. The chamber doors 39 may be insulated to help maintain the different temperatures throughout the apparatus 201, such that heat from one dispensing chamber (e.g., 61) having a first temperature does not interfere with another dispensing chamber (e.g., 62) having a second temperature. Additionally, as an example, the insulated chamber doors 39 may prevent foreign objects/pests (e.g., dirt, dust, insects, rodents) from entering and/or traveling throughout the apparatus 201.

As shown as an example, the autonomous dispenser 201 may further comprise a front door ("front door," "front ramp," "entryway") 40, which may be provided in a drawbridge configuration. It should be understood that other configurations may be adapted in the autonomous dispenser 201 for opening and closing the front entryway 40, such as, for example, a pocket door or vertically sliding door. As an example, the front entryway 40 may comprise motorized roller bars that allow a user's container/bowl to traverse into the apparatus 201, as well as exit out of the apparatus 201 after foods and/or liquids have been dispensed. As shown, the front entryway 40 may be provided with an F/R stepper motor 41 and shaft having a geared sprocket 41A disposed within the bottom 201B of the apparatus. As an example, the F/R stepper motor 41 and the geared sprocket 41A may cause the front door 40 to lower and raise, as a drawbridge, for example, about an axis created by the F/R stepper motor 41 and shaft. As shown, the front door 40 may further comprise an F/R stepper motor 31 and gear 31A, such as those attached to the conveyor system 30, to motorize the rollers that form a part of the front door 40, as an example. It should be understood that the front door 40 is shown in a closed state in FIG. 33.

As shown in FIG. 33, the dispenser apparatus 201 may further comprise a microwave 37 and microwave reflector 38 disposed above the secondary dispensing chamber 62. As an example, the microwave 37 may be any suitable microwave oven and the microwave reflector 38 may be a waveguide cover for deflecting any excess steam or vaporized food particles. The microwave 37 may provide additional heat onto foods in the user's bowl-container 34 as the bowl-container 34 travels through the secondary dispensing chamber 62. This additional heat, for example, may keep the cooked dispensed food warm before exiting the apparatus 201 through the front entryway 40, as an example. Thus, an advantage is that cooked foods dispensed into a user's bowl-container may be maintained at a consistently warm temperature up to the moment of retrieval of the bowl-container by the user. As will be described in more detail later, the dispenser apparatus 201 may also be provided with an onboard smart computer programmed for controlling and responding to the various food and liquid cooking and dispensing operations of the apparatus 201.

Figure 34:
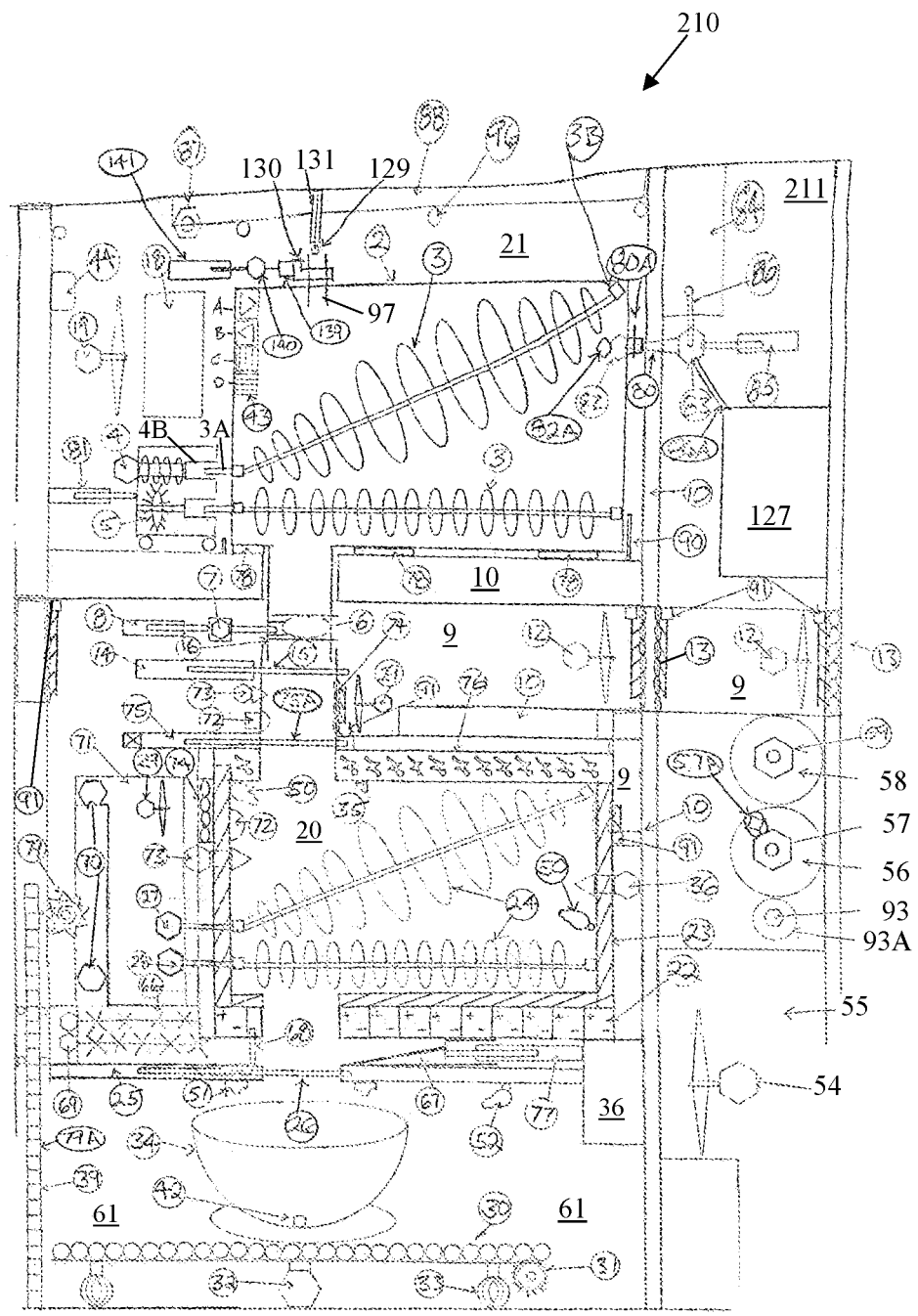
FIG. 34 illustrates a front sectional view of a dispenser compartment shown in FIG. 33, according to an embodiment.

FIG. 34 illustrates a front sectional view of a dispenser compartment 210 shown in FIG. 33, according to an embodiment. As mentioned previously above when referring to FIG. 33, the dispenser apparatus 201 may comprise a plurality of dispenser compartments 210 for the storage, cooking, and dispensing of liquids and foods into a user's bowl-container, as an example. As described above, each dispenser compartment 210 may comprise a refrigeration chamber 21, a cooking chamber 20, and a dispensing chamber 61, as shown in FIG. 34. For the ensuing description of the dispenser compartment 210, it should be understood that each dispenser compartment 210 possesses the same exemplary components, unless stated otherwise.

As shown in FIG. 34, the cooling chamber 21 may comprise a smart refrigeration container ("refrigeration container," "food container") 2 for the storage of foods and/or liquids to be cooked and dispensed, as an example. As an example, the food container 2 may be constructed of biodegradable, bio compostable, and/or recyclable materials, such as, for example, EarthPCB™ materials manufactured by Ezonyx Bio Technologies, Inc., and the food and/or liquid products stored within the refrigeration container 2 may be hermetically sealed due to a friction seal at a top portal 97 of the container 2. As shown as an example in FIG. 33, the friction seal may be formed by the joining of a female friction coupling 129, which is V-shaped, and a plant-based biodegradable, bio compostable, and/or recyclable plastic storage cap 131. Alternatively, as shown in FIG. 34, the friction seal may be formed by the joining of the female friction coupling 129, which is shown rectangular instead of V-shaped, and a rectangular storage cap 131, as an example. As shown, the refrigeration container 2 may also comprise a gate valve 130 that allows products to be dispensed into the container 2 after the friction seal has been formed such that ambient air is prevented from entering the container 2. Thus, because of the close-looped hermetic seal of the refrigeration container portal, the liquids and foods stored inside the refrigeration container may be securely and effectively cooled, as an advantage. As shown in FIG. 34, the cooling chamber 21 may further comprise a lid 88 connected to a F/R stepper motor 87 for opening and closing of the lid 88. As an example, the lid 88 may open or close to load and/or remove the refrigeration container 2 into and/or out of the cooling chamber 21. As an example, the refrigeration container 2 may need to be removed from the cooling chamber 21 and replaced once the food and/or liquid contents of the container 2 have been completely used.

As shown, the refrigeration container 2 may further comprise a set of augers 3 for mixing and/or moving foods and/or liquids within the container 2. As an example, each auger shaft 3 may comprise a first pin 3A, as shown, for connecting to a universal joint 4B. As shown, the universal joint 4B may connect directly or indirectly to a F/R stepper motor 4 with a geared shaft, which causes the mixer paddler-augers 3 to rotate. As shown, the lower universal joint 4B may attach to a bottom sprocket gear 5, which contacts the geared shaft of the F/R stepper motor 4. In such a configuration, both mixer augers 3 may be caused to rotate by a single F/R stepper motor 4, as an example. Such a configuration could be expanded, such that a third mixer auger may be used within the container 2, if needed. As shown, the F/R stepper motor 4 and the bottom sprocket gear 5 may be provided in a universal gear box that connects to an actuator 81. As described previously above, the food container 2 may be removed and replaced as needed from the cooling chamber 21. As an example, the actuator 81 causes the universal gear box to traverse forward and back, such that when a new container 2 is loaded into the cooling chamber 21, the R/F stepper motor 4 and sprocket gear 5 may be caused to engage with the pins 3A of the mixing paddle-augers 3 in the new container 2. As shown, each mixer auger 3 may also comprise a second pin 3B attached to an interior wall of the refrigeration container 2. As an example, the second pin 3B may hold the mixer auger 3 securely in place, such that when the mixer auger 3 rotates, the mixer auger does come unhinged thereby disrupting the mixing and/or moving of the foods and/or liquids.

As shown in FIG. 34, the refrigeration container 2 may also be provided with electronic tags (e-tags) 43. As an example, the e-tags 43 may be RFID or NFC, as well as bar codes or QR codes. As such, let 43A represent RFID e-tag, 43B represent NFC e-tag, 43C represent bar code, and 43D represent QR code, for example. Each e-tag 43 may function as a data tag containing information about the contents of the refrigeration container 2, such as the product type (e.g., food or beverage), ingredients, recipes, nutritional values of each ingredient (e.g., grams of sugar, calories, protein, potassium, calcium, iron, etc.). The e-tags 43 may also assist the onboard computer (not shown) in identifying the appropriate refrigeration container 2. As mentioned above, the apparatus 201 may comprise a plurality of dispenser compartments 210, with each dispenser compartment 210 having its own cooling chamber 21 and container 2. As such, different products or types of protein or vegetables, etc., may be stored throughout the dispenser apparatus 201. Thus, it is important for the efficient and successful operation of the dispenser apparatus 201 that the onboard computer recognize precisely where a desired ingredient is located within the apparatus 201. The e-tags 43 provide the computer with that vital identification information. Furthermore, the e-tags 43 may aid in portion control, as the e-tags contain identifying information about the quantity (e.g., volume or weight) of the respective ingredient in each food container 2.

As shown, the cooling chamber 21 may also be provided with guide fins 90 located on opposite sides of the refrigeration container 2. As an example, the guide fins 90 may hold the container 2 in a correct location relative to the other components in the cooling chamber 21, such that the friction couplings 129, 131, F/R stepper motors 4, gate valve 130, etc. are correctly in alignment. As an example, the guide fins 90 may be automated, such that they may traverse forward and backward, as needed to properly retrofit the container 2 within the cooling chamber 21. As shown in FIG. 34, the cooling chamber 21 may further comprise a set of computerized load weight cell-scales 78 disposed beneath the refrigeration container 2. As an example, the load weight scales 78 may weigh the refrigeration container 2 to assist in measuring the amount of foods or liquids stored in the container 2. The set of load weight cell-scales 78 may electrically communicate with the onboard computer (not shown). As an example, a user may request 8 ounces of chicken. As the automated augers 3 in the refrigeration container 2 begin to rotate such that to transfer the chicken pieces out of the container 2 and down into the cooking chamber 20, the weight of the container 2 may gradually decrease. When the computer detects an 8-ounce weight decrease via the load weight cell-scales 78, the augers 3 are caused to cease rotation preventing additional chicken from being transferred into the cooking chamber 20, as an example. Thus, an advantage is the accurate and effective dispensing of a precise amount of user-specified foods and/or liquids into the user's bowl-container.

Furthermore, the computerized load weight scales 78 may enable the autonomous apparatus 201 to track and monitor the product volume within each food container 2, as an example. As an example, the onboard computer (not shown) may continuously monitor the volume of the product/ingredient within a given food container 2 by measuring the weight of the food container 2 via the load weight scales 78, as mentioned above. Once the computer (not shown) detects a preset minimum weight (e.g., the weight of solely the container 2), the computer may notify a user (e.g., operator, technician, homeowner, etc.) that the food container 2 is empty, for example, such that the user can order a replacement container 2. Alternatively, or simultaneously, the computer (not shown) may be adapted to order the replacement container 2 automatically upon detecting a low container weight, as an example. It should be understood that the food container 2 may be configured to have a sensor within the container, such as a level sensor, for example, for directly monitoring the ingredient/product stored within the food container 2.

As shown in FIG. 34, the cooling chamber 21 may also be provided with a scanner mechanism 44 for scanning the e-tags 43, as discussed above, and transferring the e-tag data to the onboard computer (not shown). As shown as an example, the cooling chamber 21 may also be provided with a refrigeration-cooling mechanism/unit 18 for generating cold air at a temperature specifically designated for the type of food or liquid being stored in the refrigeration container 2. As an example, the refrigeration unit 18 may be provided with an automated thermostat sensor (shown by 18A in FIG. 33) for maintaining the temperature in each cooling chamber 21. As an example, the e-tags 43 may contain data for the temperature the food or liquid product should be stored at (e.g., for chicken, store at 38 degrees Fahrenheit). The onboard computer (not shown) may thus actuate the refrigeration-cooling unit 18 to set and maintain the cooling chamber 21 for that particular temperature designated by the e-tags 43, as an example. The thermostat sensor (18A) may continuously send temperature data to the onboard computer (not shown) such that the refrigeration-cooling unit 18 may be operated as needed. As shown, the cooling chamber 21 may also comprise a variable speed blower motor fan 19 for controlling the intensity of cold air flowing around the food container 2, which may further assist in temperature maintenance. Maintaining each cooling chamber 21 in the apparatus 201 at an individual temperature best suited for the foods or liquids being stored within each chamber 21 may keep the foods or liquids fresher for longer periods of time. Thus, an advantage is that the foods and/or liquids being stored within each temperature-controlled cooling chamber may have extended shelf lives, which may decrease the amount of food and/or liquid that gets wasted or becomes spoiled.

As shown as an example, the autonomous dispenser apparatus 201 may further comprise an ozone chamber 211. As shown in FIG. 34, the ozone chamber 211 may comprise an ozone tank/container 84 containing ozone ($O_3$) gas, as an example. As shown, the ozone tank 84 may connect to a gas spray/air pump 83 via a flexible tube 86, as an example. As an example, the gas spray pump may comprise a male friction coupling 80 that forms a seal with a female coupling 80A disposed in a side of the food container 2, as shown. The female coupling 80A may form a gate valve with a gas friction nozzle 82 disposed within the food container 2, as shown, which allows the ozone gas stored in the ozone tank 84 to be injected into the container 2. It should be understood that the ozone tank 84 may be adapted to contain other product enhancement compounds other than ozone gas. As an example, harmful bacteria could inadvertently enter or grow within the food container 2, which could spoil the foods or liquids contained therein. As such, the ozone gas injected into the container 2 may kill the bacteria, preventing any premature spoilage of the foods or liquids by said bacteria, which could cause food waste. As shown, the gas friction nozzle 82 may comprise a sensor 82A adapted for reading bacteria levels, oxygen levels, and ozone levels within the container 2. As an example, when the sensor 82A detects disruptive levels of bacteria or oxygen in the refrigeration container 2, the sensor 82A notifies the onboard computer (not shown) that ozone gas needs to be injected into the container 2. The onboard computer (not shown) may operate the gas spray pump 83, such that ozone gas is caused to be injected into the container 2. As shown, the gas spray pump 83 may also connect to an ozone generator 127 via a second flexible hose 86A. The ozone generator may produce ozone gas, which is stored in the ozone tank 84 via the gas spray pump 83 and hoses 86A, 86. As an example, the ozone generator 127 may be adapted to bypass the ozone tank 84 and alternatively inject the generated ozone gas directly into the refrigeration container 2 via the gas spray pump 83 and friction nozzle 82. As shown, the spray pump 83 may also connect to an actuator 85 attached at an opposite end of the male coupling 80. As an example, when the actuator 85 is engaged, the spray pump 83 and the male coupling 80 are caused to traverse forward such that to engage the female coupling 80A. The actuator 85 may be engaged and disengaged when replacing the container 2, as similarly discussed above as an example.

As an example, the food container 2 may be electrically powered via any suitable means, such as electrical induction rings, for example, allowing the food container 2 to be removable while still providing electrical power to its electronic components (e.g., sensor 82A).

As shown in FIG. 34, the food container 2 may attach to the cooking chamber 20 below via a bottom male coupling 16 having a downflow gate valve 6, as an example. As will be discussed in greater detail when referring to FIGS. 38A-38B, the foods and/or liquids transferred out of the refrigeration container 2 may pass through the downflow gate valve 6 and into the cooking chamber 20 for cooking of the foods and/or liquids. As will be described in greater detail later, the cooked foods and/or liquids may then be dispensed out of the cooking chamber 20 and into a user's bowl-container 34 in the dispensing chamber 61, as shown. As described previously above when referring to FIG. 33, the bowl-container 34 may traverse throughout the apparatus 201 via the conveyor system 30. As shown, the bowl-container 34 may comprise an e-tag 42 that allows the apparatus 201 to track and direct the bowl-container 34 to a particular dispensing chamber 61 for food and/or liquid dispensing. As an example, each dispensing chamber 61 may comprise e-tag sensors 51, as shown, for scanning the e-tag 42 of the bowl-container 34. The e-tag sensors 51 may electrically communicate with the onboard computer (not shown) for location tracking of the bowl-container 34. The computer may also communicate with the conveyor system 30 and each insulated door 39 for maneuvering and directing the bowl-container 34 to a particular dispensing chamber 61 in the apparatus 201, as an example. As shown, each insulated door 39 may comprise a plurality of tooth cavities 79A disposed throughout the insulated door surface. As an example, the insulated door 39 may contact a F/R stepper motor 79 having a toothed gear sprocket, such that when the F/R stepper motor 79 rotates, the toothed gear sprocket engages with the plurality of tooth cavities 79A, causing the insulated door 39 to raise/lower.

Figure 35:
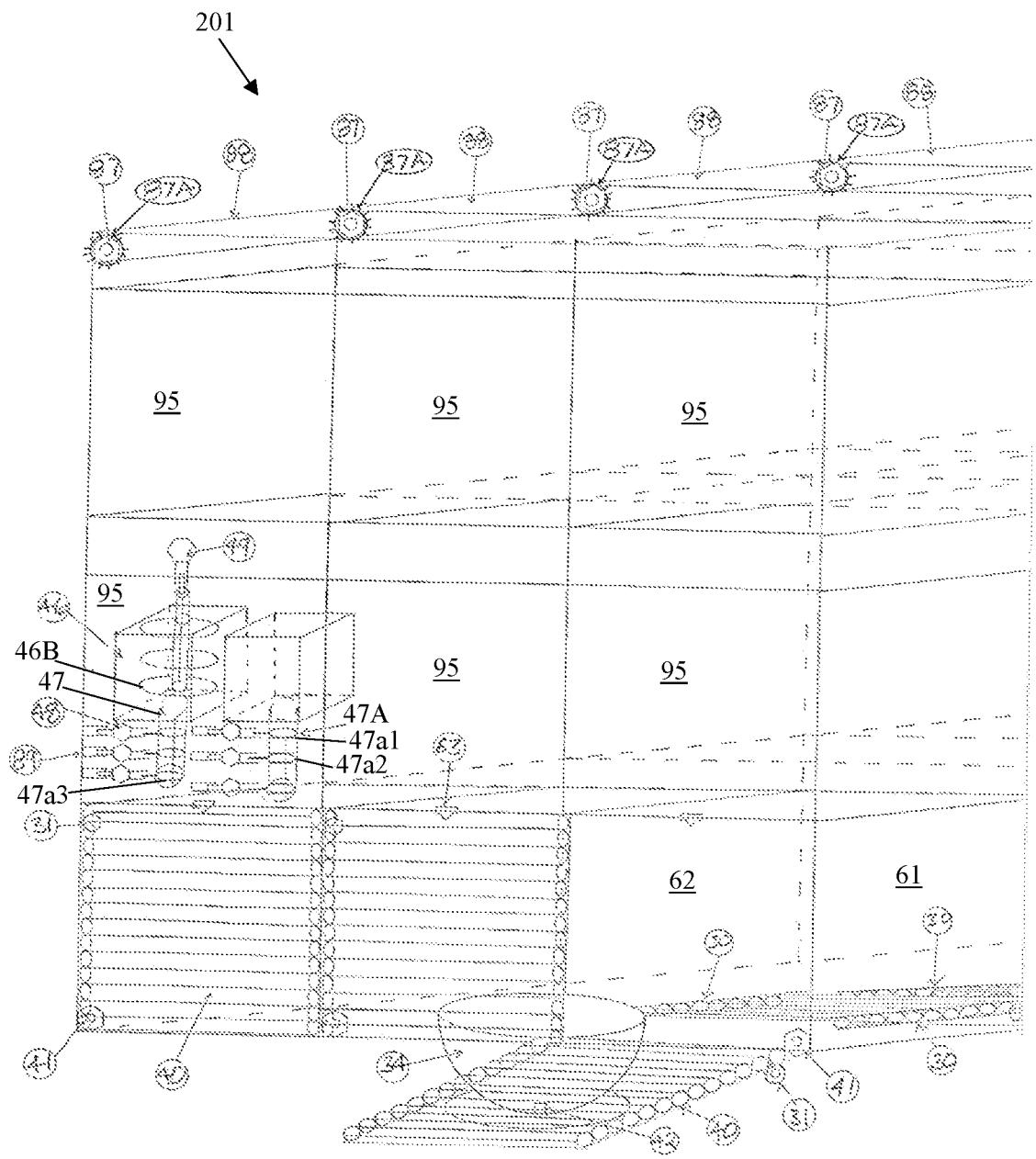
FIG. 35 illustrates a perspective detailed view of a front of the autonomous, self-cleaning food and liquid dispenser of FIG. 33, according to an embodiment.

FIG. 35 illustrates a perspective detailed view of a front of the autonomous, self-cleaning food and liquid dispenser 201 of FIG. 33, according to an embodiment. As mentioned previously above, the autonomous dispenser 201 may comprise a plurality of chambers disposed throughout the apparatus 201. As shown in FIG. 35, the autonomous dispenser 201 may comprise multiple front entryways 40 that may each be caused to raise and lower by the front F/R stepper motor 41. As shown, the front door 40 may also be provided with the secondary F/R stepper motor 31 for motorizing the rollers of the front door 40, as previously mentioned above. As an example, the front door rollers 40 may be caused to rotate by the stepper motor 31, such that a user's bowl/container 34 may be traversed out of the apparatus 201 or alternatively traversed into the apparatus 201. As an example, the apparatus 201 may be provided with a plurality of front doors 40, as shown, such that at least one front door 40 may function as an entrance into the apparatus 201 and that at least one front door 40 may function as an exit. As such, a user may place the bowl-container 34 onto the front door rollers 40 and the stepper motor 31 may cause the bowl-container 34 to be traversed into the apparatus 201 for dispensing of user-specified foods and/or liquids. The bowl-container 34 may then exit out of another front door 40 following the autonomous dispensing of the user-specified foods and/or liquids, as an example.

As mentioned previously above, the apparatus 201 may be provided with storage chambers 95 for the temperature-controlled storing of flavor enhancement products (e.g., sauces, spices, dressings, etc.). As shown, each storage chamber 95 may be disposed above the secondary dispensing chamber 62 at the front of the apparatus 201, such that the foods and/or liquids dispensed in the bowl-container 34 may receive flavor enhancement products immediately prior to the bowl-container being returned to the user, as an example. It should be understood that the exemplary components (e.g., 46, 48) of the storage chamber 95 are only shown once in FIG. 35 for clarity. As mentioned previously when referring to FIG. 33, each storage chamber 95 may comprise a smart storage container 46 having an auger-mixer shaft, as shown, for mixing the flavor enhancement products stored within the smart storage container 46. As shown, the storage container 46 may be provided with top F/R stepper motor 49 that is adapted to cause a rotation of the auger-mixer blades 46B for movement of the flavor enhancement products toward the pour spout tube 47.

As shown, the pour spout tube 47 may comprise multiple gate valves 47A that may be opened and closed. As shown, each gate valve 47A may be attached to an actuator motor 48 for opening and closing of the gate valve, as an example. As an example, each gate valve 47A may comprise a different diameter, such that different size chambers are created within the pour spout tube 47. As an example, let a first gate valve chamber 47a1 be ½ ounces, a second gate valve chamber 47a2 be 1 (one) ounce, and a third gate valve chamber be 2 (two) ounces. The storage chamber 95 may also be provided with load weight cell-scales (not shown), similar to 78 shown in FIG. 34, for detecting weight changes of the contents in the storage container 46, as an example. As an example, let the smart storage container contain honey, and suppose the user desires 2.5 (two and a half) ounces of honey be dispensed onto the user's breakfast yogurt bowl. After receiving input data from the user, the onboard computer (not shown) may operate the actuator motors 48, such that the gate valve chambers 47a3 and 47a1 are open and gate valve chamber 47a2 is closed. The computer may then actuate the stepper motor 49, such that the auger fins 46B are caused to rotate and thus force the honey to flow into the pour spat tube 47, as an example. The honey will fill gate valve chambers 47a3 and 47a1, which together make a volume equal to 2.5 ounces, such that 2.5 ounces of honey flow through the pour spat tube 47 and onto the bowl-container 34 in the dispensing chamber 62. Thus, an advantage is the accurate and controlled dispensing of flavor enhancement products autonomously onto a user's foods and/or liquids.

As shown in FIG. 35, a plurality of secondary stepper motors 89 may be provided in the storage chamber 95, as an example. As shown, each secondary stepper motor 89 may connect to an actuator motor 48, such that each actuator motor 48 is caused to traverse forward or back by the stepper motor 89. As similarly discussed above when referring to the food container 2 of FIG. 34, the storage containers 46 may need to be removed and replaced once the contents have been exhausted, as an example. The stepper motors 89 may thus cause the actuator motors 48 to disengage from the gate valves 47A in the tube 47, such that the storage container 46 can be removed from the storage chamber 95 like a cartridge, for example. When a new storage container 46 is placed into the storage chamber 95, the stepper motors 89 may cause the actuator motors 48 to traverse forward such that to engage with the gate valves 47A, as an example. As shown, it should be understood that more than one smart storage container 46 may be employed in each storage chamber 95 at a time. As will be described in greater detail below, each storage container 46 may be removed via a top lid 88, as shown in FIG. 35.

As mentioned previously above when referring to FIG. 34, the autonomous dispenser 201 may be provided with a plurality of lids 88, with each lid 88 being disposed above a chamber (e.g., 95, 21) throughout the apparatus 201. As shown in FIG. 35, each lid 88 may be attached to a F/R stepper motor 87 having a sprocket gear 87A. As an example, the lids 88 may be adapted to open and close autonomously, wherein the onboard computer (not shown) actuates the stepper motors 87 to rotate, thus causing the sprocket gears 87A to raise and lower the lids 88.

Figure 36:
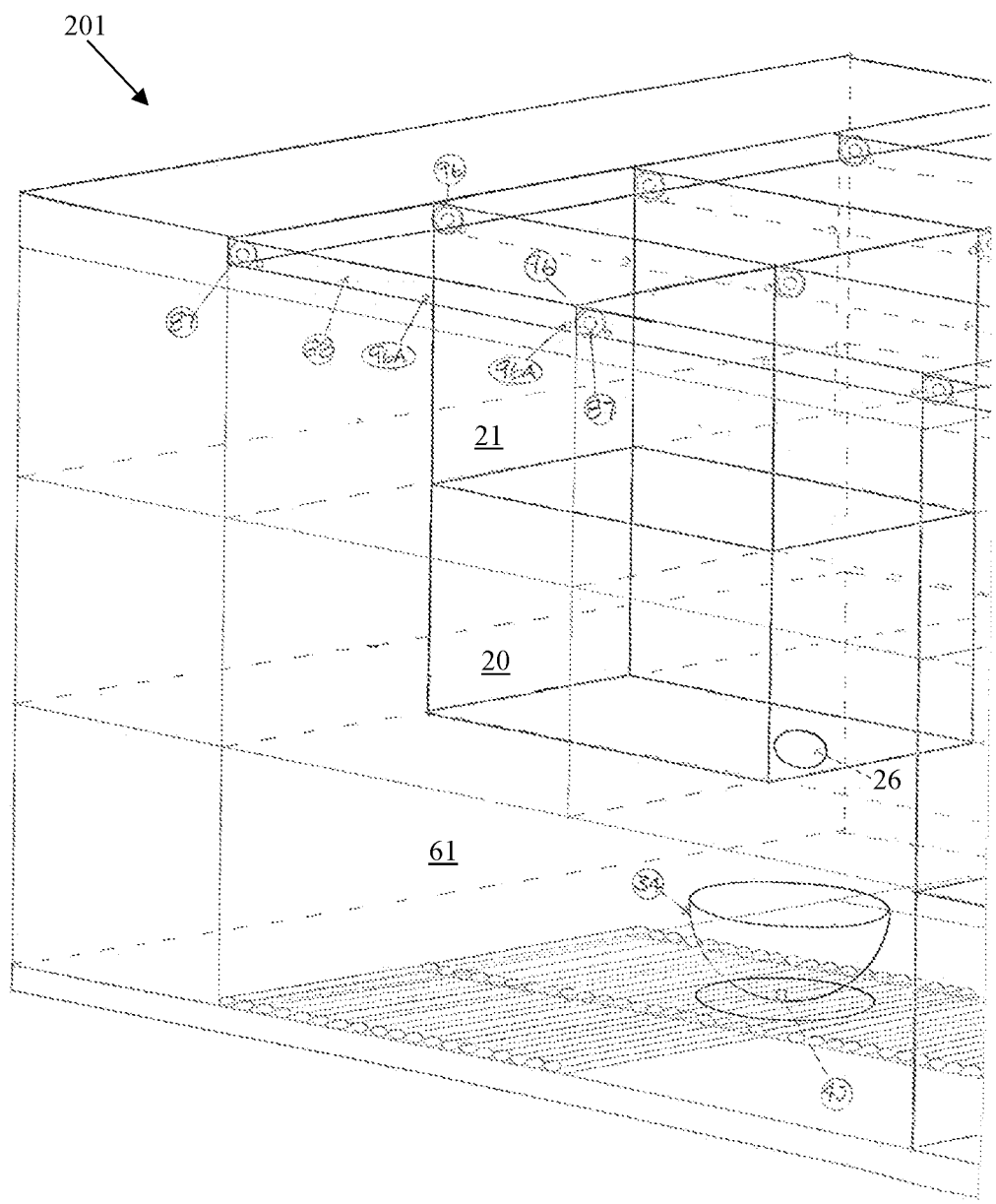
FIG. 36 illustrates a perspective detailed view of a side of the autonomous, self-cleaning food and liquid dispenser of FIG. 33, according to an embodiment.

FIG. 36 illustrates a perspective detailed view of a side of the autonomous, self-cleaning food and liquid dispenser 201 of FIG. 33, according to an embodiment. As mentioned previously above, the dispenser apparatus 201 may be provided with a plurality of chambers throughout the body of the apparatus 201, such that meals having multiple ingredients may be successively dispensed into the user's bowl-container 34. As shown in FIG. 36, the cooling chambers 21 may be disposed above the cooking chambers 20 and may thus populate the central/middle portions of the apparatus 201. It should be noted that the exemplary components that make up the cooling chambers 21 and the cooking chambers 20 are not shown in FIG. 36 for clarity.

As shown in FIG. 36, the top lids 88 may be adapted to alternatively comprise roller wheels 96 (instead of sprocket gears 87A, for example) that allow the lids 88 to easily traverse laterally to open and close for the removal and replacement of components (e.g., food container 2) within the top cooling chambers 21. As an example, the roller wheels 96 may be disposed around the F/R stepper motors 87, described above, such that a rotation of the stepper motors 87 may cause the lids 88 to slide laterally to open and close. As shown, in this alternative embodiment the lids 88 may each further comprise a set of track wheels 96A that assist in the traversing of the lid sideways, as an example. As will be described in greater detail below, the lids 88 may be adapted to slide into one another, such that the lids 88 are stacked, allowing the cooling chambers 21 to be completely exposed, as an example.

Figure 37:
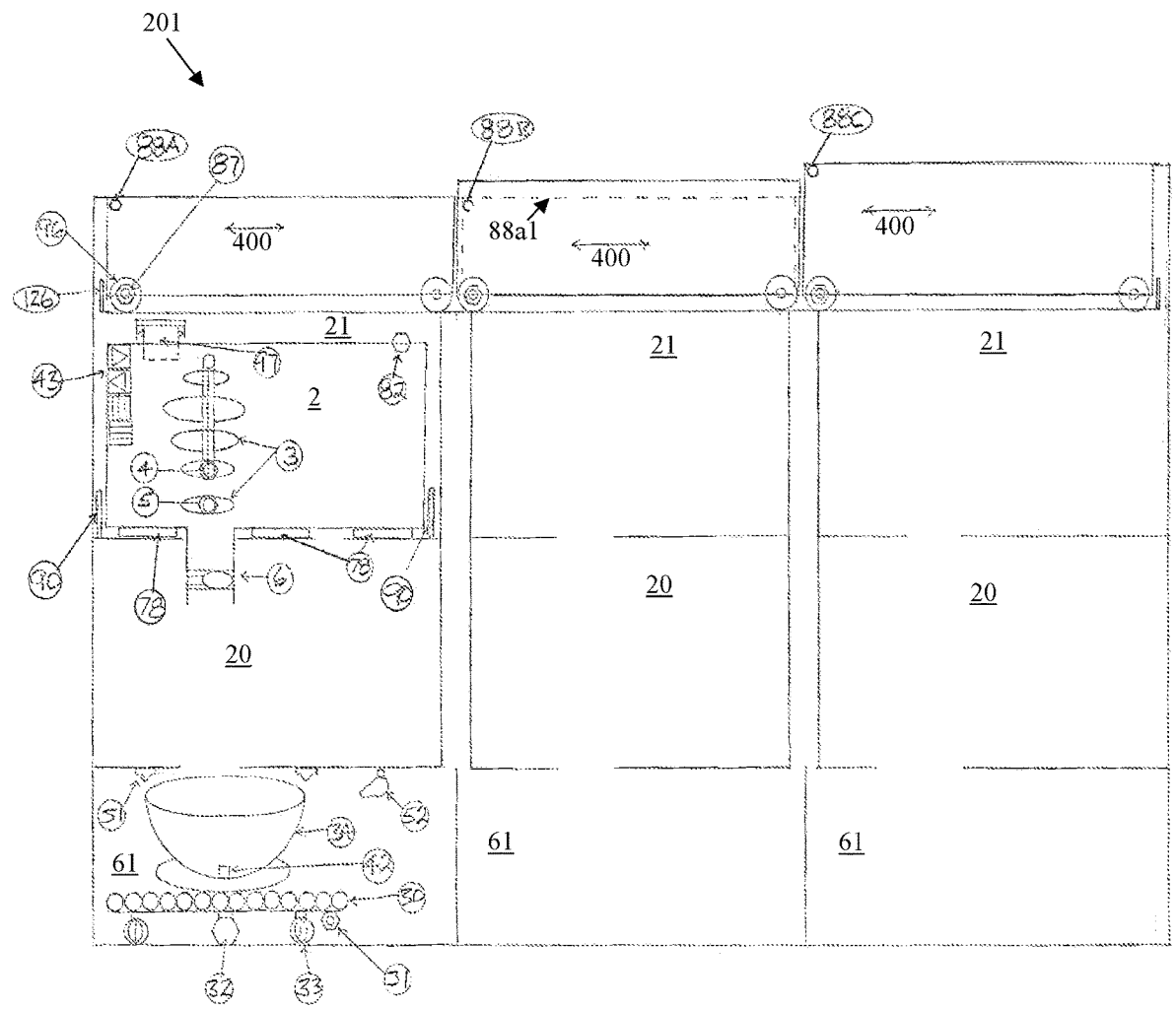
FIG. 37 illustrates a front perspective sectional view of the autonomous, self-cleaning food and liquid dispenser of FIG. 36, according to an embodiment.

FIG. 37 illustrates a front perspective sectional view of the autonomous, self-cleaning food and liquid dispenser 201 of FIG. 36, according to an embodiment. It should be noted that certain exemplary components that make up the cooling chambers 21 and the cooking chambers 20 are not all shown in FIG. 37 for clarity. As mentioned above when referring to FIG. 36, the lids 88 may traverse laterally such that to expose the cooling chambers 21 and thus to allow the refrigeration container 2 to be removed and/or replaced, as needed. As shown in FIG. 37, the lids 88A-88C may be provided having varying heights, as an example, such that each lid may be traversed into an adjacent lid, such that the lids are stacked. As an example, a first lid 88A may be provided with a first height, as shown, and a second lid 88B adjacent to the first lid 88A may be provided with a second height taller than the first height. The first lid 88A may traverse sideways as indicated by the arrows 400, such that the first lid 88A is positioned beneath and within the second lid 88B, as indicated by the dashed lines 88a1. As such, the cooling chamber 21 may be fully exposed, allowing a user to easily replace the refrigerator container 2, as discussed previously in this disclosure. As shown, each dispenser compartment 210 may be provided with a lid 88A-88C to facilitate component removal and replacement, as well as any maintenance that may be necessary (e.g., electronics failure, wiring repair, gear replacement, etc.).

Figure 38A:
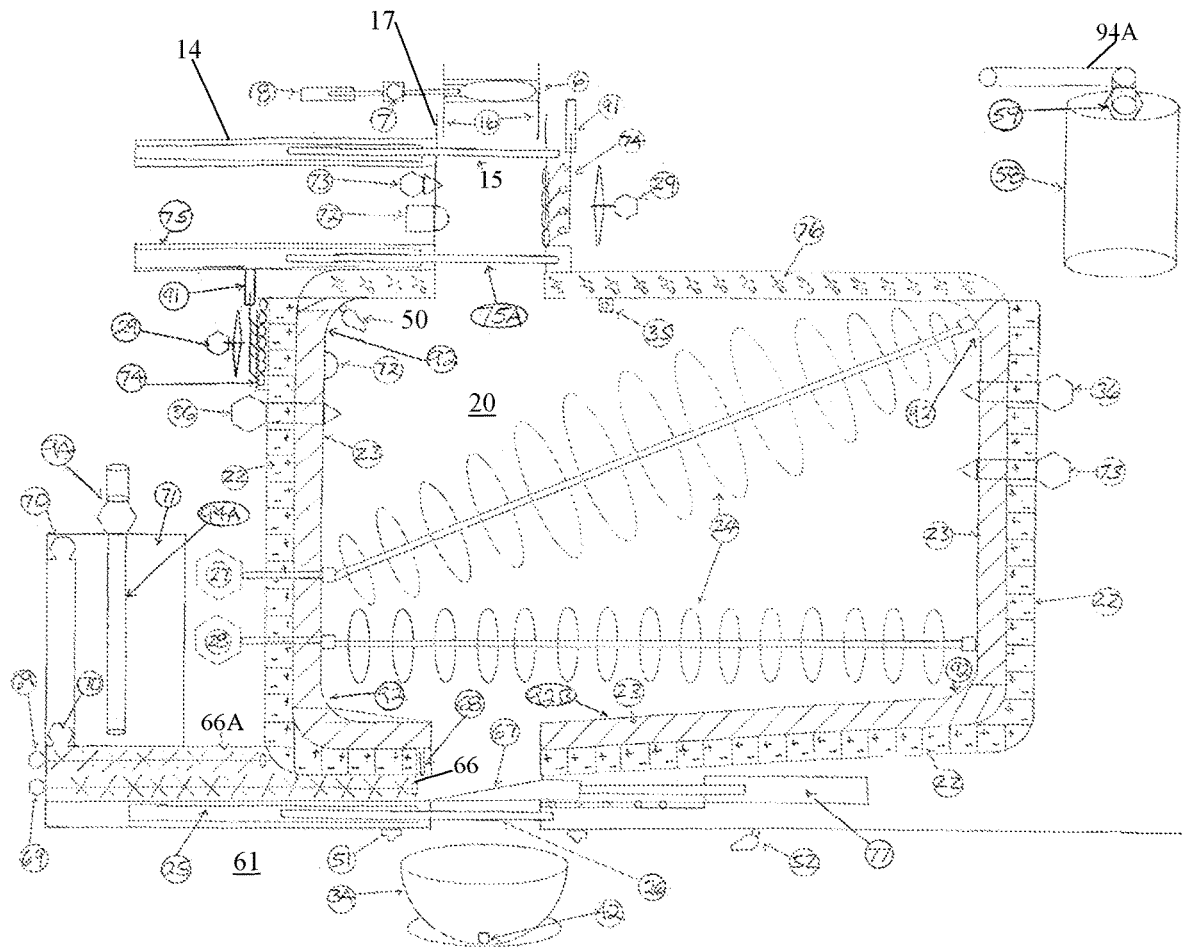
FIGS. 38A-38B illustrate a side sectional view and a side detailed perspective view, respectively, of the cooking chamber shown in FIG. 33, according to an embodiment.
Figure 38B:
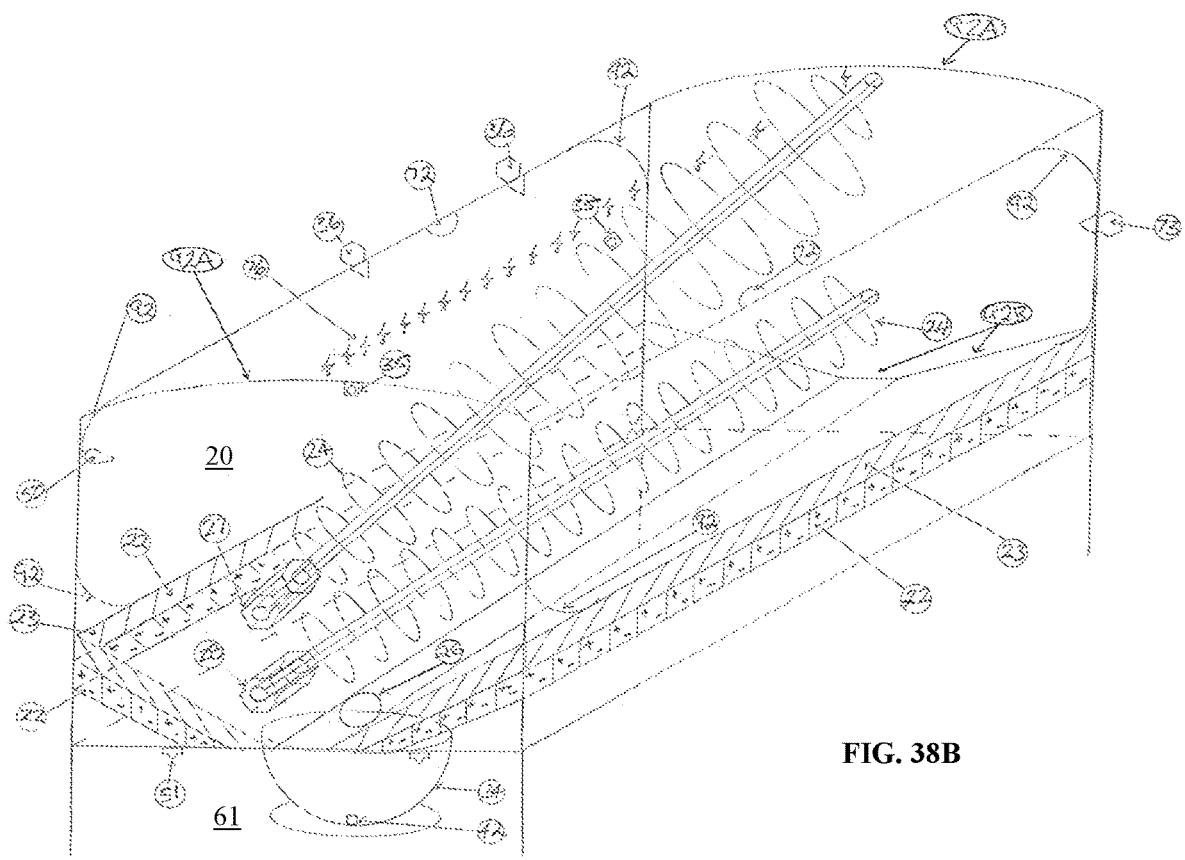

FIGS. 38A-38B illustrate a side sectional view and a side detailed perspective view, respectively, of the cooking chamber 20 shown in FIG. 33, according to an embodiment. As described previously above when referring to FIG. 36, the autonomous dispenser 201 may comprise a plurality of chambers, said chambers being storage chambers 95, cooling chambers 21, and/or cooking chambers 20. As described above, foods and/or liquids chilled and stored in the cooling chamber 21 may be transferred from the refrigeration container 2 down to the cooking chamber 20 for the cooking and preparation of said foods and/or liquids. It should be understood that each cooling chamber 21 and each cooking chamber 20 of the plurality of chambers interact in this way. As will be described herein below, the cooking chamber 20 may cook, prepare, and dispense the foods and/or liquids according to user-specified input data.

As shown in FIG. 38A, the cooking chamber 20 may comprise a top female coupling 17 that forms a friction seal with a bottom male coupling 16 of the refrigeration container 2, as previously shown in FIG. 36. As shown, the bottom male coupling 16 may comprise a downflow gate valve 6 that forms a through portal between the cooking chamber 20 and the refrigeration container 2 above it, as an example. As shown, the gate valve 6 may connect to a F/R stepper motor 7, which causes the gate valve 6 to rotate to open or close when actuated. The F/R stepper motor 7 may be attached to an actuator 8 that traverses the F/R stepper motor 7 forward and back, as needed, such that the stepper motor 7 is caused to engage or disengage with the gate valve 6. As an example, when the refrigeration container 2 in the cooling chamber 21 is being replaced, the actuator 8 may draw the F/R stepper motor 7 backwards away from the gate valve 6, such that the stepper motor 7 and the gate valve 6 are disengaged, and such that a seal between the cooking chamber 20 and the cooling chamber 21 is broken. When a new refrigeration container 2 is inserted into the cooling chamber 21, the F/R stepper motor 7 may be traversed forward by the actuator 8 such that to engage with the gate valve 6, reforming the seal between the cooling chamber 21 and the cooking chamber 20, as an example.

As shown, the top female coupling 17 may be provided with a top actuator 14 for opening and closing a portal valve 15 disposed through the female coupling 17, as an example. As an example, the female coupling 17 may form a pathway for foods and/or liquids stored in the cooling chamber 21 above the cooking chamber 20 to travel through. After the foods and/or liquids are dispensed into the cooking chamber 20, the actuator 14 may cause the portal valve 15 to close such that no excess food or liquid may pass into the cooking chamber 20, as an example. As shown, the cooking chamber 20 may be provided with a second actuator 75 and portal valve 75A set right at the entrance to the cooking chamber 20. The actuator 75 and portal valve 75A may operate and function in the same manner as described above and may help prevent heat from rising up through the female coupling 17 and into the refrigeration container 2, as an example.

As shown in FIG. 38A, the cooking chamber 20 may further comprise an ultraviolet (UV) lighting system or array 72, high-pressure water spray nozzles 73, and a motorized air vent system 74 having a blower fan 29 disposed throughout the cooking chamber 20. As an example, the apparatus 201 may be adapted to be self-cleaning, particularly in the cooking chamber 20 where the apparatus 201 may become the dirtiest due to the presence of cooking oils, food products, and steam, for example. The UV lighting array 72, the high-pressure water spray nozzles 73, and the motorized air vent system 74 may assist in the self-cleaning functionality of the disclosed apparatus 201, as will be described below.

As an example, the UV lighting system 72 may be caused to emit UV light by the onboard computer (not shown) for disinfecting and killing of bacteria in the female coupling walls 17 as well as in the cooking chamber 20 itself, as shown in FIG. 38A. The UV lighting system 72 may also be disposed throughout the air ducts and plenums 9 for cleaning of bacteria and organisms in those areas of the apparatus 201 as well. As an example, the UV light array 72 may be adapted to be emitted for preset periods of time in between preparation, cooking, and dispensing cycles. The high-pressure water spray nozzles 73 may be adapted to inject sanitizing and/or hot washing and rinsing water into the female coupling 17 and in the cooking chamber 20, as shown as an example. The water spray and sanitizing agent may clean and disinfect areas of the cooking chamber 20 having excess food and cooking matter. The spray nozzles 73 may be electrically controlled by the onboard computer (not shown), such that the cooking chamber 20 may be pressure washed at predetermined times (e.g., in between cooking cycles). As shown in FIG. 38A, the motorized air vents 74 and the blower fans 29 may be provided in the female coupling 17 and in the cooking chamber 20 such that smoke and hot air may be drawn into the air vents 74 during cooking, preventing excess grime from building up within the cooking chamber 20. The air vents 74 may be heat resistant and may be provided with the blower/exhaust fans 29, as shown, for drawing in smoke during cooking, as an example. It should be noted that the blower fans 29 may be adapted for alternatively blowing air into the cooking chamber 20 via the air vents 74, as needed. Thus, the autonomous dispenser 201 may be a fully self-sufficient and self-cleaning apparatus, as mentioned above. Thus, an advantage is that a user need not manually wash and clean the cooking chamber after use, saving time and effort, and reducing associated labor and operational costs.

As shown in FIGS. 38A-38B, the cooking chamber 20 may be provided with rounded/curved interior corners 92, such that the cooking chamber 20 has a dome shape 92A, as shown in FIG. 38B. As will be described in greater detail later, the cooking chamber 20 may also comprise a sloped bottom floor 92B, as shown in FIGS. 38A-38B. As shown as an example, the cooking chamber 20 may comprise a plurality of induction plates 23, which form the walls and bottom floor of the cooking chamber 20. As an example, the plurality of induction plates 23 may comprise iron surfaces for better transferring thermal energy in the form of heat throughout the induction plates 23 for cooking purposes. As shown, the plurality of induction plates 23 may comprise a plurality of induction generators/exciters 22, each induction plate 23 having an induction generator 22. As an example, the plurality of induction generators 22 may induce an electric current within the plurality of induction plates 23, such that sufficient heat is generated along the plurality of induction plates 23 for cooking foods and/or liquids (e.g., soup). The induction generators 22 may comprise electromagnets and power coils for generating heat, as an example. As shown in FIGS. 38A-38B, the cooking chamber 20 may further comprise a plurality of broiler cooking mechanisms/coils 76, which could be electric resistance heating coils or gas heating portals, as examples. As shown, the broiler coils 76 may line the top or ceiling of the cooking chamber 20 such that to expose the foods and/or liquids to direct radiant heat from above, as an example. As shown as an example, the cooking chamber 20 may also be provided with steam spray nozzles 36 for introducing steam into the cooking chamber 20 for steam heat cooking.

As shown, the cooking chamber 20 may also be provided with a pair or more of hard mixer augers 24 disposed across the interior of the cooking chamber 20. As an example, the mixer augers 24 may be made of stainless steel or other metal, ceramic, or hard material capable of withstanding high temperatures. The pair of mixer augers 24 may function to stir food as it is cooking within the cooking chamber 20, as well as to move the food out of the cooking chamber through a bottom gate valve 26 once the food is finished cooking. As an example, each end of the auger shaft may comprise a heat-resistant roller bearing which may allow the shaft to rotate in a clockwise or counterclockwise direction, as needed. As shown, the ends of the pair of mixer augers 24 may form a friction connection with a F/R stepper motor 27 and a geared sprocket 28, respectively. As an example, the F/R stepper motor 27 and the geared sprocket 28 may cause the pair of mixer augers 24 to rotate to mix and move the foods and/or liquids in the cooking chamber 20, as mentioned above. Thus, the cooking chamber 20 may be adapted to accommodate a variety of desired cooking methods, such as electric or gas-powered steam cooking, broiler cooking, convection oven cooking, bake oven cooking, burner top cooking, rotisserie style cooking, as examples. Thus, an advantage is the ability to cook a wide variety of food types and styles using any preferred cooking method, all in a single, easy-to-use, autonomous apparatus. As will be described in greater detail later, the user may provide the apparatus with a cooking method selection when the user selects a particular food product or meal, for example.

As shown as an example, the cooking chamber 20 may further comprise tracking cameras 50 and temperature sensors 35 disposed within the chamber 20. As an example, the temperature sensors 35 may read the temperature inside the cooking chamber 20 and may electrically send the temperature reading to the onboard computer (not shown). The onboard computer (not shown) may thus utilize the temperature sensors 35 to monitor the cooking temperature, such that the electric current flowing through the induction generators 22 or broiler coils 76 may be increased or decreased to change the overall cooking temperature, as an example. Cooking temperatures may need to be adjusted before cooking or during cooking, as an example, to properly accommodate a user-requested cooking doneness (e.g., a steak cooked medium-rare). The tracking cameras 50, which may be high temperature resistant cameras, for example, may monitor the cooking within the cooking chamber 20, as an example. The cameras 50 may continuously transmit data images to the onboard computer (not shown), such that the computer may determine the completion of the cooking process in part visually. As will be described in detail later, the computer may be programmed and trained with existing training images, such that the computer may compare the live data images with the "correct" training images.

As shown in FIGS. 38A-38B, the cooking chamber 20 may be provided with a bottom gate valve portal 26 (shown closed in this view) leading into the dispensing chamber 61. As an example, the gate valve portal 26 may allow cooked foods and/or liquids to flow from the cooking chamber 20 down to the user's container-bowl 34, such that the cooked foods and/or liquids are effectively dispensed from the apparatus 201. As shown, the gate valve portal 26 may be attached to an actuator 25 for opening and closing of the gate valve portal 26, as an example. As mentioned previously above, the bottom floor 92B of the cooking chamber 20 may be slanted downward, as better shown in FIG. 38B, such that food/liquid may more easily travel/flow downwardly toward the gate valve portal 26. Following the dispensing of the cooked foods and/or liquids into the bowl-container 34, the gate valve portal 26 may be closed and the bowl-container 34 may be traversed to other chambers within the apparatus and/or out to the user for final retrieval, as an example. It should be understood that the conveyor system 30 on which the bowl-container 34 travels is not shown for clarity.

As an example, the cooking chamber 20 may further comprise a garbage disposal system that functions in tandem with the self-cleaning mechanisms (e.g., 73) discussed above. As mentioned above, the cooking chamber 20 may be provided with high-pressure water spray nozzles 73 for cleaning the cooking chamber 20 and other areas of the apparatus 201 where food or dirt particles are likely to develop. As an example, the washing and rinsing water will need to be collected and stored away for disposal following the automated cleaning cycle of the cooking chamber 20. As shown in FIG. 38A, a slanted gate valve 67 attached to an actuator 77 may be positioned above the bottom gate valve portal 26. The slanted gate valve 67 may lead toward a garbage disposal chamber 66, as shown, having a gate valve 68 adapted to rise and lower to expose and seal off the garbage disposal chamber 66, as an example. As an example, the garbage disposal chamber 66 may be provided with a set of shafts having sharp blades 66A for grinding of food particles. As shown, each shaft 66A may be attached to a F/R stepper motor 69 which causes the bladed shaft 66A to rotate and therefore grind up food particles, as an example. The garbage disposal chamber 66 may also be provided with a suction pump for drawing the wastewater through the garbage disposal chamber 66 and into a filtering container/reservoir 71, as shown. As shown, the filtering container 71 may comprise a water tube 94A and coupler 94 that lead to an external removable water tank 58, which is shown detached in FIG. 38A. As an example, the filtering reservoir 71 may trap any food particulates passing out of the disposal chamber 66. The filtering reservoir 71 may be removable and may be constructed of biodegradable, bio compostable, and/or recyclable materials for safe and easy disposal, for example.

As an example, the water tank 58 may be provided with a suction pump 59 for removing all wastewater from the filtering container 71 and storing the wastewater in the removable water tank 58. The water tank 58 may also be biodegradable, bio compostable, and/or recyclable, such that when the water tank 58 is fully filled and removed from the apparatus 201, the whole water tank 58 may be safely and ergonomically disposed of as a complete unit. The sanitizing agent/detergent used to clean the cleaning chamber 20 and other areas of the apparatus may be eco-friendly such that no toxic residue or soap scum is left in the apparatus 201 and may be odorless. As such, the wastewater containing the used sanitizing agent may not be harmful to the environment when the water tank 58 and the wastewater are disposed of.

As an example, following the successful cooking and dispensing of a food/liquid from the cooking chamber 20 into the bowl-container 34, the onboard computer (not shown) may initiate the cleaning cycle, mentioned herein above. The top and bottom gate valve portals 15, 26 may be caused to close, and each of the cooking mechanisms (e.g., 22, 23, 36, 76) may be turned off such that the cooking chamber 20 may cool down and the remaining heat dissipated through the air vents 74. The slanted gate valve 67 may then be caused to traverse over the bottom gate valve 26, as shown in FIG. 38A, and the gate valve 68 may be raised such that the garbage disposal chamber 66 is exposed. The high-pressure spray nozzles 73 may then be caused to inject water containing sanitizing agents into and throughout the cooking chamber 20, such that all surfaces within are sufficiently cleaned. As mentioned above, the cooking chamber 20 may comprise rounded interior corners 92, which may facilitate efficient washing waterflow throughout the cooking chamber 20. Then, as the washing and rinsing water flows downwardly along the walls of the cleaning chamber 20 toward the bottom floor 92B, food and dirt particles may be washed away and carried along. As the wastewater approaches the bottom floor 92B, the wastewater may be directed downwardly due to the slope of the bottom floor 92B and may flow onto the slanted gate valve 67 and into the garbage disposal chamber 66. The suction pump 70 may continuously draw the wastewater through the garbage disposal chamber 66, and meanwhile the toothed shafts 66A are caused to rotate such that to grind down any food or dirt pieces/particles being carried by the wastewater. Then, the wastewater is drawn into the filtering container 71 by the suction pump 70, where it is stored until the cleaning process/cycle is completed. Once the cleaning cycle concludes, the wastewater may be drawn into the water tank 58 by the secondary suction pump 59, traveling from the filtering container 71 through the water tube 94A. The UV light arrays 72 may then be caused to emit UV light such that any remaining bacteria or microorganisms may be killed, as well as to facilitate speedier drying of the cleaning chamber 20, as an example. Once the water tank 58 is full of wastewater (e.g., after a few cleaning cycles), a user may remove the water tank 58 and properly dispose of its contents and the water tank 58, as an example.

Before the next cooking cycle, as an example, the slanted gate valve 67 may be caused to retract by the actuator 77 and the gate valve 68 may be caused to lower, such that the garbage disposal chamber 66 is sealed off. The UV light system 72 may be caused to deactivate, if not deactivated already, and the gate valve portal 75A may be caused to open, such that the newly cleaned cooking chamber 20 may receive food and/or liquid ingredients for the next cooking cycle.

Figure 39:
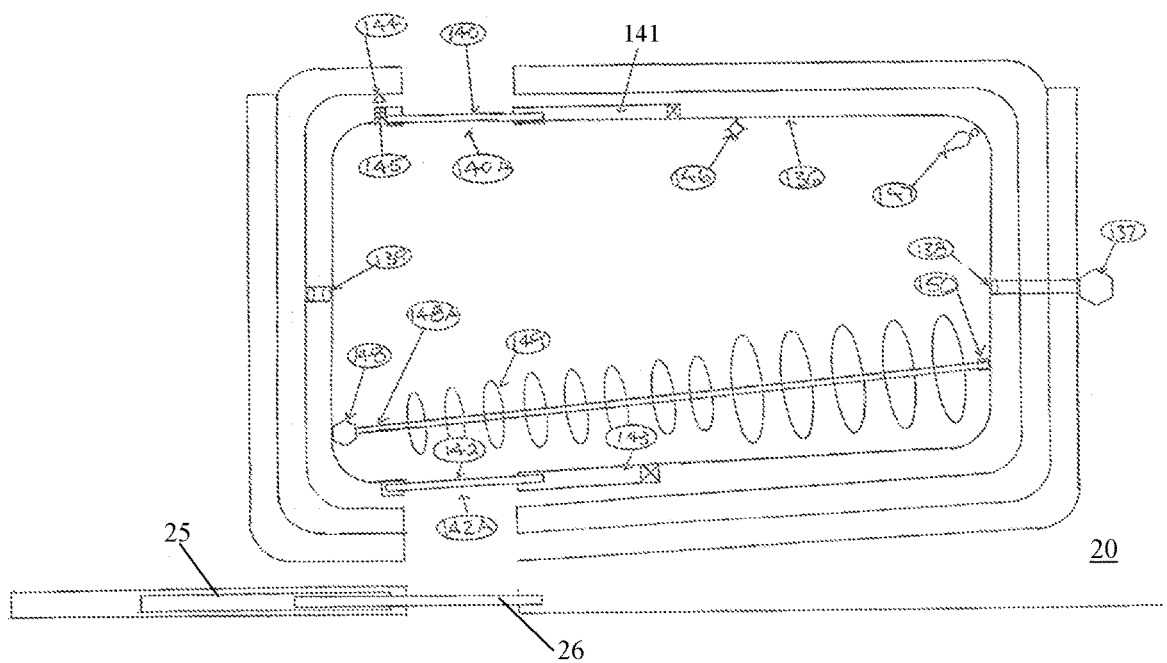
FIG. 39 illustrates a side view of a cooking drum for use in the cooking chamber shown in FIGS. 38A-38B, according to an embodiment.

FIG. 39 illustrates a side view of a cooking drum 136 for use in the cooking chamber 20 shown in FIGS. 38A-38B, according to an embodiment. As described above when referring to FIGS. 38A-38B, the cooking chamber 20 may be provided with hard mixing augers 24 for mixing and moving the foods and/or liquids during cooking. As an example, it may be advantageous or desired to provide the cooking drum 136 in the cooking chamber 20 as an alternative for the mixing augers 24. As will be described herein below, the cooking drum 136 may be adapted to rotate like the mixing augers 24, such that the foods and/or liquids may be mixed and moved. It should be understood that portions of the cooking chamber 20 have been omitted in this view for clarity.

As shown in FIG. 39, the cooking drum 136 may comprise a top gate valve 140 that is adapted to traverse forward and back (via an actuator 141), such that foods and/or liquids to-be-cooked may travel from the refrigeration cooler 2, through the female coupling 17, and into the cooking drum 136 via a portal 140A. As an example, the cooking drum 136 may be constructed of heat resistant glass such that the cameras 50, shown in FIGS. 38A-38B, may visually monitor the foods and/or liquids being cooked inside the cooking drum 136, as similarly discussed previously above. As shown, the cooking drum 136 may also be provided with a F/R stepper motor 137 connected to a shaft and bearing 138, the shaft 138 being connected to the body of the cooking drum 136. As shown, the cooking drum 136 may further comprise a second shaft and bearing 139, such that when the F/R stepper motor 137 causes a rotation of the shaft 138, the cooking drum 136 may be caused to rotate about the second shaft 139, as an example. The rotation of the cooking drum 136 may facilitate a more even cooking of foods and/or may allow for the cooking of foods where rotation is desired (e.g., stir fries). As will be discussed in greater detail below, the cooking drum 136 may also be provided with an exit portal 142A for cooked liquids and/or foods to be dispensed out of the cooking drum 136. It should be understood that, because the autonomous dispenser 201 may be provided with a plurality of cooking chambers 20, the autonomous dispenser 201 may be provided with both the traditional auger 24 cooking tool and the cooking drum 136. Thus, an advantage is the ability of the autonomous dispenser to cook and prepare a wide variety of food types and styles.

As shown in FIG. 39, the cooking drum 136 may further comprise sensors 144, 145 disposed near the entry portal 140A. As an example, the rotation sensor 145 may electrically communicate with the onboard computer (not shown)

and may indicate the rotation location, direction, and speed of the cooking drum 136. The rotation sensor 145 may help ensure that the cooking drum 136 concludes its rotation (during cooking) with the entry portal 140A and the exit portal 142A properly positioned (i.e., with the entry portal 140A directly on top and the exit portal 142A directly on bottom). The sensor 144 may function as a guiding sensor for aligning the cooking drum 136 properly within the cooking chamber 20, as an example. The guiding sensor 144 may help align the entry portal 140A with the refrigeration container portals (e.g., 75A, 6) such that food to-be-cooked may efficiently and easily be transferred into the cooking drum 136, as an example. As shown, the cooking drum 136 may also be provided with a heat resistant camera 147, which may function similarly to the camera 50 in the cooking chamber 20, as an example. The camera 147 may monitor portions/parts of the cooking liquids/foods that the camera 50 may not be able to clearly see, as an example. As similarly discussed above, the camera 147 may monitor the doneness of the foods being cooked (e.g., desired crispiness of noodles). As shown as an example, the cooking drum 136 may further comprise a temperature sensor 146 for measuring the temperature inside the cooking drum 136. As an example, the temperature sensor 146 may communicate with the onboard computer (not shown) such that the temperature may be adjusted within the cooking drum (via the insulation plates 22, for example).

As shown in FIG. 39, the cooking drum 136 may also be provided with a mixer auger 149 extending across the interior of the cooking drum 136. As shown, the mixer auger 149 may comprise an auger shaft 148A attached to a heat-resistant F/R stepper motor 148 for rotating the mixer auger 149, as an example. As shown, a far end of the auger shaft 148A may be attached to a pivot joint 150 for supporting the rotation of the auger 149, as an example. As an example, the mixer auger 149 may contribute to the cooking of the foods and/or liquids within the cooking drum 136, the mixer auger 149 mixing and moving the foods and/or liquids while the cooking drum 136 rotates. Additionally, the mixer auger 149 may move the cooked foods and/or liquids out of the cooking drum such that the cooked foods and/or liquids are transferred to the cooking chamber 20 and dispensed through the bottom gate valve 26, as shown. As mentioned previously above, the cooking drum may be provided with the exit portal 142A through which cooked foods and/or liquids may exit the cooking drum. As shown, the exit portal 142A may comprise an exit gate valve 142 connected to an actuator 143. As an example, the actuator 143 may cause the exit gate valve 142 to retract, such that the exit portal 142A is open, allowing the cooked foods and/or liquids to exit the cooking drum 136.

It should be understood that the cooking chamber 20 may specifically be adapted to structurally support the cooking drum 136. As an example, the walls of the cooking chamber may include mounting joints (not shown) for connecting to the shaft 139 and motor 137, such that the cooking drum 136 may securely sit and subsequently rotate within the cooking chamber 20.

Figure 40:
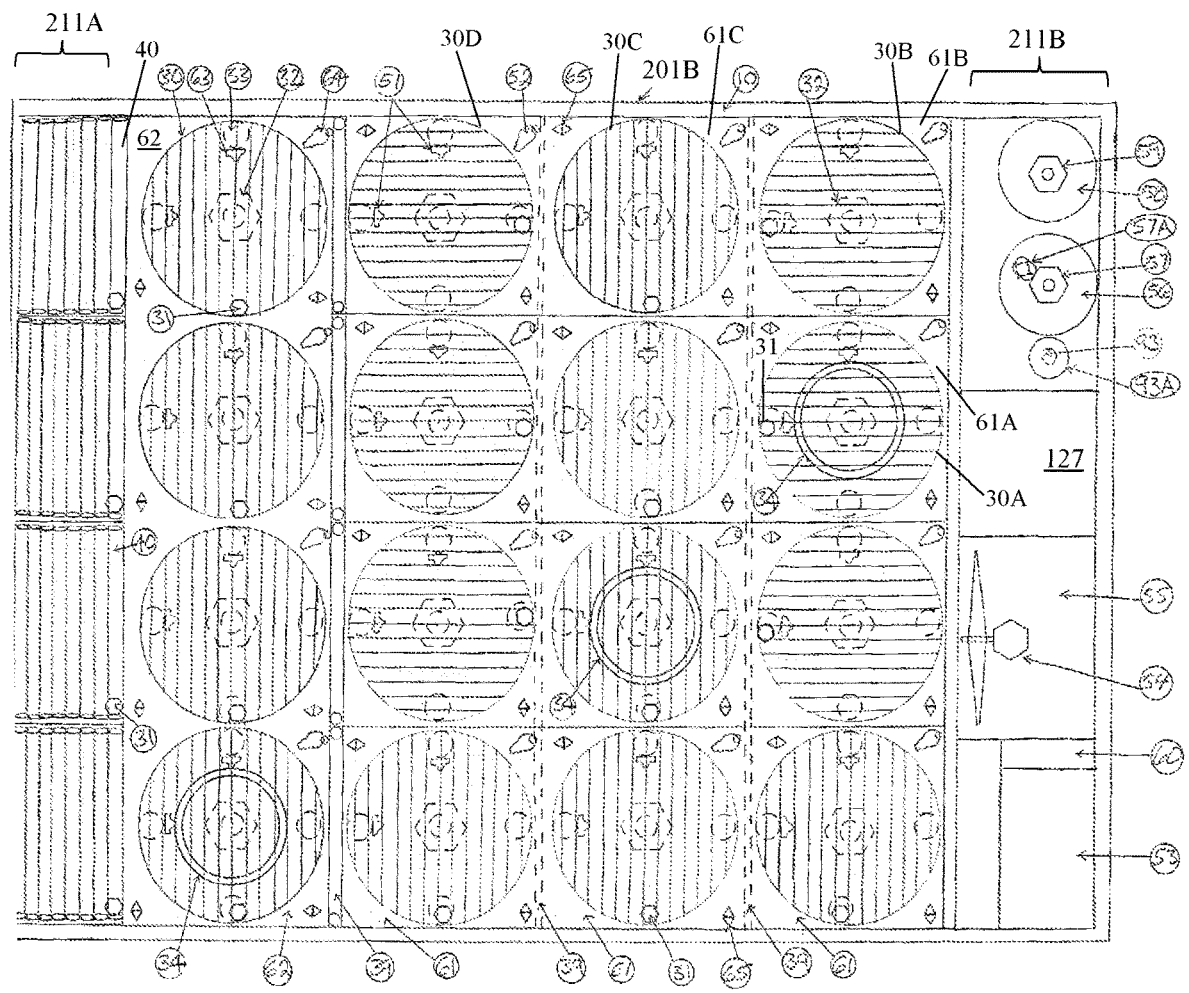
FIG. 40 illustrates a top sectional view of an interior of the bottom of the autonomous, self-cleaning food and liquid dispenser of FIG. 33, according to an embodiment.

FIG. 40 illustrates a top sectional view of an interior of the bottom 201B of the autonomous, self-cleaning food and liquid dispenser of FIG. 33, according to an embodiment. As shown in FIG. 40, the autonomous dispenser 201 may comprise a bottom front 211A and a bottom rear 211B. As described previously above, the front 211A of the autonomous dispenser 201 may be provided with front entryways 40 comprising rollers and F/R motors 31 for traversing bowl-containers 34 into and out of the autonomous dispenser 201. As shown, the conveyor system 30 may be disposed throughout the interior bottom 201B of the autonomous dispenser 201, such that each bowl-container 34 may be directed to the appropriate dispensing chamber 61, 62, as an example. As shown as an example, the conveyor system 30 may also be implemented as individual motorized turntables 30A, 30B, such that the rollers of the conveyor system 30 may swivel 360 degrees to change the direction of travel of the bowl-container 34. As described previously above when referring to FIG. 33, insulated chamber doors 39 (shown in dashed line) may separate adjacent conveyor turntables 30 and may be lifted such that to allow bowl-containers 34 to traverse from one conveyor turntable to another. As described previously above, the dispensing chambers 61, 62 may comprise a multitude of tracking sensors 65, 51 and viewing cameras 52 for monitoring, tracking, and guiding the bowl-containers throughout the apparatus 201.

As shown, the bottom rear 211B of the apparatus 201 may comprise the water tank 58 having the suction pump 59 described previously when referring to FIG. 38A. As shown, the rear 211B may also be provided with a hot water storage tank 56 having a water circulation pump 57 and a sanitizing detergent container and injector 57A. As described previously when referring to FIGS. 38A-38B, the apparatus 201 may be adapted to be self-cleaning, such that hot cleaning and sanitizing water is injected via high pressure spray nozzles 73 into the cleaning chambers 20 for removing and disinfecting of food residue and buildup. The hot water storage tank 56 may thus store the hot water used for cleaning, and the water circulation pump 57 may pump the hot water out of the storage tank 56 and through a network of tube pipes (not shown) connected to the spray nozzles 73 disposed throughout the apparatus 201. The sanitizing detergent injector 57A may inject sanitizing agents into the hot water stream in the tube pipes, such that the sanitizing agents may be applied to the areas of the apparatus 201 for sanitary cleaning. The pump 57 and the detergent injector 57A may be electrically controlled by the onboard computer 53, which will be described in greater detail below. As shown, a steam generator 93 and a water reservoir 93A may also be provided for generating steam, as an example. As described previously above, the cooking chamber 20 may be provided with steam spray nozzles 36 for the optional steam heat cooking method. The steam generator 93 may heat water stored in the water reservoir 93A, such that steam is created and released out of the set of steam spray nozzles 36 into the cooking chamber 20, as an example.

As shown, the ozone generator 127, which was described previously when referring to FIG. 36, and a refrigeration unit 55 having a variable speed circulator 54 may also be disposed in the rear 211B of the apparatus 201. As an example, the refrigeration unit 55 may be adapted to generate cold air, which is then circulated throughout the apparatus by the variable speed circulator 54. The circulated cold air may travel through the air plenums 9, shown previously in FIG. 36, and may help maintain the cold temperatures of the cooling chambers 21, as well as neutralize heat generated by the cooking chambers 20. Finally, as shown in FIG. 40, the rear 211B may comprise an electrical circuit power panel 60 and the computer 53, as mentioned previously throughout this disclosure. As an example, the power panel 60 may comprise a circuit breaker system for protecting the various electrical components throughout the apparatus (e.g., sensors, cameras, induction generators, stepper motors) from overload currents and electrical shorts, for example. The power panel 60 may thus function as a circuit breaker panel, with each circuit breaker component (not shown) within the panel 60 being connected to the computer 53 (or via Wi-Fi to a central maintenance site) for monitoring possible current overloads or higher power usages, such that to prevent potential forthcoming maintenance issues, as an example.

As described throughout this disclosure above, the onboard computer 53 may function as the central brain of the apparatus 201, with each action, mechanism, and function of the apparatus 201 being controlled by the computer 53. As an example, the computer 53 may be preprogrammed and driven by AI (artificial intelligence) smart learning software (e.g., via convolutional neural networks) for controlling the various cooling, cooking, cleaning, dispensing, and guiding operations of the plethora of mechanisms within the apparatus 201. It should be understood that any and all autonomous or automatic operations described herein are electrically caused by the computer 53. It should also be understood that the computer 53 may be electrically connected to all electrical and mechanical components described herein via any suitable means, such as, for example, electrical wiring (e.g., copper wires, electric rings), cables, wireless connections like Wi-Fi or Bluetooth®, etc. The computer 53 may also be connected wirelessly (via Wi-Fi, for example) to external remote computers or cloud computing systems for data analysis, troubleshooting, maintenance alerts, and component failure issues, as an example.

As mentioned previously above when referring to FIGS. 38A-38B, the onboard computer 53 may be adapted to cause user-selected foods and/or liquids to be prepared and cooked according to user-selected cooking methods. As an example, the computer 53 may be programmed and trained to determine the doneness of a food being cooked by analyzing visual changes in the food (e.g., via cooking cameras 50), as mentioned above. The computer 53 may assign numerical time periods to physical cooking phenomena in order to determine an overall cooking time. As an example, the computer 53 may be programmed to assign time intervals for temperature time (TT), cooking chamber temperature (CCT), visual change in food texture (VCFT), visual change in food color (VCFC), and rate of mixing rotation (RMR). For example, let the user desire a pan-seared steak to be cooked to medium doneness. In order to appropriately prepare and cook the steak to this desired doneness, the computer 53 may thus assign a heating time value for TT (e.g., 11 minutes), a cooking time for the cooking chamber for CCT (e.g., 6 minutes) at a particular temperature (e.g., about 145 degrees F.), an observed texture change time for VCFT (e.g., 3 minutes), an observed color change time for VCFC (e.g., 3 minutes), and a rotation duration value for RMR (e.g., 5 minutes). The overall cooking time may thus be the total overlap of TT, CCT, VCFT, VCFC, and RMR.

As such, referring back to FIGS. 38A-38B, the computer 53 may first actuate the induction energizers 22, such that the induction plates 23 may begin to warm up and release heat into the cooking chamber 20. The induction energizers 22 may run for a total time equal to TT, as described above. Once the temperature sensor 35 detects a temperature of about 145 degrees F., per the example above, the computer 53 may open each of the gate valves 6, 15, 75A such that the raw steak meat (from the refrigeration container 2 above) may be transferred into the cooking chamber 20. For this example, let the cooking drum 136 shown in FIG. 39 be retrofitted into the cooking chamber 20, such that the raw steak meat is cooked in the cooking drum 136. Then, the computer 53 may cause the valves 140, 142 to close, and may activate the F/R motor 137, such that the cooking drum 136 is caused to slowly rotate to cook the steak. The F/R motor 137 may run for a total time equal to RMR, as described above. During cooking, the cameras 147, 50 in the cooking drum 136 and chamber 20 may monitor the steak color and texture, per the example, noting that observed color and texture changes should not occur for a period of time greater than VCFC and VCFT, respectively. At the conclusion of the cooking time, set by CCT, the computer 53 may open the gate valve 142 and transfer the cooked steak out of the cooking drum 136 via the mixer auger 149. The computer 53 may then dispense the medium steak into a bowl-container 34 via the gate valve 26, as will be described in detail below.

It should be understood that, depending on the desired cooking method selected by the user, the onboard computer 53 will actuate the necessary components within the apparatus 201 to cook the food product accordingly. As an example, should the user desire the food product to be broiler cooked or bake oven cooked, the computer 53 may actuate the broiler/heating coils 76, such that heat is directly irradiated onto the food product. The amount of heat generated by the heating coils 76 may be varied as needed for either of the two aforementioned cooking methods. Similarly, as another example, should the user desire the food product to be steam cooked, the computer may actuate the steam spray nozzles 36, such that the released steam cooks the food product. As another example, should the user prefer for the food product to be convection oven cooked, the computer may cause a heating of the induction plates 23 or the heating coils 76, or both, for example, and actuate the blower fan 29, such that the air-circulated heat may cook the food product within the cooking chamber 20, as in a standard convection oven, for example. Additionally, as an example, should the user select rotisserie cooking, the computer may cause a rotation of the cooking auger shaft 24, such that the food product is rotated over the heated induction plates 23 within the cooking chamber 20. These alternative cooking actions may follow the same cooking method steps outlined above when referring to the induction energizers 22 and plates 23, for example.

As mentioned above, the computer 53 may be adapted to guide a user's bowl-container 34 throughout the dispenser apparatus 201 such that user-selected foods are dispensed into the bowl-container 34, as follows. Referring back to FIG. 40, the conveyor system 30 may be implemented onto motorized turntables such that the user's bowl-container 34 may be traversed to any of the plurality of dispensing chambers 61, 62, as mentioned above. Per the example above, let the bowl-container 34 be positioned on the turntable 30A in the dispensing chamber 61A, where the bowl-container receives a user-selected serving of a first food (e.g., medium steak), as an example. The F/R stepper motor 31 disposed beneath the conveyor rollers 30 may be actuated to cause the bowl-container 34 to traverse forward onto the turntable conveyor 30B, as an example. The camera 52 and the tracking sensors 65, 51 may continuously monitor the movement of the bowl-container 34 such that the computer 53 may cause the F/R stepper motor 31 to deactivate at a proper location in each primary dispensing chamber 61 (e.g., beneath the gate valve 26). In the second dispensing chamber 61B the bowl-container 34 may then receive a user-selected serving of a second food (e.g., broccoli). The central rotation mechanism 32 may then be caused to rotate the turntable 30B counterclockwise 90 degrees, such that the user's container-bowl 34 may be traversed to the left onto the turntable conveyor 30C in a third dispensing chamber 61C, as shown. When the bowl-container is properly positioned on the conveyor 30C, the bowl-container 34 may lastly receive a third food (e.g., rice), and then may be traversed to the left by the F/R motor 31 over the rotated (via the rotation mechanism 32) turntable conveyor 30D and into the secondary dispensing chamber 62. In the secondary dispensing chamber 62, as described previously when referring to FIG. 35, the bowl-container 34 may receive flavor-enhancement toppings (e.g., ground pepper and steak sauce) before being traversed out toward the front rollers 40 at the front 211A for retrieval of the bowl-container 34 by the user. Thus, a fully prepared and freshly cooked meal may be dispensed within the autonomous dispenser 201 and presented to the user in an organized and timely manner, as an advantage.

As outlined throughout this disclosure above via the example shown in FIG. 40, the viewing cameras 52, the multitude of tracking sensors 65, 51, and the bowl-container e-tag 42 allow multiple bowl-containers 34 to be simultaneously traversed throughout the dispenser apparatus 201, without disruption to the cooking, preparing, cooling, and dispensing operations of the apparatus 201. As such, as will be described in greater detail later, the apparatus 201 may enable multiple meals to be prepared and dispensed for multiple users simultaneously.

Figure 41:
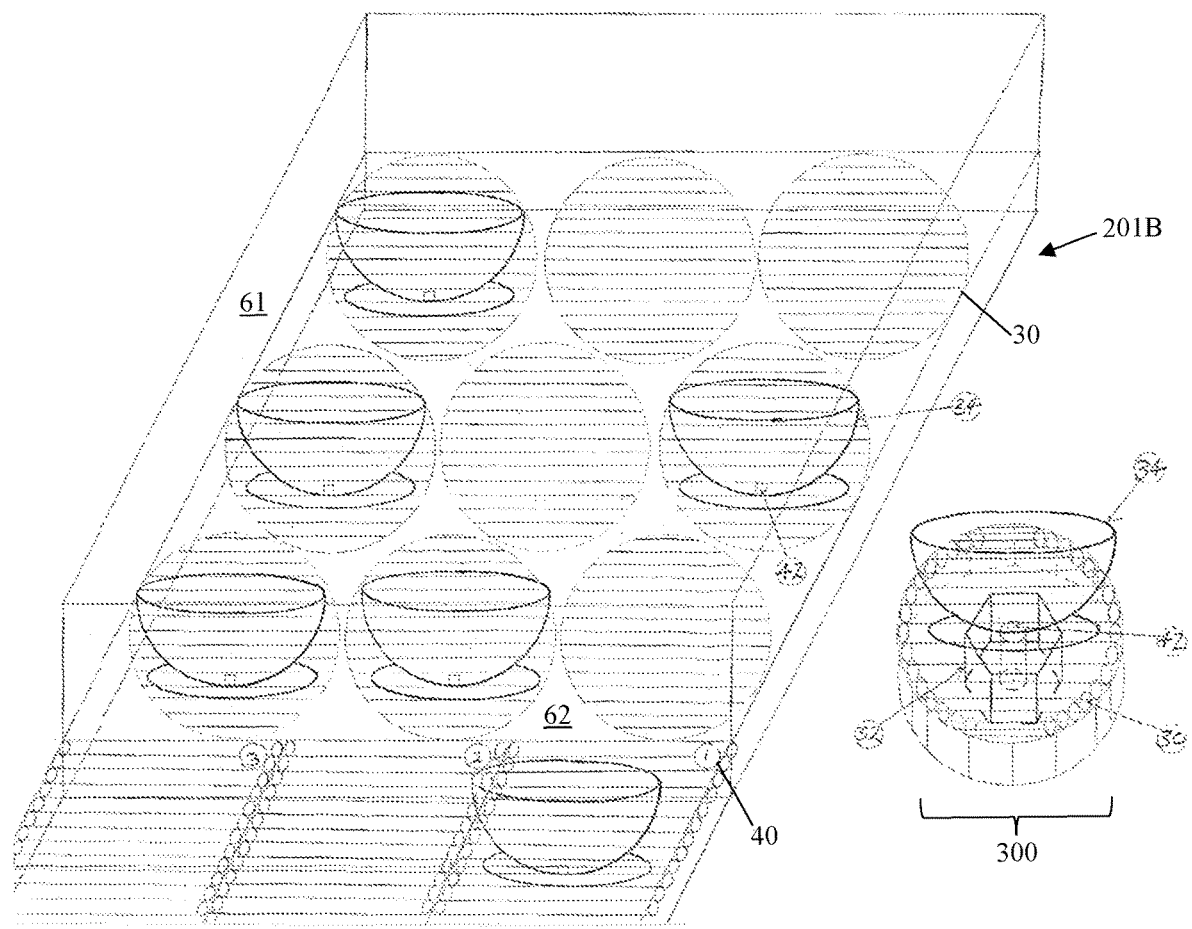
FIG. 41 illustrates a detailed perspective view of the dispensing chambers shown in FIG. 40, according to an embodiment.

FIG. 41 illustrates a detailed perspective view of the dispensing chambers 61, 62 shown in FIG. 40, according to an embodiment. It should be noted that the insulated chamber doors 39, the various sensors and cameras (e.g., 65, 52), and the rear components (e.g., the computer 53, the water tank 58) have been omitted in this view for clarity. Additionally, while only three rows of conveyor turntables 30 are shown, it should be understood that more than three may be provided along the bottom 201B of the autonomous dispenser 201, as an example.

As shown in FIG. 41, a plurality of bowl-containers 34 may be used and may travel within the dispensing chambers 61, 62 at any given time. As such, the autonomous dispenser 201 may accommodate the orders of multiple users at once, such that foods and/or liquids may be prepared and cooked for each user simultaneously. Thus, an advantage is the ability to prepare, cook, and dispense multiple meals at once, such that multiple users may receive their meals in a timely and efficient manner. As previously mentioned above, each column of conveyor turntables may also be configured to operate as an entryway or an exit way, such that bowl-containers 34 may be inserted into the apparatus 201 and may be retrieved from the apparatus 201. As an example, front rollers 40-1 may operate as an entryway and front rollers 40-2, 40-3 may thus operate as exit ways.

As shown by the detailed sectional view 300 in FIG. 41, each bowl-container 34 may comprise an e-tag 42 disposed centrally in the bottom of the bowl-container 34 for tracking movements of the bowl-container within the dispensing chambers 61, 62. As an example, the e-tag 42 may function as a point of reference for the tracking sensors (e.g., 51) and viewing cameras (e.g., 52) disposed in the dispensing chambers 61, 62. As shown, the central rotation mechanism 32 may connect to the underside of each conveyor turntable 30, such that a rotation of the mechanism 32 causes a rotation of the conveyor turntable and rollers 30. It should be understood that the central rotation mechanism 32 may be in electrical communication with the onboard computer (not shown) for controllably causing a rotation of the conveyor systems and turntables 30 as needed. It should also be understood that the central rotation mechanism 32 may be any suitable rotation device, such as a pivot motor, an axle and motor, etc.

Figure 42:
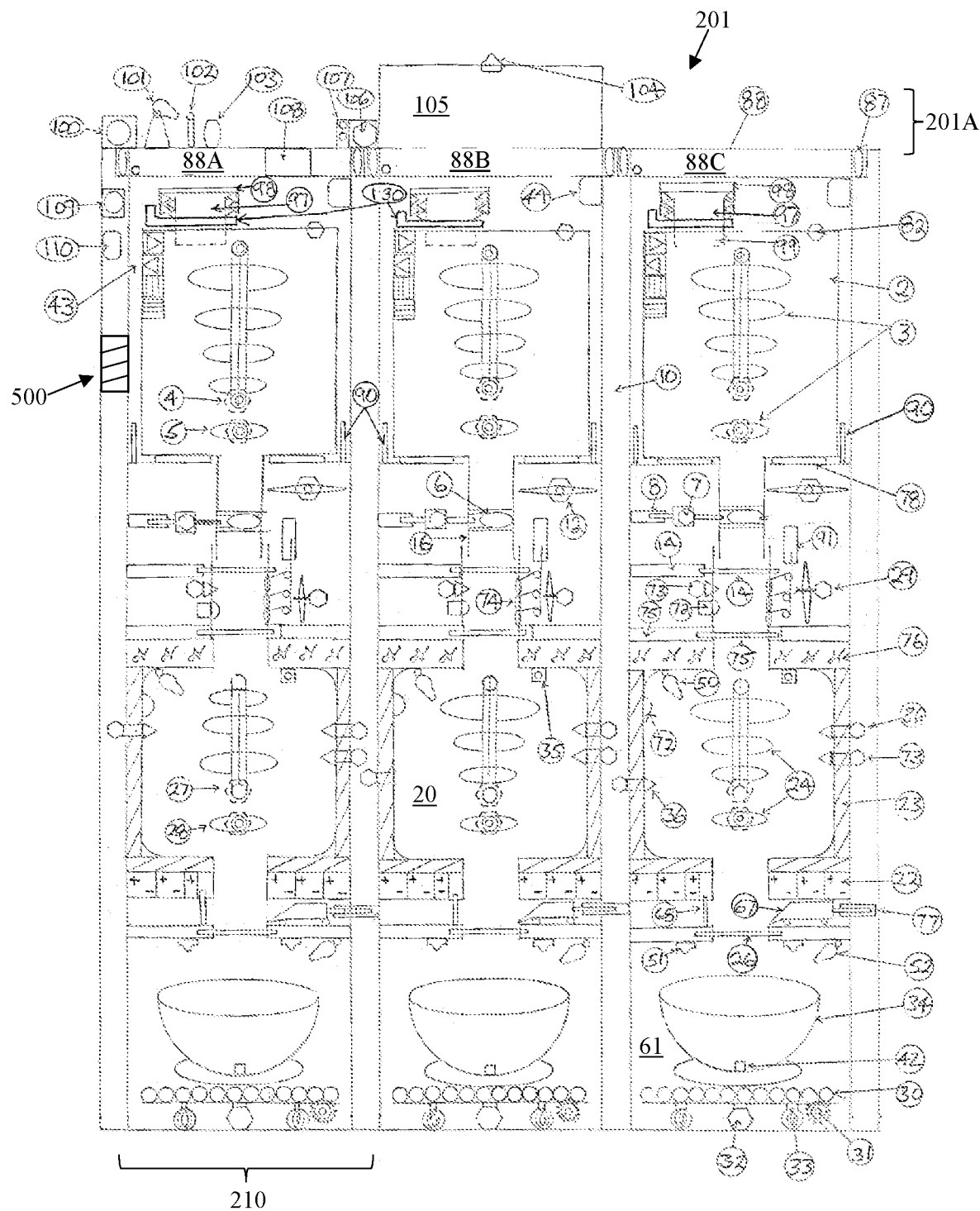
FIG. 42 illustrates a front sectional view of the autonomous, self-cleaning food and liquid dispenser of FIG. 33, according to an embodiment.

FIG. 42 illustrates a front sectional view of the autonomous, self-cleaning food and liquid dispenser 201 of FIG. 33, according to an embodiment. As described herein above, each dispenser compartment 210 may follow a column configuration, as shown, wherein each chamber is stacked one on top of another within the dispenser compartment 210, as an example. An advantage of such a configuration is that the primary mechanism by which foods and beverages are moved, transferred, and dispensed within the apparatus is gravity, such that no additional pumping or suction components are necessary. Another advantage is that the compact nature of the column configuration may save physical space within the apparatus, reducing manufacturing costs. As shown in FIG. 42, the refrigeration container 2 may comprise alternative portal components for filling the container 2 with foods and/or liquids. As shown, the container 2 may comprise a rectangular well tube 99 having a threaded neck 97 and a removable threaded cap 98. As similarly described above, the well tube 99 may also be provided with a gate valve 130 for sealing the contents of the refrigeration container 2 such that ambient air is prevented from entering the container 2 and potentially spoiling the contents, as an example.

As shown as an example, the autonomous dispenser 201 may comprise a top 201A. As described previously above, the apparatus 201 may comprise top lids 88A-88C having F/R stepper motors 87, with each lid being positioned above each cooling chamber, as an example. As shown, the top 201A may also be provided with a plurality of electronics components for a user to interact with. It should be understood that while only three lids 88A-88C, and thus three dispenser compartments 210, are shown, many more (e.g., 10, 20, etc.) may be provided, as needed. As an example, the top 201A may comprise a computerized scanner 100 that is wirelessly connected to the onboard computer 53. The computerized scanner 100 may be adapted to scan e-tags such as RFID or NFC, as well as bar codes, QR codes, etc. As an example, the computerized scanner 100 may be used for user-identification, such as the scanning of a user's personalized e-tag (on a card or on the user's mobile device, for example). The apparatus 201 may be adapted to recognize a particular user's account via said e-tag, such that information about that user may be accessed and/or retrieved at any time. As an example, the apparatus 201, via the onboard computer 53 memory or via a cloud-based memory network, may store data about the user's daily, weekly, monthly, and/or yearly nutritional intake. As such, the apparatus 201 will consider a user's health profile when preparing meals, such that to monitor the use of certain ingredients. Such a feature may be particularly advantageous for a Type 2 diabetic, for example, for monitoring the grams of sugar being consumed daily. Such a feature may also assist users, who possess certain weight-loss goals, for example, in calorie tracking, nutritional intake, and other nutrition facts, like fat, sodium, carbs, etc., for example.

As an example, the user identification and personal account features described above may also enable certain "child-lock" features of the apparatus 201. As an example, in a home or school setting, it may be advantageous or desired to restrict children or underaged adolescents from consuming certain beverages and foods, such as, for example, alcohol, soda, milkshakes, etc. Such a feature may be particularly useful for instances in which, in a home setting, for example, the children are home alone and/or without adult/parent supervision. As such, the parents are able to limit their children's sugar intake (by limiting soda or juice consumption, for example), as well as the intake of other restricted substances (e.g., beer, wine, spirits, etc.). The child-lock feature described above may also be applied for certain health-sensitive users, such as Type 2 diabetics, or obese individuals, who desire to limit access to certain sugary or high sodium beverages and foods, for example.

As shown, the top 201A may also comprise a top camera 101 for use by the apparatus 201 in facial recognition of the user, as an example. As an example, the top camera 101 may provide the user with another means of identification and logging onto the apparatus 201, such that personal and individual nutrition data pertinent to the user may be viewed and accessed. The top camera 101 may be wirelessly connected to the onboard computer 53 (and/or to an external offsite computer) for the visual processing of the user's face, for example. As shown, the autonomous dispenser 201 may further comprise a microphone 102 disposed in the top 201A and electrically connected to the onboard computer 53. As an example, the microphone 102 may allow the user to give audible commands to the apparatus 201, as well as for voice recognition for logging onto the apparatus 201 for use. The user may give audible commands via the microphone 102 pertaining to, for example, meal or beverage choice, cooking method, portion sizes, toppings, etc. As shown as an example, the top 201A may also be provided with a speaker 103 disposed adjacent to the microphone 102. As an example, the speaker 103 may enable the apparatus 201 to audibly communicate with the user, such as for confirming the user's choices or prompting the user to make a particular selection (e.g., meal or beverage selection). The speaker 103 may also allow the apparatus 201 to audibly call out an order number or username indicating that that user's order is ready for retrieval, for example.

As shown in FIG. 42, the apparatus 201 may further comprise a display touch screen ("touch screen," "control panel") 105 having a camera 104. As an example, the touch screen 105 may be adapted to fold up to open or fold down to close upon startup or shutdown, respectively, of the apparatus 201. The touch screen 105 may enable the user to provide commands and/or selections physically via touching particular digital buttons (not shown) on the screen when prompted. As an example, the touch screen 105 may display personal health and nutritional data specific to the user, as mentioned above, such as caloric intake, nutrition facts for foods/liquids chosen, and past orders. Additionally, as an example, the touch screen 105 may display information about each of the foods and liquids contained in the apparatus 201, such as, for example, nutrition facts, product freshness, "use by" date for food and beverage products, product availability, and estimated order wait time, among others. The touch screen 105 may also display a user's order number or username, in a cafeteria, home, or commercial setting for example, for indicating that the user's food order is ready for retrieval, as an example. As shown, the autonomous dispenser 201 may further comprise an F/R stepper motor 106 for raising and lowering of the touch screen 105, and a pair of buttons/controls 107 for commanding the raising and lowering of the touch screen 105, as an example. The apparatus 201 may also be provided with a fingerprint scanner/pad 109, as shown, for identifying a user and logging the user onto the device via their fingerprint (e.g., thumbprint).

As shown as an example, the top 201A of the apparatus 201 may also be provided with a voice recorder 108 for a user to record their voice print in order to allow the user to log onto the apparatus 201 via the microphone 102 later, as described above. As shown, the apparatus 201 may also comprise a digital scanner 110 for identifying a user via scanning and/or reading a smart watch, fitness tracker, chip-coded article, or a smartphone, as examples. As evidenced herein above, the apparatus 201 may provide the user with a plethora of options for logging onto the apparatus 201 and ordering a meal and/or beverage, as well as accessing personal health and nutrition information and history. As an example, the apparatus 201 may also be adapted to pair wirelessly with a mobile application running on a user's smartphone or tablet, for example, such that the user may wirelessly place an order on the dispenser 201 and/or view nutrition information and history. As shown, the dispenser apparatus 201 may further comprise a card reader 500, for accepting payment for use of the apparatus 201 in a retail, commercial, or school setting, for example. As an example, the card reader 500 may be adapted to receive payment cards, such as credit cards and debit cards, for example, and may also be adapted to accept touchless internet-based payment methods, such as, for example, ApplePay®, Paypal®, Venmo®, etc. The touchless payment options, as well as the touchless meal ordering options, may be particularly advantageous from a health security standpoint, considering, for example, COVID-19, the flu, and related infectious diseases.

In accordance with an aspect of the current invention, a method of obtaining a cooked meal using the disclosed autonomous dispenser 201 is provided. As an example, the disclosed apparatus 201 may be provided in a household, retail, commercial, or business setting for the convenient personal and/or public use for ordering meals and/or beverages. As an example, let the apparatus 201 be provided in a cafeteria setting for multiple users to use simultaneously for ordering and receiving a cooked meal. Per the example, when a user approaches the apparatus 201, the user may log onto the apparatus 201 using any of the above disclosed methods, such as the computerized scanner 100, the top camera 101, the microphone 102, the touch screen 105, the digital scanner 110, or mobile application (not shown). Alternatively, the user may log onto the apparatus 201 as a "guest" if the user has no preexisting user account, for example. Then, the user may proceed to place a food and/or beverage order. The user may utilize the microphone 102, the touchscreen 105, or the mobile application (not shown) running on the user's mobile device, as described above. The user may select a past order from the user's personal order history or may select a new order by navigating through the multiple options displayed on the touch screen 105 or mobile application (not shown). The user may be prompted to select from suggested meals (e.g., burger and fries, steak and side salad, spaghetti and garlic bread) or the user may assemble their own meal by selecting individual ingredients and the order in which they would like the meal assembled, as well as how the user would like the meal cooked (e.g., broiled, grilled, steak cooked well-done). As the user selects each ingredient, the apparatus 201, via the touch screen 105 or mobile application (not shown), will display nutrition facts pertaining to that ingredient. Then, the user may select a beverage (e.g., milkshake, soda, water, coffee, etc.), if desired. Once the user has placed their order, the autonomous dispenser 201 will proceed to prepare, cook, and dispense the order in the manner described throughout this disclosure above. The user may wait for a minimal period of time while their order is prepared, at which point the apparatus 201, via the speaker 103 or mobile app (not shown), will alert the user that their order is ready. Finally, once the autonomous dispenser 201 dispenses the user's order (in a bowl-container 34, for example), the user may retrieve said order at the front rollers 40.

As described above, the autonomous dispenser apparatus 201 may thus be an Internet of Things (IOT) device, capable of communicating and being controlled remotely via the internet. As an example, let the apparatus 201 be in use in a home setting. The apparatus 201, particularly the onboard computer 53, may be controlled wirelessly and remotely via a mobile app or web site, for example, such that a user may order a meal at any time from any location. As such, for example, if the user gets off work at 5:00 pm, and the user's commute back home is approximately 30 minutes, the user may instruct the apparatus 201, via the mobile app, to prepare and cook a particular meal, such that the meal is ready by the time the user arrives at home (at about 5:30 pm). Similarly, such a feature may allow the user to simultaneously instruct the apparatus 201 to prepare and cook meals for other members of the user's family (e.g., spouse and children) and to have those meals ready by a certain time. Furthermore, the apparatus 201 may further be adapted to pause and later resume the preparation and/or cooking operations, or change the meal readiness time, for example, if the user is running late (e.g., traffic is unexpectedly heavier than usual). Thus, the autonomous dispensing apparatus 201 may allow a user to obtain a cooked meal by placing an order remotely and wirelessly ahead of time at any location.

It should be understood that other dispensing containers (e.g., plates, to-go containers, cups) may be used within the apparatus 201 for dispensing foods and/or liquids into. Thus, an advantage is that a user may select a meal in an easy-to-use, intuitive manner, which may then be autonomously and timely prepared, cooked, and dispensed for the user to enjoy. As will be described in detail below, the apparatus 201 may be adapted for use by a user in cooking a meal themselves.

Figure 43:
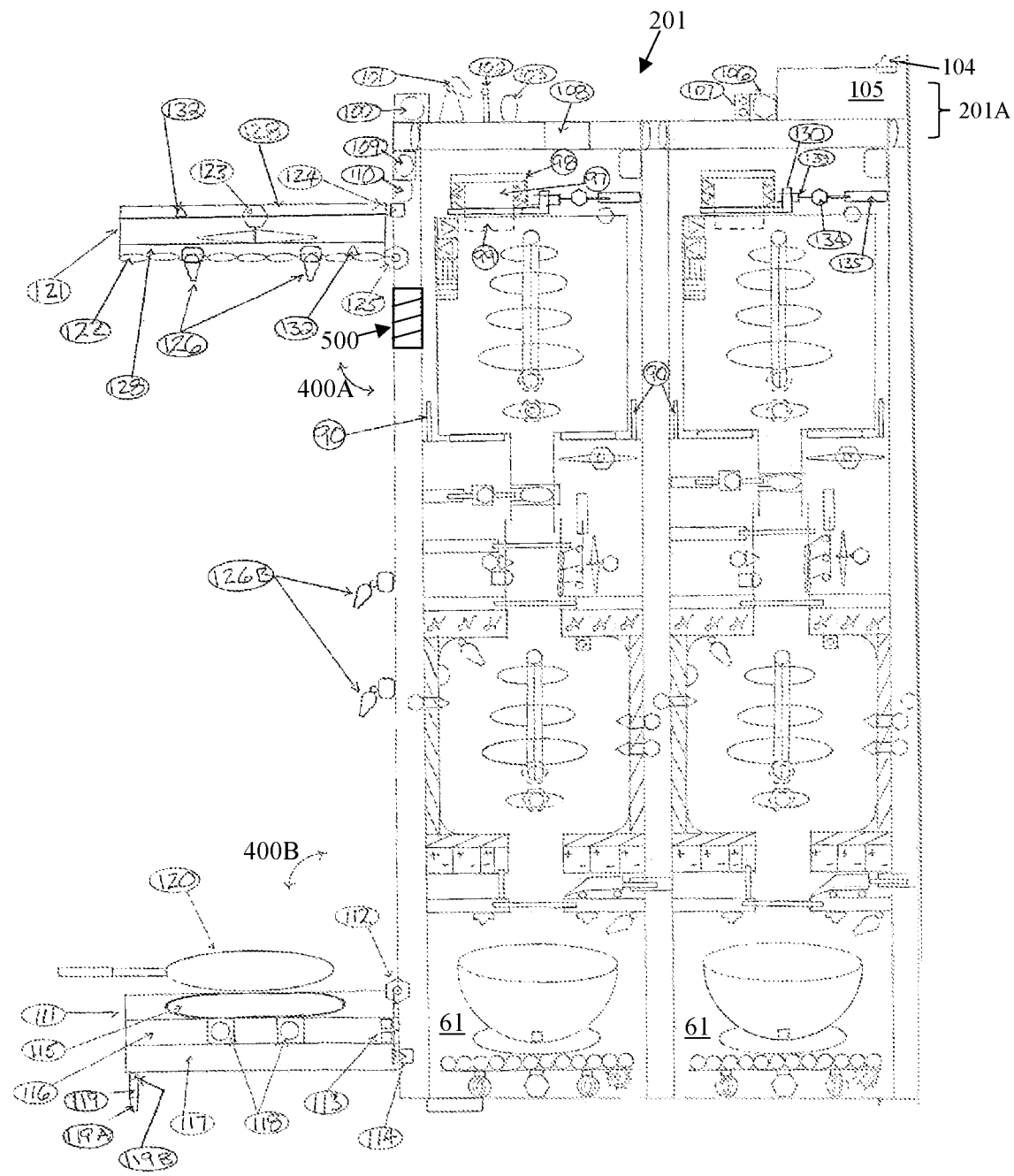
FIG. 43 illustrates a front sectional view of the autonomous, self-cleaning food and liquid dispenser of FIG. 42 having a fold-down cooking top and exhaust fan, according to an embodiment.

FIG. 43 illustrates a front sectional view of the autonomous, self-cleaning food and liquid dispenser 201 of FIG. 42 having a fold-down cooking top 111 and exhaust fan 121, according to an embodiment. As mentioned above, the apparatus 201 may be thus adapted such that a user may cook a meal externally of the apparatus 201. As will be described in detail below, the apparatus 201 may be provided with the fold-down cooking top 111 and exhaust fan 121 whereby the user may cook a meal, as an example.

As shown in FIG. 43, the fold-down cooking top 111, and the exhaust fan 121 may be provided in a side of the apparatus 201. As will be described in more detail when referring to FIG. 44, multiple sets of fold-down cooking tops 111 and exhaust fans 121 may be provided on both sides of the apparatus body such that multiple food items may be cooked at a single time, as needed. As shown, the exhaust fan 121 may be provided near the top 211A of the apparatus 201, such that smoke rising from the cooking top 111 may be drawn into the exhaust fan 121. As an example, the exhaust fan 121 may be adapted to be a fold-up mechanism, such that when the exhaust fan 121 is not in use it may rest vertically against the outer edge of the apparatus 201. When the user desires to use the exhaust fan 121, the computer 53 may actuate a geared stepper motor 125 such that the exhaust fan 121 is lifted (indicated by 400A) into its horizontal functional position. As shown, the exhaust fan 121 may comprise a plurality of exhaust louver vents 122 through which smoke, vapor, and odor may be drawn in by a fan motor and blade 123 and exhausted. The exhaust fan 121 may also comprise removable filters 128 disposed before and after the fan blades 123. The filters 128 may collect grease, food particulates, vapor buildup, etc. and may be biodegradable for eco-friendly disposal. The exhaust fan 121 may also be provided with an automatic lock 124 that holds the exhaust fan 121 horizontally in place when the exhaust fan 121 is in use. The automatic lock 124 may be caused to unlock (by the computer 53 or external computer, for example) such that the geared stepper motor 125 may lower the exhaust fan 121, as indicated by 400A.

As shown as an example, the exhaust fan 121 may further comprise a set of vision cameras 126 positioned to face downwardly toward the cooking top 111. As an example, the vision cameras 126 may electrically communicate (e.g., wirelessly) with the onboard computer 53 or with an external computer, for example, such that to visually monitor foods being cooked on the cooking top 111 below. As an example, the aforementioned external computer (not shown) may form a part of a smart cooking system, wherein a robot/robotic arm (not shown) is adapted to cook said foods by stirring and/or flipping the food in a pan (e.g., shown at 120). As shown, a second set of vision cameras 126B may also be provided along the side wall of the apparatus 201 for closely monitoring the cooking of foods on the cooking top 111. Finally, as shown, the exhaust fan 121 may be provided with a sensor 132 for monitoring air flowing through the exhaust fan filters 128. For example, when airflow becomes restricted, i.e., when the filters 128 need to be replaced, the sensor 132 will alert the onboard computer 53 or external computer (not shown) such that a user may then be notified to replace the air filter(s) 128.

As shown in FIG. 43, the cooking top 111 may comprise a rigid framed structure containing all of the necessary components for cooking a meal, as will be described below. As previously mentioned above, the cooking top 111 may be adapted to fold downwardly to open for functional use, as indicated by 400B. As shown, the cooking top 111 may be provided with a geared stepper motor 112 for causing the cooking top 111 to pivot such that to fold downwardly to open or fold upwardly to close. As similarly described above, when the cooking top 111 is not in use, the cooking top 111 may rest vertically against the side of the apparatus 201. As shown, the cooking top 111 may comprise an automatic lock 114 for locking the cooking top 111 horizontally in place during use, as similarly described above. As shown, the cooking top 111 may be provided with a burner 115 on which a pan 120 (or any other cooking vessel) may be placed, for example. As an example, the burner 115 may be gas, inductively, or electrically driven such that heat may be generated for sufficiently warming the pan 120 to be used for cooking. The aforementioned gas, induction, or electrical heating generator 116 may be disposed beneath the burner 115, as shown.

As shown, the cooking top 111 may further comprise a heat insulation barrier 117 for protecting the surface on which the cooking top 111 sits. As an example, during use, the burner 115 may carry high amounts of heat, which may dissipate upwardly toward the exhaust fan 121 in the form of smoke or radiation. The heat insulation barrier 117 may help prevent any of the heat dissipation from traveling downwardly and reaching the surface (e.g., countertop) on which the cooking top 111 sits, for example. As an example, the cooking top 111 may also be provided with temperature controls 118, as shown, for manually controlling the level of heat on the burner 115 and/or the type of heating mechanism to be used. As an example, the temperature controls 118 may be knobs or buttons, for example, for setting the temperature (e.g., high, or medium heat) on the burner 115. The temperature controls 118 may also allow a user to manually control the heating generator 116 such that to select induction heating, electric heating, or gas heating, for example, as desired. As shown in FIG. 43, the cooking top 111 may further comprise automated fold down legs 119. As an example, the automated legs 119 may be provided with heat sensors 119A and actuators 119B, as shown. As an example, the heat sensor 119A may monitor any heat radiating through the leg 119. As mentioned previously above, the cooking top 111 included an insulation barrier 117 for helping prevent heat from traveling downwardly. Should the heat sensor 119A detect any heat, the heat sensor 119A may alert the onboard computer 53 (or external computer) that excess heat is being generated, or that the insulation barrier 117 is failing, such that the computer 53 may then shut off the heat generator 116 or lower the heat level being generated, for example. The actuator 119B may raise and lower the legs 119, such as, for example, when the cooking top 111 is being folded up for storage or folded down for use.

Figure 44:
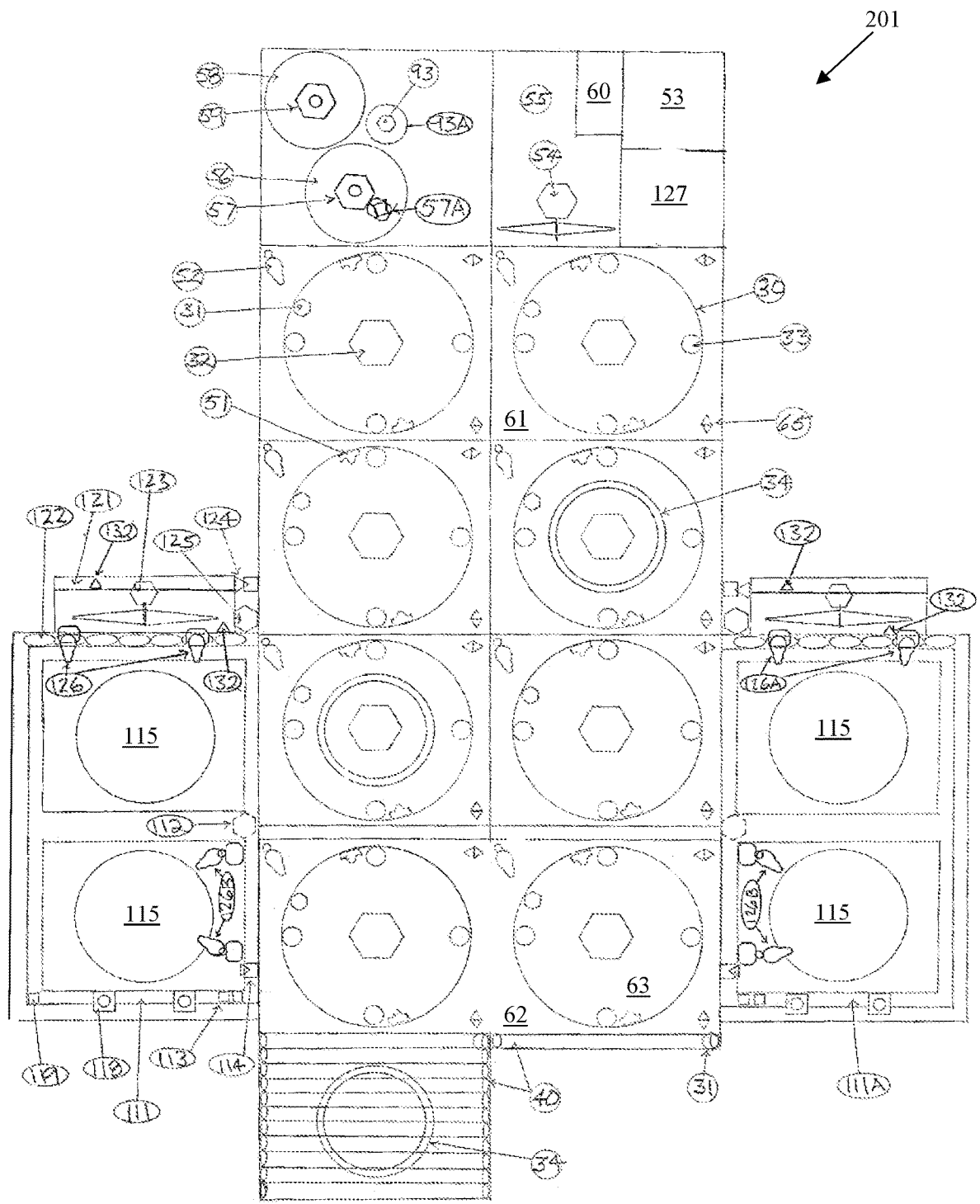
FIG. 44 illustrates a top detailed view of an interior bottom of the autonomous, self-cleaning food and liquid dispenser of FIG. 43, according to an embodiment.

FIG. 44 illustrates a top detailed view of an interior bottom of the autonomous, self-cleaning food and liquid dispenser 201 of FIG. 43, according to an embodiment. In the exemplary embodiment shown in FIG. 44, the autonomous dispenser 201 may be provided with two columns of dispensing chambers, as shown, with eight dispensing chambers 61, 62 total. As mentioned previously above when referring to FIG. 43, the autonomous dispenser 201 may be provided with sets of cooking tops 111 and exhaust fans 121 disposed on both sides of the apparatus 201. As described throughout this disclosure above, the bowl-containers 34 may be traversed throughout the primary dispensing chambers 61 before exiting through the secondary dispensing chamber 62 and the front entryway 40, as shown. It should be understood that the rollers of the conveyor turntables 30 have been omitted in this view for clarity.

As shown in FIG. 44, the autonomous dispenser 201 may comprise four burners 115 and two exhaust fans 121, with one exhaust fan 121 disposed above each pair of burners 115, as an example. The exhaust fans 121 are shown in a folded down, collapsed state in this view. As mentioned above, the autonomous dispenser 201 may be provided with external cooking tops 111, 111A such that a user (e.g., chef, robot, cafeteria cook, etc.) may cook multiple meals simultaneously. As an example, the burners 115 may be used by a user in a restaurant, cafeteria, home setting, etc. to cook a "special" meal, that is, a meal using certain vegan, gluten-free ingredients, or similar substitutes. Thus, an advantage is that the autonomous dispenser may accommodate users who require, or desire meals prepared and cooked using substitute ingredients. Additionally, as an example, the burners may enable a user to cook certain foods that the cooking chamber 20 may not be able to, such as eggs over-easy, pancakes, crepes, for example.

It should be understood that the various F/R stepper motors and actuators described herein above may be adapted to be electrically, mechanically, hydraulically, or pneumatically operated, as examples. It should be understood that the various exemplary mechanical components of the autonomous dispenser 201 (e.g., F/R motors and actuators, pipes, vents, mixer augers and paddles, fans, friction couplings, etc.) may be constructed of stainless steel, ceramic, steel, aluminum, or other metal alloys that are non-corrosive and heat resistant. It should be noted that the apparatus 201 may comprise a single refrigeration compressor 54 for cooling the cooling chambers 21 or may be provided with a plurality of refrigeration compressors for cooling each cooling chamber individually. It should also be understood that, although each dispenser compartment (e.g., 210 in FIG. 33) is depicted and described herein as being arranged in a column, each chamber within the dispenser compartment may alternatively be arranged inline horizontally. As such, the food product may be traversed in a line along a conveyor belt-type assembly (e.g., 30 in FIG. 40, each disposed in a single line), for example, such that the food product may be prepared, cooked, and dispensed horizontally along a line of chambers, rather than vertically down a column of chambers, as an example. In such a configuration, each chamber may comprise the same exemplary components described throughout this disclosure above.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

As used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims. Use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

As used throughout this application, the terms "food," "food product," "liquid," and "beverage" are used interchangeably. As such, the term "food product" may refer to any various food type, such as meat, poultry, seafood, beans, etc. or liquid type, such as beverages, soup, broth, etc.

Throughout this description, the embodiments and examples shown should be considered as exemplars, rather than limitations on the apparatus and procedures disclosed or claimed. Although many of the examples involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

One embodiment of the invention may be described as a process which is usually depicted as a flowchart, a flow diagram, a structure diagram, or a block diagram. In addition, the order of the operations may be re-arranged. A process is terminated when its operations are completed. A process may correspond to a method, a program, a procedure, a method of manufacturing or fabrication, etc.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the invention. Therefore, the scope of this application is intended to cover alternate embodiments and/or equivalent variations of the specific embodiments illustrated and/or described herein. Hence, the scope of the invention is defined by the accompanying claims and their equivalents. Furthermore, each and every claim is incorporated as further disclosure into the specification and the claims are embodiment(s) of the invention.

What is claimed is:

1. An apparatus for autonomously cooking a food product and dispensing said food product into at least one container, the apparatus comprising:
    a housing;
    a plurality of cooling chambers, a plurality of cooking chambers, a plurality of storage chambers, a plurality of primary dispensing chambers, and a plurality of secondary dispensing chambers each disposed in a column arrangement within the housing;
    wherein each storage chamber of the plurality of storage chambers is disposed at a front of the housing, and each secondary dispensing chamber of the plurality of secondary dispensing chambers is disposed and attached beneath each storage chamber;
    wherein each cooling chamber is disposed above each cooking chamber, and each cooking chamber is disposed above each primary dispensing chamber;
    each cooling chamber being connected to the cooking chamber below via a top flow portal, and each cooking chamber being connected to the primary dispensing chamber below via a bottom flow portal;
    at least one food container adapted to store the food product, the at least one food container being disposed within at least one of the plurality of cooling chambers;
    a plurality of mixer augers disposed within the at least one food container, the plurality of mixer augers being adapted to transfer the food product from the at least one food container to at least one of the plurality of cooking chambers via the top flow portal;
    a series of induction plates adapted to be heated by a series of induction energizers, the series of induction plates and induction energizers being associated with each cooking chamber for cooking of the food product; and
    roller conveyor tables disposed within the pluralities of primary and secondary dispensing chambers, the roller conveyor tables each being adapted to traverse the at least one container from one roller conveyor table to another, such that the at least one container can receive the cooked food product from any of the plurality of cooking chambers.

2. The apparatus of claim 1, further comprising a computer adapted to:
    cause rotations of the plurality of mixer augers such that to transfer the food product into one the plurality of cooking chambers via the top flow portal;
    activate the series of induction energizers such that to heat the series of induction plates and thus cause a cooking of the food product;
    actuate motors disposed beneath the roller conveyor tables such that to traverse the at least one container into at least one of the plurality of primary dispensing chambers; and
    cause a dispensing of the cooked food product into the at least one container via the bottom flow portal.

3. The apparatus of claim 2, wherein each cooking chamber further comprises:
    a set of heating coils disposed in an interior top of each cooking chamber; and
    a temperature sensor and a heat-resistant camera disposed in the interior top, the temperature sensor and the heat-resistant camera being in electrical communication with the computer.

4. The apparatus of claim 2, wherein the primary and the secondary dispensing chambers each comprises:
    a set of tracking sensors and a set of viewing cameras disposed in an interior top of each of the primary and the secondary dispensing chambers, the set of tracking sensors and the set of viewing cameras being in electrical communication with the computer;
    the set of tracking sensors and the set of viewing cameras being adapted to detect an electronic tag disposed within the at least one container.

5. The apparatus of claim 1, further comprising:
    a plurality of lids, each disposed in a top of the housing above each of the plurality of cooling chambers, each lid of the plurality of lids being adapted to open such that to expose each cooling chamber for selectively replacing of a food container within;
    a digital scanner, a microphone, and a camera disposed in the top, the digital scanner, the microphone, and the camera each being adapted to identify a user; and
    a control panel disposed on the top, the control panel being adapted to receive cooking and dispensing instructions from the user.

6. The apparatus of claim 1, further comprising:
    a plurality of front ramps disposed in a bottom front of the housing, the plurality of front ramps comprising motorized rollers adapted to traverse the at least one container into or out of each of the plurality of secondary dispensing chambers; and
    a plurality of smart storage containers each disposed within each of the plurality of storage chambers, each smart storage container of the plurality of smart storage containers comprising a mixer auger and a spout tube, the mixer auger being adapted to dispense flavor enhancement products stored within each smart storage container into the at least one container when positioned below the spout tube.

7. The apparatus of claim 1, further comprising:
a plurality of cooking drums, each disposed within a cooking chamber of the plurality of cooking chambers, each cooking drum of the plurality of cooking drums being adapted to rotate within each cooking chamber such that to mix and cook the food product.

8. The apparatus of claim 1, further comprising:
a plurality of cooking augers disposed within each of the plurality of cooking chambers, each cooking auger of the plurality of cooking augers being adapted to rotate within each cooking chamber such that to cook the food product and to move the cooked food product through the bottom flow portal.

9. The apparatus of claim 1, wherein the top flow portal and the bottom flow portal each comprises a gate valve adapted to retract, such that to open the top and the bottom flow portals and to allow the food product to flow.

10. The apparatus of claim 1, further comprising:
at least one cooking top and at least one exhaust fan disposed externally in a wall of the housing, the at least one exhaust fan being positioned above the at least one cooking top;
the at least one cooking top and the at least one exhaust fan being adapted to selectively fold out to open when in use and to selectively fold down to close when not in use.

* * * * *